(12) United States Patent
Beasley et al.

(10) Patent No.: US 11,079,347 B1
(45) Date of Patent: Aug. 3, 2021

(54) MOISTURE SENSOR INCLUDING VOLUME SENSING

(71) Applicant: ENCO ELECTRONIC SYSTEMS, LLC, Destin, FL (US)

(72) Inventors: Terry Lance Beasley, Dothan, AL (US); Daniel L. Dietzen, Miramar Beach, FL (US); Gary H. Dietzen, Destin, FL (US); Ronald R. Murphy, Dothan, AL (US)

(73) Assignee: ENCO ELECTRONIC SYSTEMS, LLC, Destin, FL (US)

( * ) Notice: Subject to any disclaimer, the term of this patent is extended or adjusted under 35 U.S.C. 154(b) by 158 days.

(21) Appl. No.: 16/041,562

(22) Filed: Jul. 20, 2018

Related U.S. Application Data

(60) Provisional application No. 62/622,552, filed on Jan. 26, 2018, provisional application No. 62/535,078, filed on Jul. 20, 2017.

(51) Int. Cl.
*G01N 27/22* (2006.01)

(52) U.S. Cl.
CPC ......... *G01N 27/223* (2013.01); *G01N 27/228* (2013.01)

(58) Field of Classification Search
CPC .......................... G01N 27/22–24; G08B 21/20
USPC .............. 324/634, 640, 643, 664, 689, 694; 340/604, 605
See application file for complete search history.

(56) References Cited

U.S. PATENT DOCUMENTS

| | | | |
|---|---|---|---|
| 4,696,796 A | 9/1987 | Oka et al. | |
| 4,801,865 A | 1/1989 | Miller et al. | |
| 4,920,451 A | 4/1990 | Sakai et al. | |
| 5,091,715 A * | 2/1992 | Murphy | G08B 21/20 340/604 |
| 6,700,395 B1 | 3/2004 | Perry | |
| 6,756,793 B2 | 6/2004 | Hirono et al. | |
| 7,231,727 B2 | 6/2007 | Kang et al. | |
| 7,528,711 B2 | 5/2009 | Kates | |
| 7,719,432 B1 | 5/2010 | Hill | |
| 8,281,645 B2 | 10/2012 | Dryden | |
| 8,508,373 B2 | 8/2013 | Rice | |

(Continued)

FOREIGN PATENT DOCUMENTS

| | | |
|---|---|---|
| DE | 10249370 | 5/2004 |
| EP | 0178071 | 4/1986 |

(Continued)

*Primary Examiner* — Melissa J Koval
*Assistant Examiner* — Rahul Maini
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A moisture sensor includes a circuit board and a plurality of circuits monitoring a plurality of moisture probes, wherein at least two sets of a plurality of probes are on the bottom of the sensor, one set in direct contact with the floor, a second set separated from the floor; a set of conductive pins that enable the body of the circuit board to be spaced from the floor to help any moisture accumulation beneath the sensor to evaporate, preventing mold growth; two sets of a plurality of probes along the edge of the sensor, such that when the sensor is installed edge on, these edge sensors will be in direct contact with the floor. The sensor transmits data periodically when sensed resistance is below a predetermined value.

13 Claims, 44 Drawing Sheets

(56) References Cited

U.S. PATENT DOCUMENTS

| | | | |
|---|---|---|---|
| 9,226,076 B2 | 12/2015 | Lippert et al. | |
| 9,780,554 B2 | 10/2017 | Kardassakis et al. | |
| 10,119,884 B1* | 11/2018 | Billman | G08B 21/20 |
| 2002/0113713 A1* | 8/2002 | Palmer | G08B 21/08 |
| | | | 340/605 |
| 2003/0037382 A1* | 2/2003 | Broker | D06F 37/203 |
| | | | 68/12.02 |
| 2003/0037383 A1* | 2/2003 | Broker | D06F 33/00 |
| | | | 68/12.06 |
| 2004/0036484 A1* | 2/2004 | Tamai | G01N 27/225 |
| | | | 324/663 |
| 2011/0041562 A1* | 2/2011 | Balinski | D06F 35/008 |
| | | | 68/20 |
| 2016/0192459 A1* | 6/2016 | Siminovitch | H05B 47/11 |
| | | | 315/84 |
| 2017/0030851 A1 | 2/2017 | Kardassakis et al. | |

FOREIGN PATENT DOCUMENTS

| | | |
|---|---|---|
| WO | 1999026499 | 6/1999 |
| WO | 2017019801 | 2/2017 |

* cited by examiner

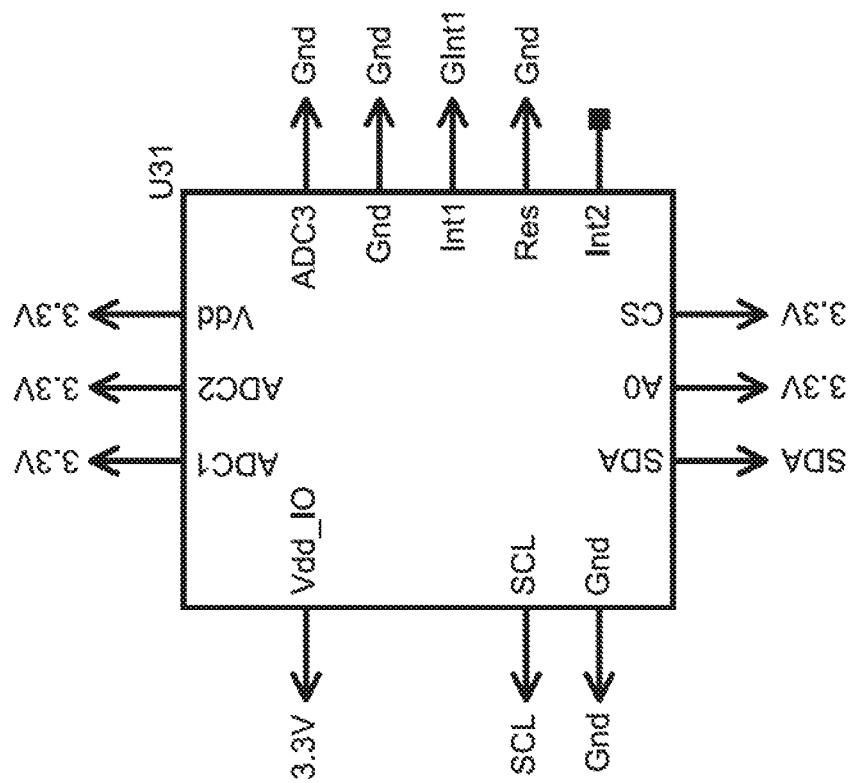
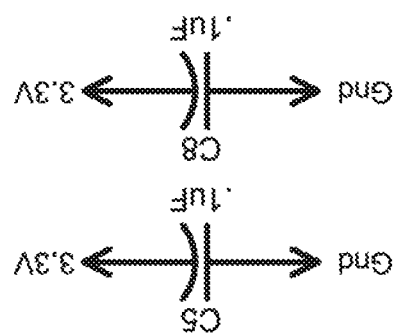
FIG. 4

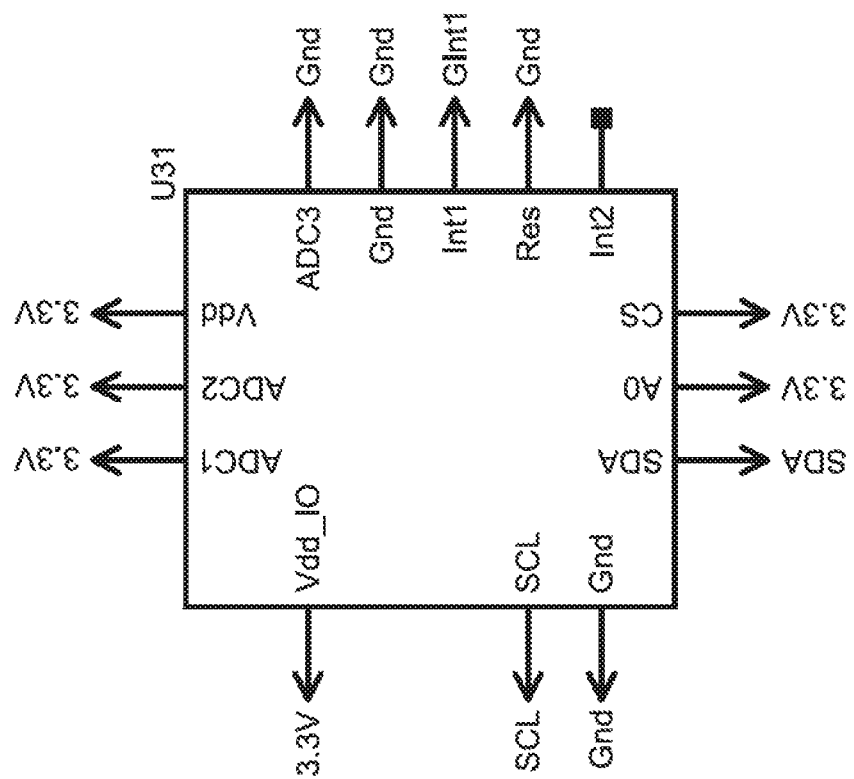
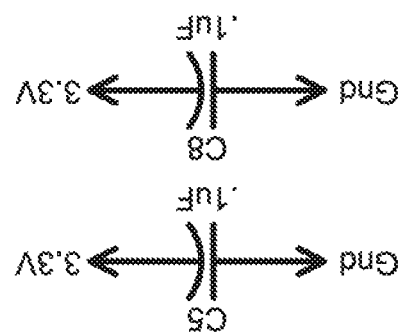
FIG. 8

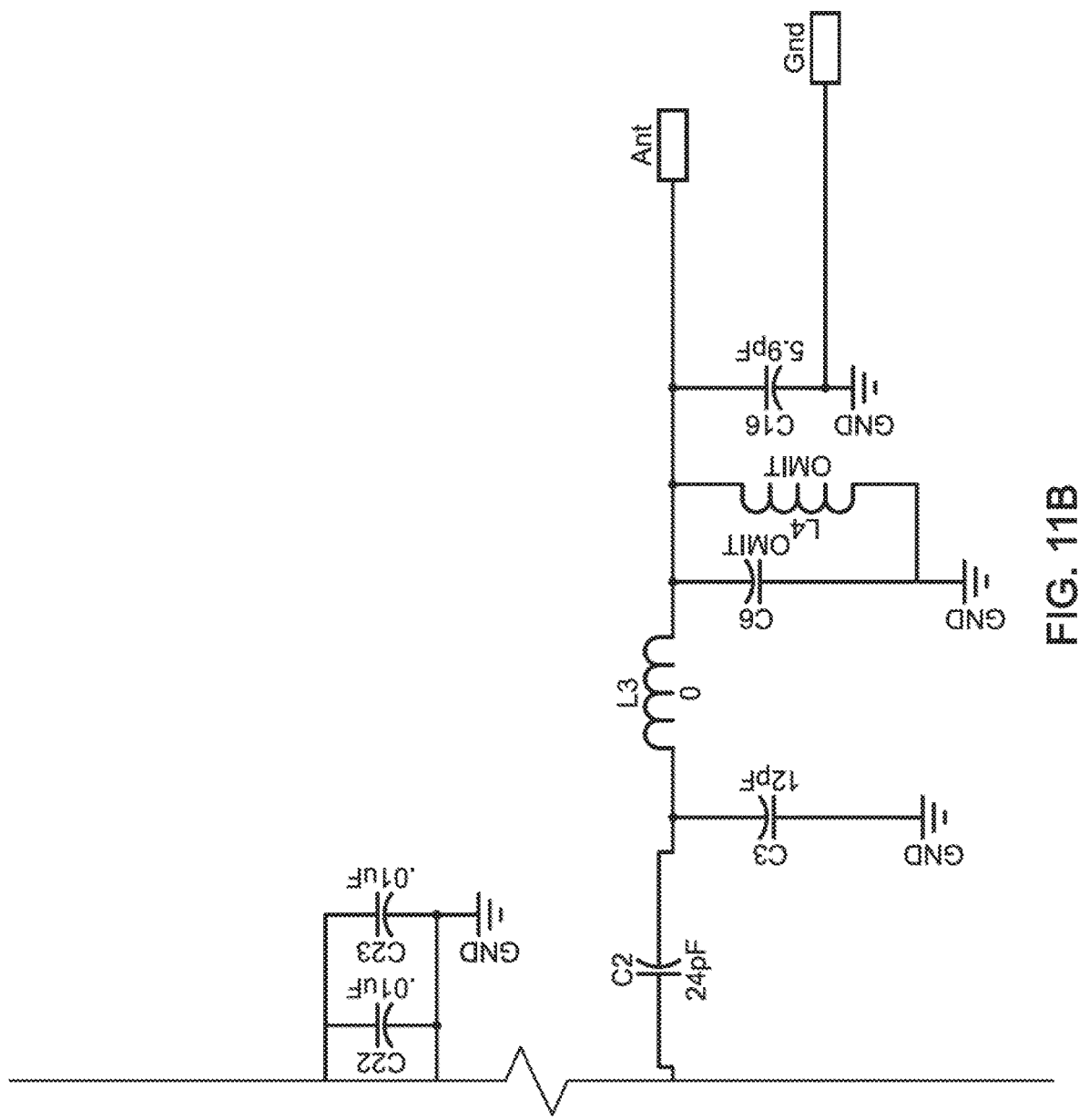

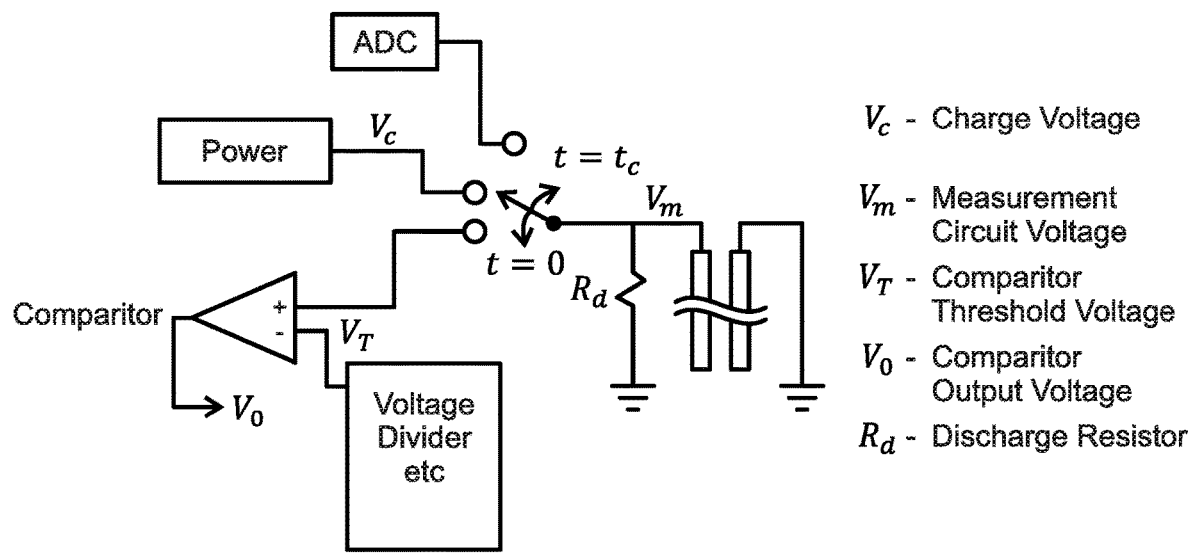
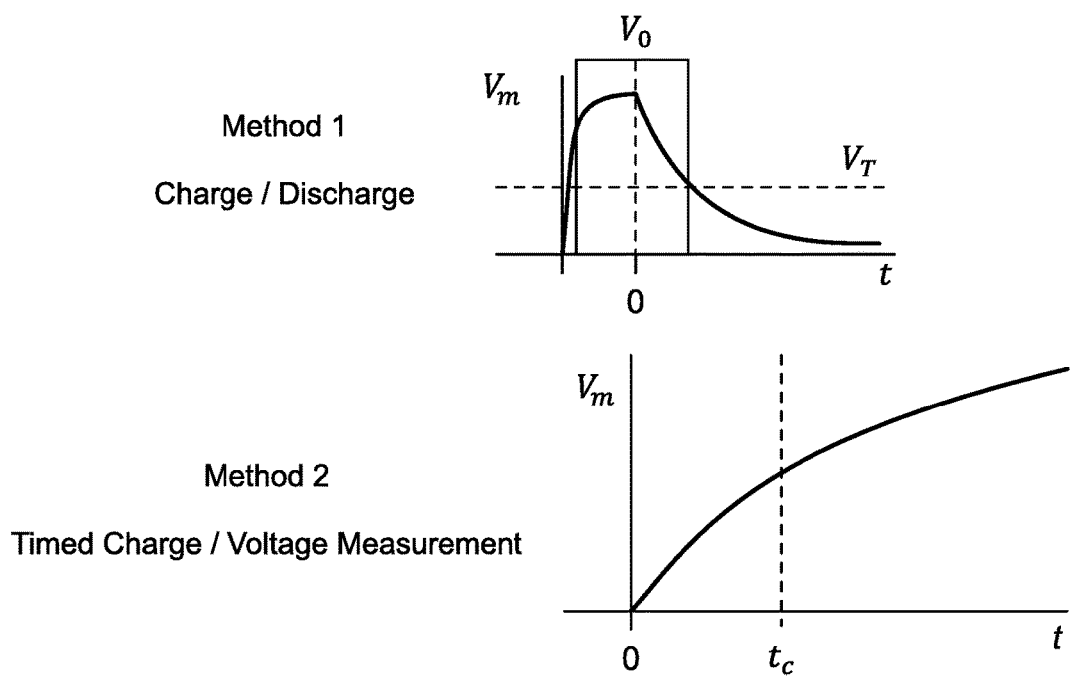
$$V = V_0 e^{(-t/RC)}$$
$$e^{-t/RC} = V/V_0$$
$$-t/RC = \ln(V/V_0)$$
$$C = \frac{-t}{R \ln(V/V_0)}$$
FIG. 35

MOISTURE SENSOR INCLUDING VOLUME SENSING

CROSS-REFERENCE TO RELATED APPLICATIONS

U.S. Provisional patent application Nos. 62/622,552, filed 26 Jan. 2018, and 62/535,078, filed 20 Jul. 2017, are incorporated herein by reference. Priority of these applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to wireless moisture sensors that are useful tools to detect and alert automated systems of destructive water leaks from pressurized water sources, drain leaks, roof leaks, etc. in residential and commercial spaces.

2. General Background

Wireless moisture sensors are useful tools to detect and alert automated systems of destructive water leaks from pressurized water sources, drain leaks, roof leaks, etc. in residential, industrial, medical, and commercial spaces, for example.

There are a number of existing leak detectors (both wired and wireless) that essentially depend on monitoring the electrical conductivity between one or more probes either in direct contact with the floor, or a small fixed distance from the floor (typically about $\frac{1}{32}$" to $\frac{1}{16}$").

Current wireless sensors are on the order of $\frac{1}{2}$" to 1" in height and with a single moisture sensing circuit monitoring a plurality of moisture probes. A problem to be overcome with any moisture sensor is that some surfaces can be damp under normal circumstances where there is no leak. The moisture typically is the result of warm moist air in contact with a relatively cool surface, such as cool tile in the bathroom after a hot shower. Further, some surfaces are simply conductive, such as a metal catch pan under an HVAC unit. Currently, some moisture sensors employ probes in direct contact with the floor, or probes separated by a gap. It is also worth noting, all the sensors known to the present inventors which are currently available employ probes only on the bottom of the sensor.

Currently all moisture sensors known to the inventors report either the presence or absence of moisture in a binary fashion (i.e. "moisture alarm" or "moisture clear") based on a predetermined resistance threshold between moisture probes, based on the fact that water is almost invariably a good conductor.

Some sensors employ a basic tilt or vibration sensor to detect tampering, but not an accelerometer. In other words, they can detect movement but not the sensor's physical orientation.

A problem with prior art moisture sensors is that moisture trapped beneath the sensor takes an extended length of time to dry, on the order of days. This is in large part due to the very low surface to volume ratio of the trapped water. Only the water exposed around the perimeter of the sensor can evaporate.

BLINK VIDEO HOME SECURITY (https://blinkforhome.com/) sells indoor and outdoor motion-activated cameras which detect temperature and record video and sound. The outdoor cameras are advertised to be weatherproof. The outdoor cameras have IR illumination with user-set intensity. The sensitivity of the motion detector is also adjustable, as is the length of the recording and the frequency of recording when motion continues to be detected.

The following patent documents are incorporated herein by reference:
U.S. Pat. Nos. 4,696,796; 4,801,865; 4,920,451; 6,700,395; 6,756,793; 7,231,727; 7,528,711; 7,719,432; 8,281,645; 9,780,554; 9,226,076;
U.S. Patent Application No. 20170030851A1;
other patent documents: DE10,249,370; EP0178071B1; and WO1999026499A2.

BRIEF SUMMARY OF THE INVENTION

The apparatus of the present invention solves the problems confronted in the art in a simple and straightforward manner.

What is provided, among other inventions, is a moisture sensor that can include a plurality of circuits monitoring a plurality of probes, some of which are in direct contact with the floor, others spaced from the floor. Further, the plurality of probes being monitored by a plurality of circuits can preferably detect, and therefore report, the presence of moisture on precisely and only those probes in contact with moisture. Further, the present invention preferably provides for the ability to measure and report the level of electrical resistance presented by the moisture impinging on the probes, precisely and only the impinged probes, and to therefor report a relative level of moisture, or "wetness" presented to each of a subset of the plurality of probes. This sensing circuit functionally, and herein is also referred to as ohmmeter.

In addition to sensing moisture by electrical conductivity, the invention also provides a unique physical embodiment of a moisture sensor that detects the presence of moisture by capacitive proximity as water has a much larger dielectric constant than other substances found in a residence or business.

Preferably, also provided is a unique physical embodiment of a moisture sensor employing the circuit board itself as part of the electronic enclosure to reduce cost.

Preferably, also provided is a unique method of employing an accelerometer to both detect and report tampering with the sensor, and to also detect the sensor's physical orientation.

Preferably, also provided is a unique physical embodiment of a moisture sensor that includes a temperature sensor, to detect the likely sudden change in sensor temperature from ambient room temperature to the temperature of the water from a leak. This allows further correlation of sudden leak detections to help filter out false alarms.

The prior art known to the inventors employs probes either in contact with the surface, or not in contact with the surface, typically around $\frac{1}{16}$" above the surface. Both the contact and non-contact designs are problematic and therefore not perfect for all situations. The current invention provides a solution to the problems of the prior art by providing a plurality of moisture probes, a subset of which are in contact with the surface and a further subset separated from the surface by typically around 1/16". Thus, one sensor can monitor both the surface for the presence of latent moisture, such as for example damp wood, and simultaneously monitor for only significant accumulations of moisture standing on the surface, such as for example water leaking onto a tile floor.

The probes can be implemented as conductive regions and conductive pins or feet on a printed circuit board that are affixed to the bottom of the sensor enclosure. The printed circuit board preferably serves both as the moisture probe and the bottom of the enclosure, thus reducing manufacturing costs. There is not a necessity for a molded bottom, thus the height of the overall enclosure can be lower.

The arrangement of the probes around the perimeter of the sensor, as opposed to the bottom only, enables the sensor to work in a variety of different orientations (e.g., inclined or generally horizontal).

The probe can provide a circuit board that works in a variety of orientations. In a flat generally horizontal orientation, conductive pins are in direct contact with the floor and detect any moisture, while the conductive regions on the bottom of the circuit board also detect leaks, but are immune to surface condensation. The conductive pins also raise the sensor bottom from the floor thus enabling moisture to evaporate (as opposed to mounting the circuit board directly to the floor). In an edge, vertical orientation, perimeter probes become contact probes, while the conductive regions (by virtue of the fact they are terminated preferably about 1/16" from the edge) also detect leaks, but are immune to surface condensation.

A circuit board can be affixed to the enclosure (e.g., plastic) for example by means of conductive screws that also serve as moisture probes, along with adhesive water-proof strips and/or O-rings and/or seals so that the internal battery and internal electronic circuit are protected from water impinging on the sensor during a leak, and to protect from condensation from atmospheric moisture.

A moisture sensor measures the resistance between probes to determine the presence of moisture. To do so, the sensing circuit measures how much current is able to flow between the probes. With a battery-powered sensor it is preferable to measure the conductivity between probes using a minimum amount of current. The microcontroller uses an additional amount of energy as it typically wakes up periodically to measure this current flow.

The present invention preferably employs a small capacitor on two of the four probes, with the remaining two probes connected to the microcontroller and to ground through a very large resistance. The microcontroller preferably periodically charges those capacitors and once charged, the microcontroller preferably goes into a sleep mode, preferably waking up only when the charge on one of the capacitors has drained below a detection threshold. This arrangement allows the microcontroller to sleep for extended periods of time (a minute or longer) yet be able to respond virtually instantly to a leak event.

Preferably, via the remaining two remaining probes, the microcontroller can detect which two of the four probes was involved in the leak. The rate at which the probe capacitors discharge gives an indication of the resistance between the probes.

In the present invention, measurement of a range of values of resistance preferably occurs, rather than just a binary wet/dry indication of many prior art sensors. Also, multiple probes on different areas of the sensors allow more and better information to be obtained via several ohmmeters. The ability to conduct capacitive sensing makes sensors of embodiments of the present invention desirable. Conductive probes that can pierce gypsum board allow sensors of embodiments of the present invention desirable in that the moisture in the gypsum board can give information about leaks in a building. It is believed that in the present invention a battery could last 10-15 years (or longer). The battery shelf life may be the limiting factor.

Advantageous features of the present invention include:

1. a plurality of analog-reporting ohmmeters and capacitive sensors;

2. the resistive and capacitive sensors are especially capable at reading small variations in adjacent surface moisture content because the conductivity and capacitance of porous surfaces increases in proportion to moisture content. And most building material surfaces are porous (tile, wood, concrete, etc.)

3. the capacitive sensor is more immune to false alarms than resistive sensors because it can discern the actual volume of water, whereas resistive sensors can be falsely triggered by lint/dirt/cleaning products etc. spanning the relatively short distance between probes when infused with a very small amount of water, and can be triggered by innately conductive surfaces such as metal;

4. the capacitive sensor is immune to corrosive chemicals because no metallic conductive probes or regions of the circuit must be exposed, as opposed to resistance-measuring moisture sensors;

5. sensitivity of the capacitive sensor is greatly increased without increased cost by utilizing the circuit board as the bottom enclosure;

6. the small size of the sensor design (preferably smaller than 2.3" L inches by 2.5" W inches by 0.5" H inches);

7. the under-sensor spacer that speeds drying, allowing the sensor to remain in place without needing to be manually moved to dry the floor;

8 two or more separate under-the-sensor spacers made of a conductive material placed in intimate contact with conductive regions under the sensor (thus each spacer becoming part of a plurality of electrical circuits), and also in contact with the adjacent surface (and further being optionally affixed to the surface), enabling the sensor, through the intervening spacers (made of for example carbon impregnated rubber), to measure surface resistance using materials otherwise impervious to corrosive chemicals, while protecting the metallic conductive region of the sensing circuit;

9 a variation of the resistive sensor with penetrating probes that measures the moisture in porous materials like sheetrock or wood (such as pine, cedar, cypress, oak and engineered wood), enabling a small sensor to detect moisture in the space behind the porous material that is even some distance away (as far away as for example twenty feet), as the unwanted moisture results in much higher humidity in the space, and will likely cause a large area of porous material to become more conductive; and 10. preferably relative humidity, ambient light, ambient noise, water flow, surface moisture, temperature, etc. readings from proximately co-located sensors and distant sensors in similar locations (a particular bathroom compared to others in the same unit space, and to other unit spaces) can be compared/correlated/statistically analyzed to reduce false alarms (such as humid bathroom floors, shower curtain spills, etc.).

Processing the Data

The internal processor and transmitter preferably relay the current state of the resistance between the moisture probes, as well as which probes are involved. Reporting the resistance between the probes and/or capacitance, rather than a binary moisture/no-moisture condition, enables the sensor to relay the fact that a moisture condition exists, but is either advancing or receding. This feature allows the sensor in certain situations to deduce that the leak has stopped even though the probes are still in contact with a moist but drying surface. This feature also allows the nature of the leak to be characterized, such as whether the leak presented suddenly or slowly, in many cases making it possible to pinpoint much more accurately when the leaking condition began. This also allows the sensor to be permanently attached to a surface, or to be deployed in locations that are difficult to access, without the need to dry the surface after a leak event.

Because the sensor may be permanently attached to the floor (for security, or to perpetually ensure optimum location at time of installation, etc.) in areas where the floor must be cleaned (such as by mopping), it is possible for a damp mop to temporarily touch the moisture probes, creating a false leak alarm. Because a plurality of circuits will be monitoring a plurality of probes, it is possible to filter out this false alarm condition by requiring a combination of probes to detect moisture, but in a pattern not consistent with a mop touching the sensor.

The sensor preferably employs an accelerometer that detects both movement and the orientation of the sensor. It preferably also relays the sensor's orientation via readings from the accelerometer. Other data are preferably also relayed, including the current battery state, etc. The accelerometer preferably reports the current orientation of the sensor (e.g., flat, upright, etc.) accurate to at least 2 mg (milli gravity) in the x-, y- and z-axes.

Further, the sensor preferably sends periodic transmissions so that the receiving processor can verify the status of the sensor, as well as the radio signal strength. During the periodic update, any changes in the state of the sensor are preferably also transmitted, but only if changes occurred. By omitting redundant data, the battery power can be conserved.

The sensor of the present invention can advantageously be used with the leak detection system disclosed in International Publication Number WO 2017/019801 A1, published 2 Feb. 2017, assigned to ENCO ELECTRONIC SYSTEMS, LLC, and incorporated herein by reference.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 4-7B are circuit diagrams of a preferred embodiment of the apparatus of the present invention to detect moisture accumulation on and within a surface by measured resistance between a plurality of probes;

FIGS. 8-11B are circuit diagrams of a preferred embodiment of the apparatus of the present invention to detect moisture on and within a surface by measured capacitance between a plurality of probes;

FIG. 35 shows capacitive circuitry and methods of using the capacitive circuitry.

DETAILED DESCRIPTION OF THE INVENTION

Figure 5:
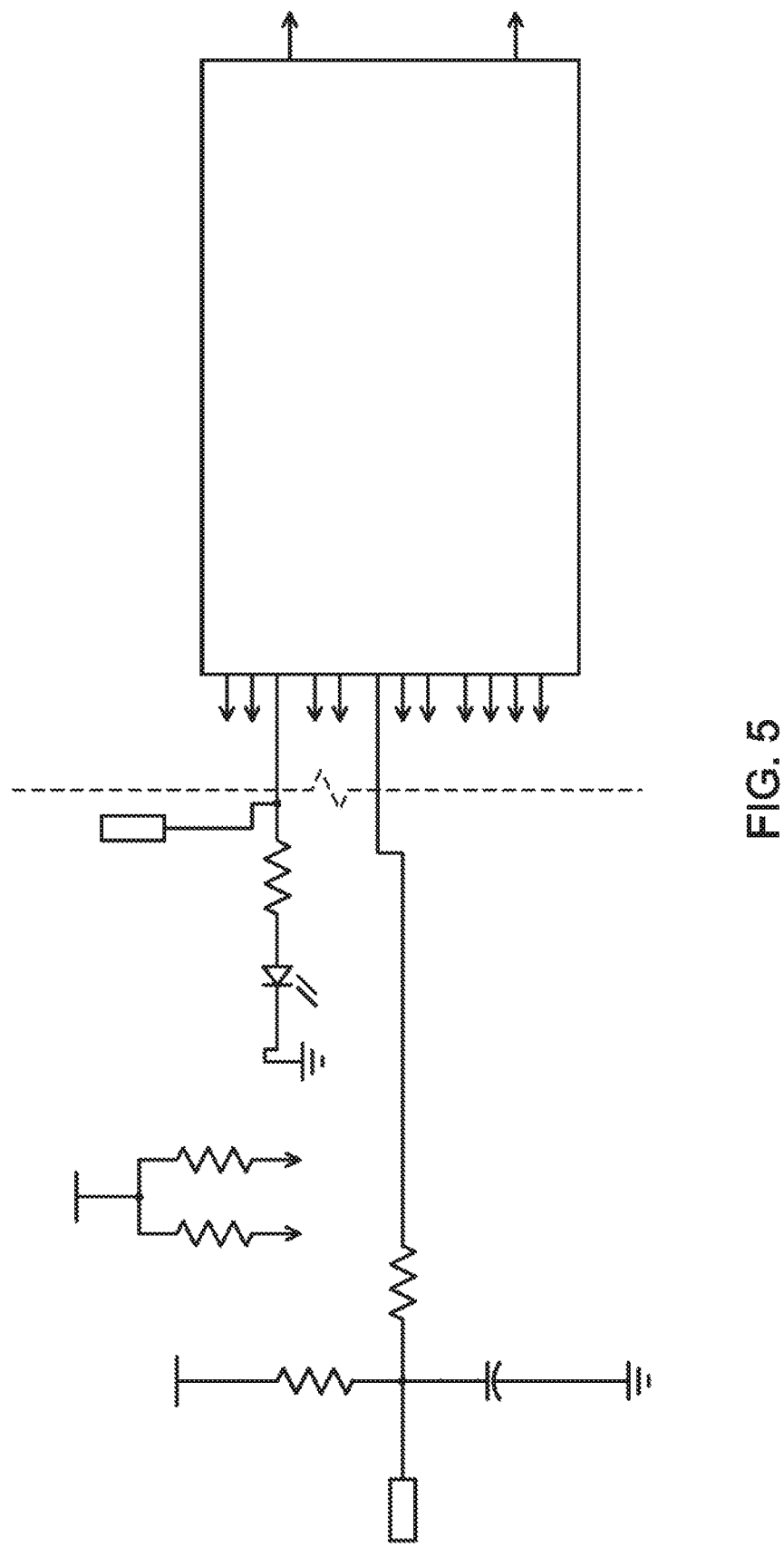
Figure 5A:
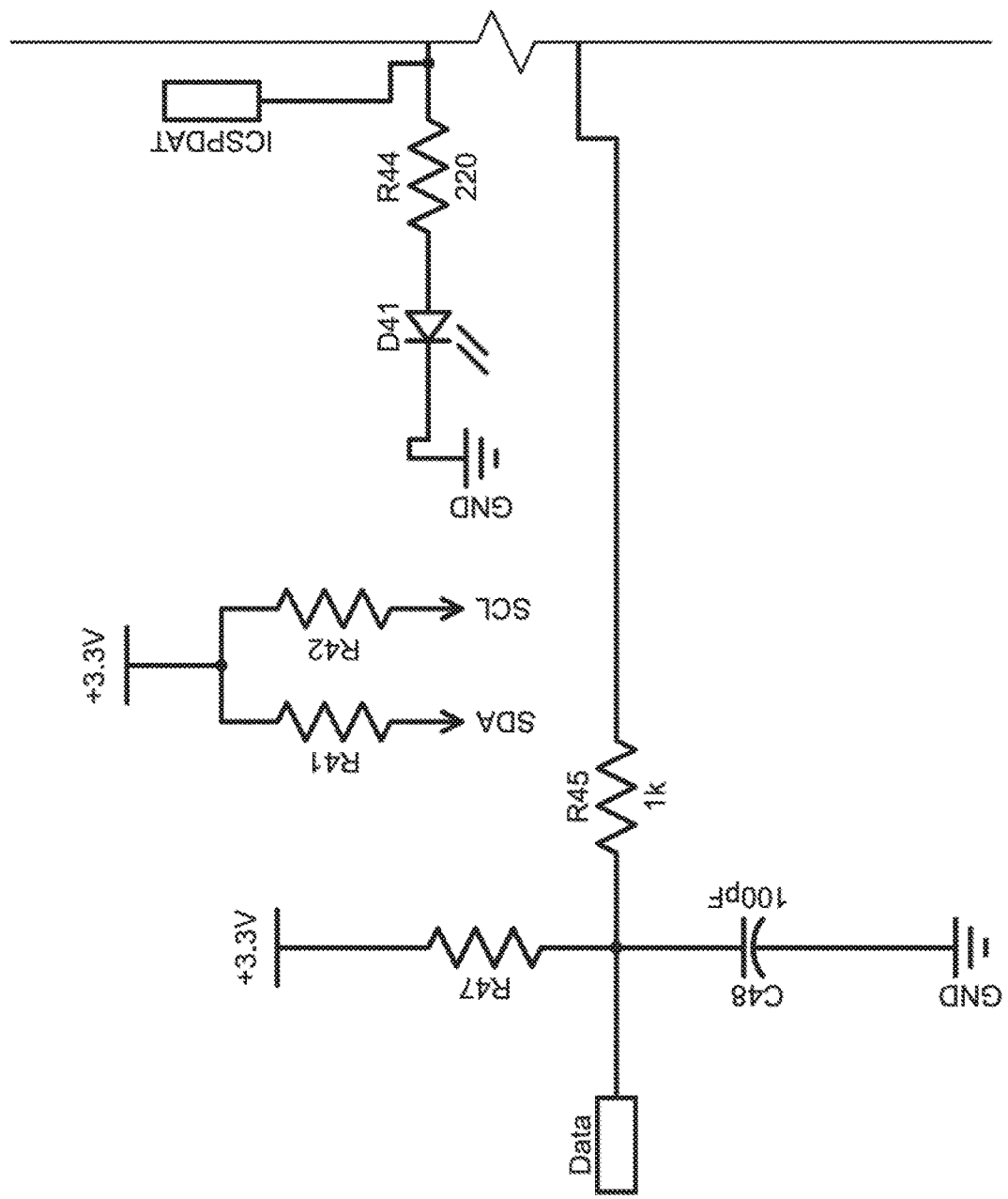
Figure 5B:
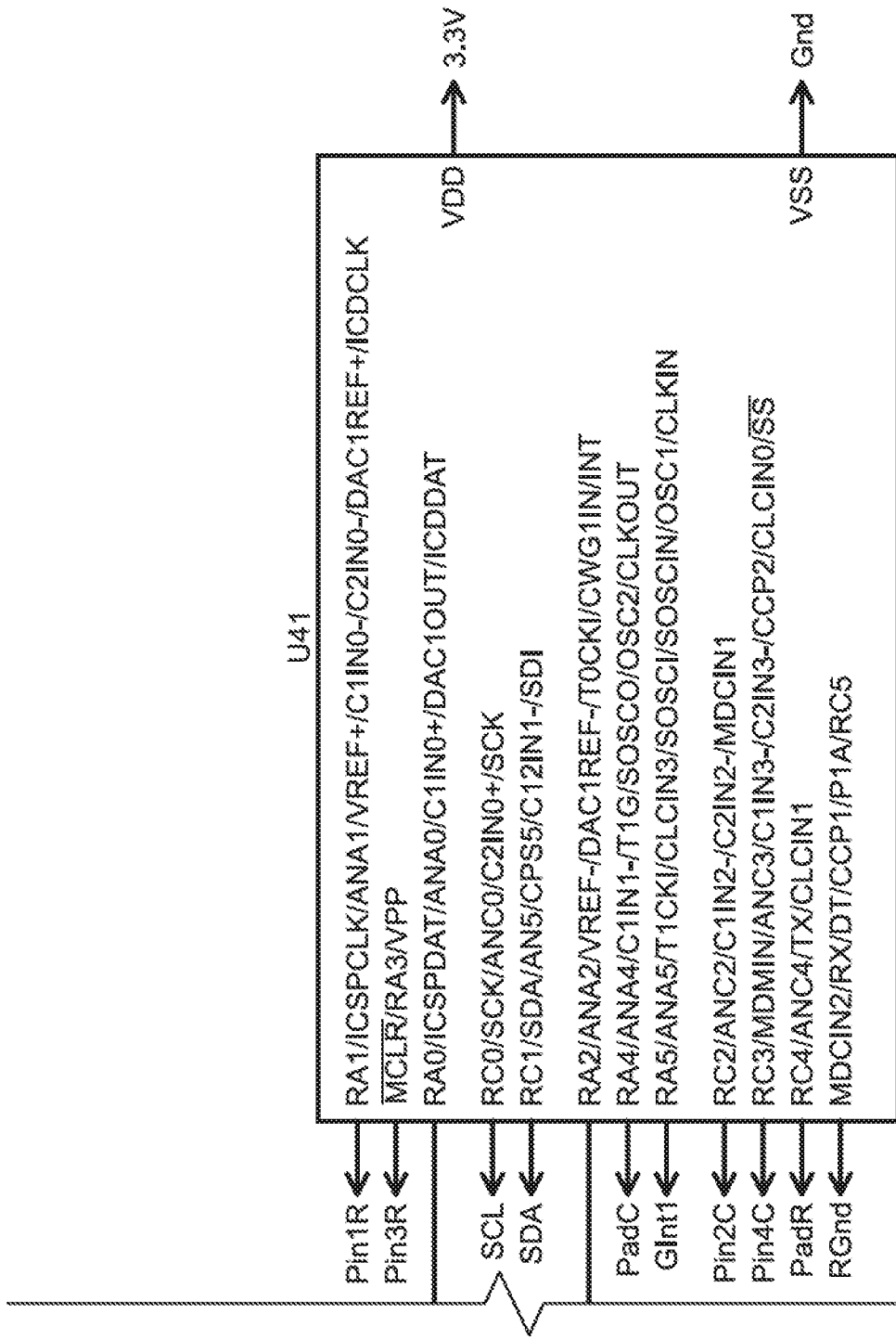
Figure 6:
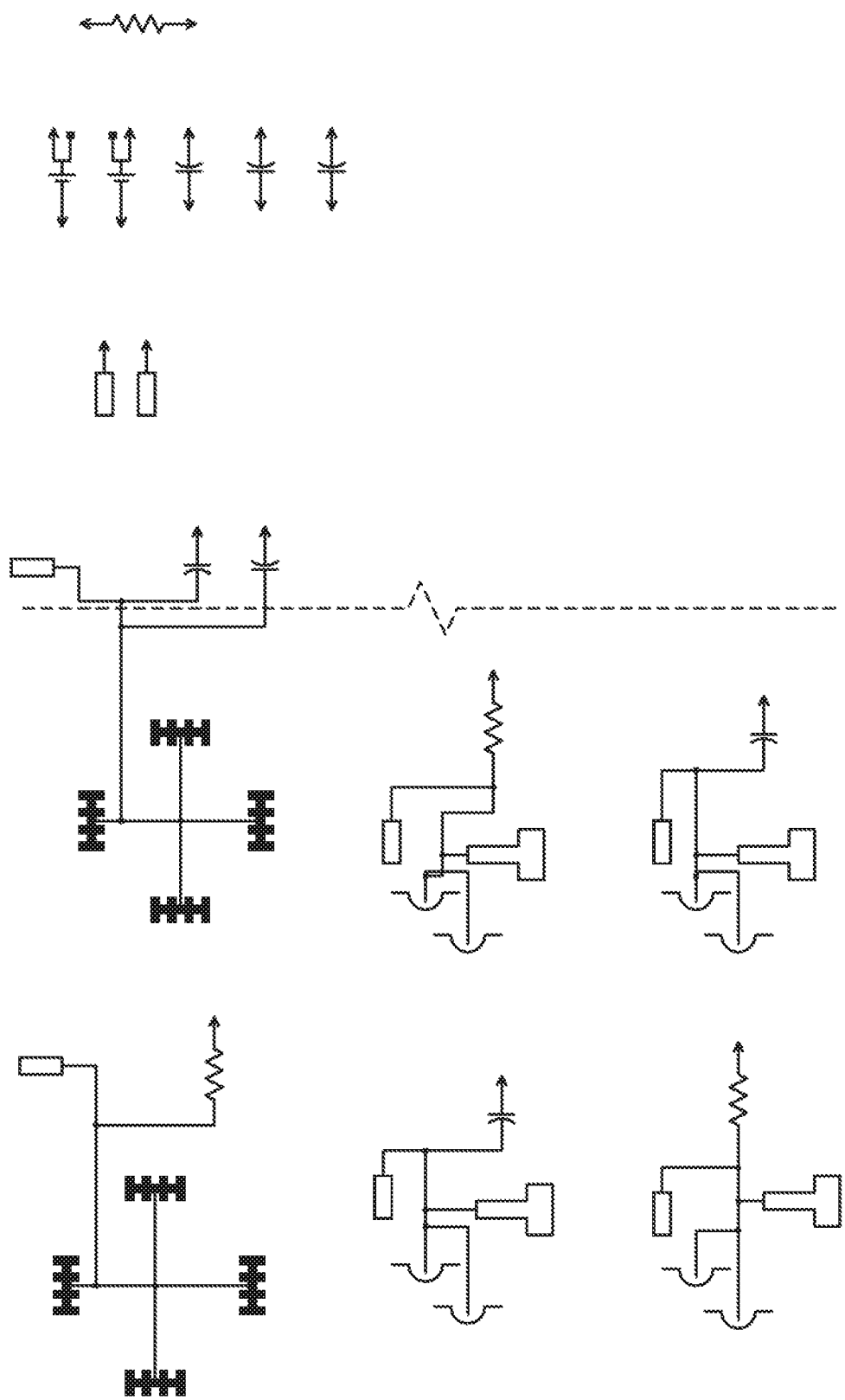
Figure 6A:
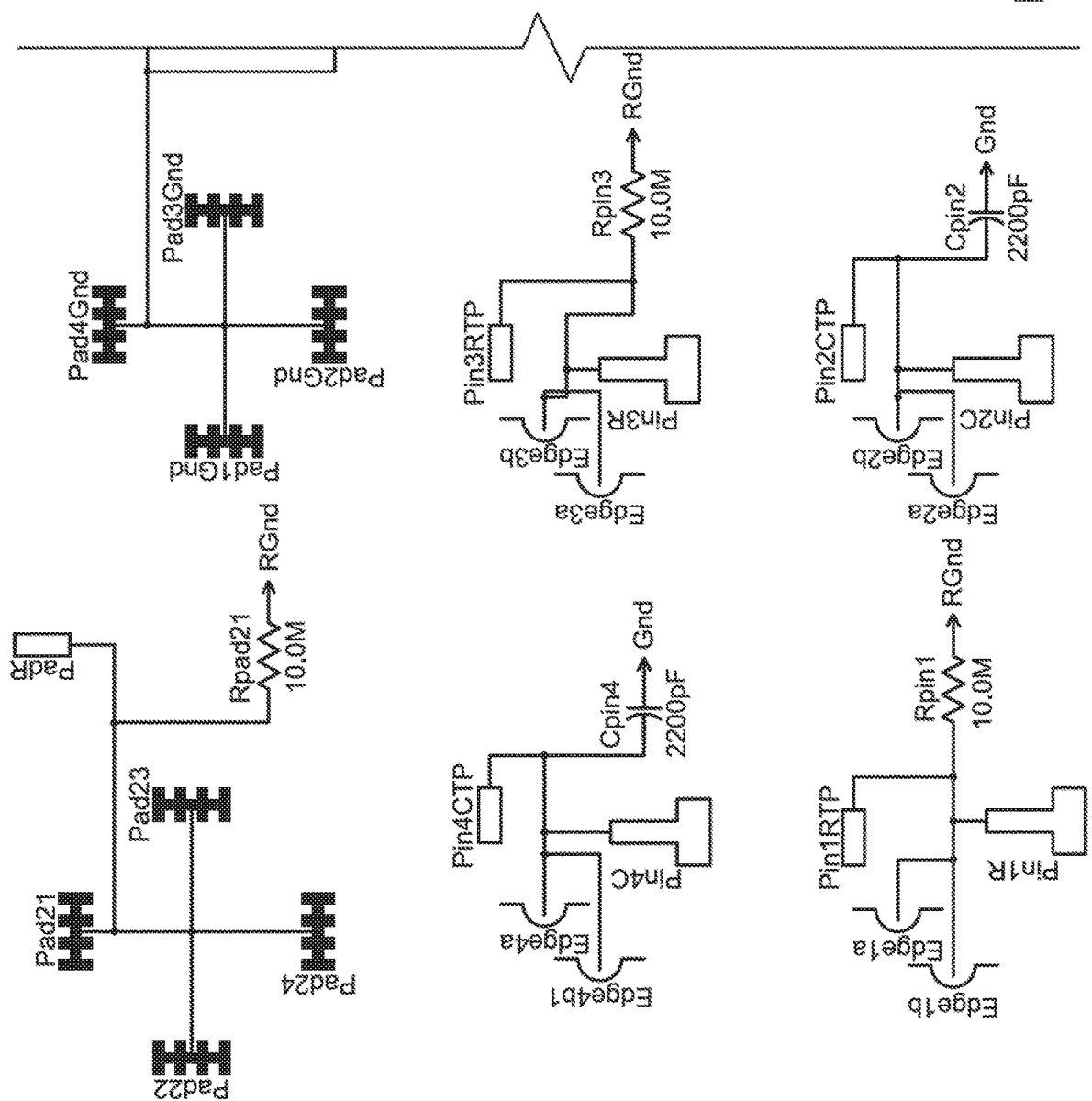
Figure 6B:
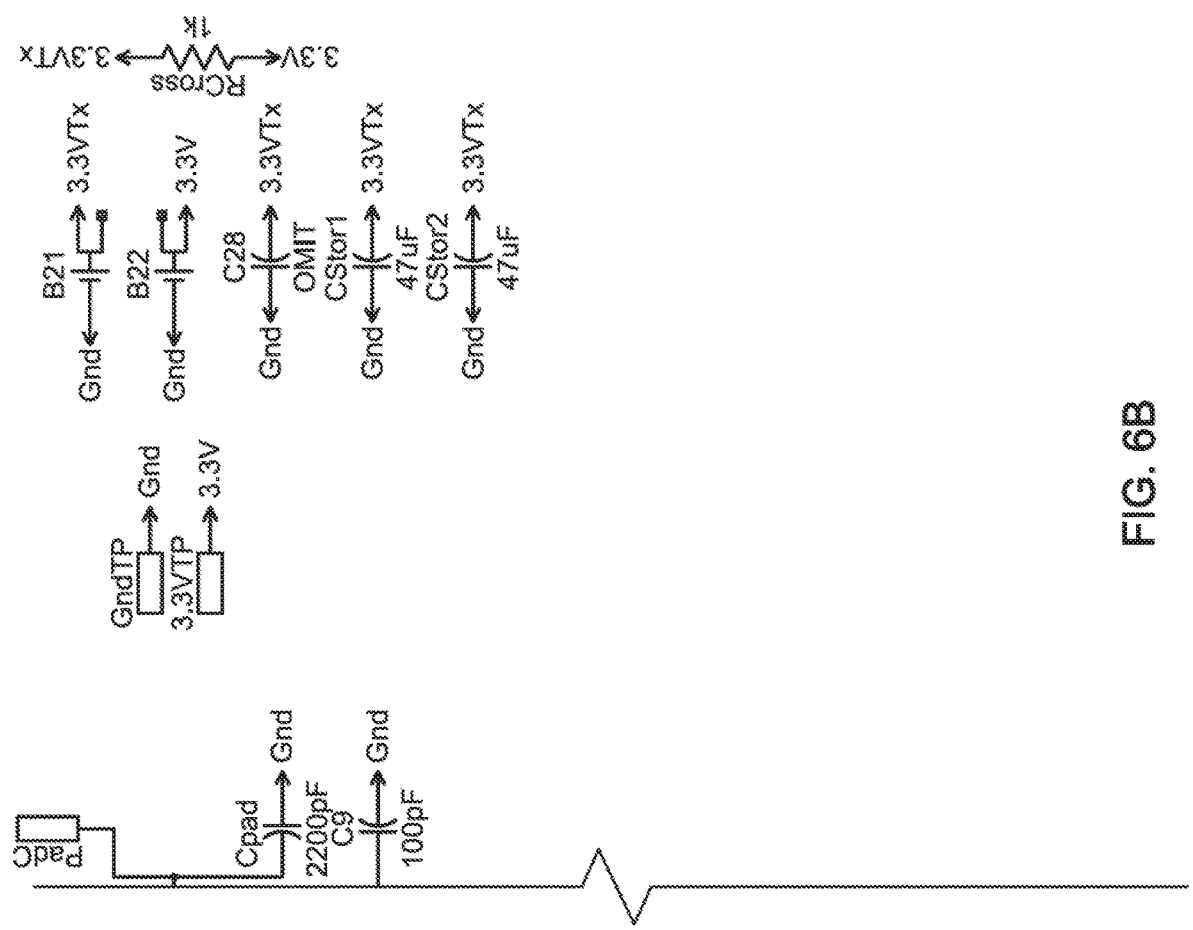
Figure 7:
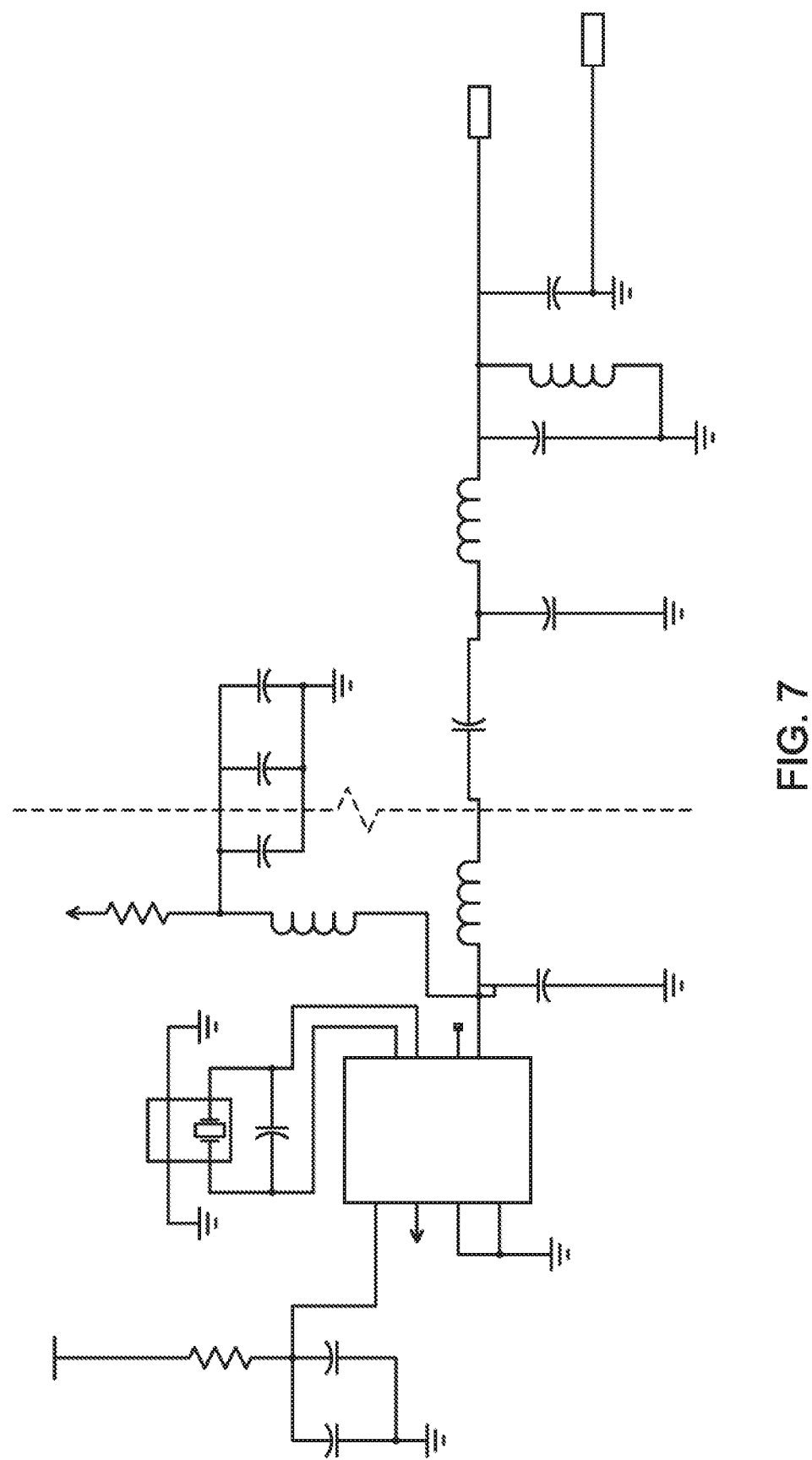
Figure 7A:
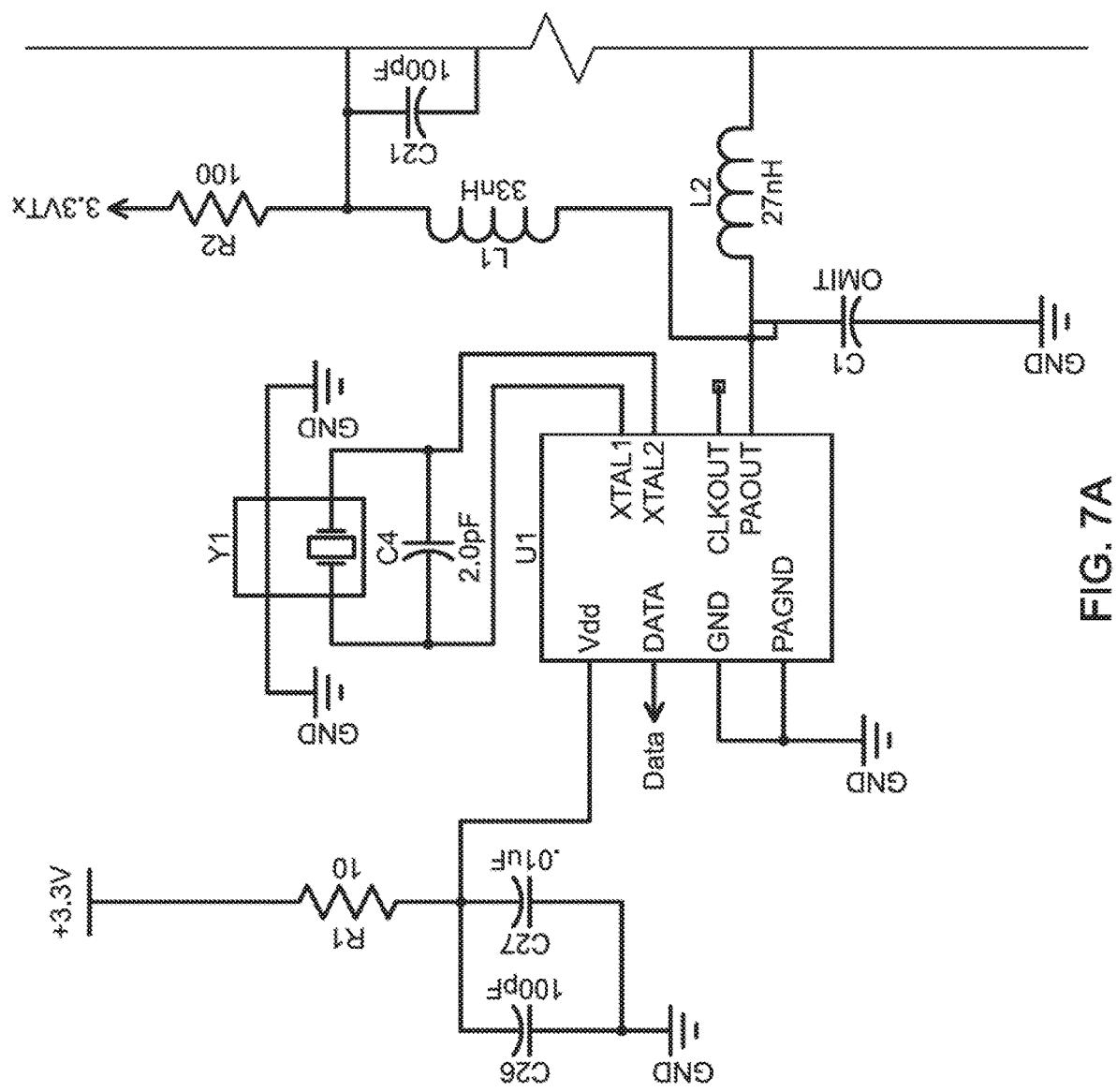
Figure 7B:
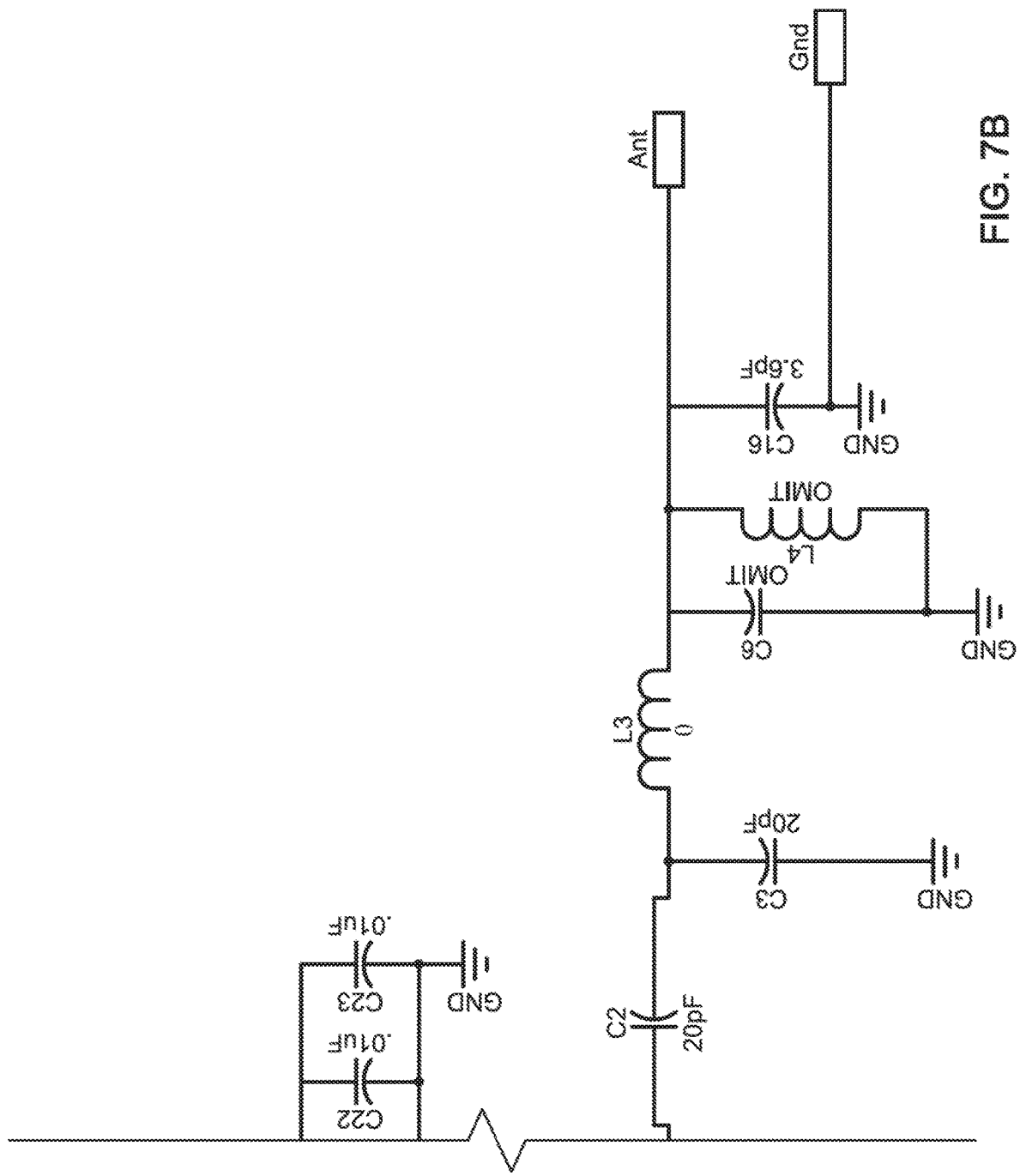
Figure 9:
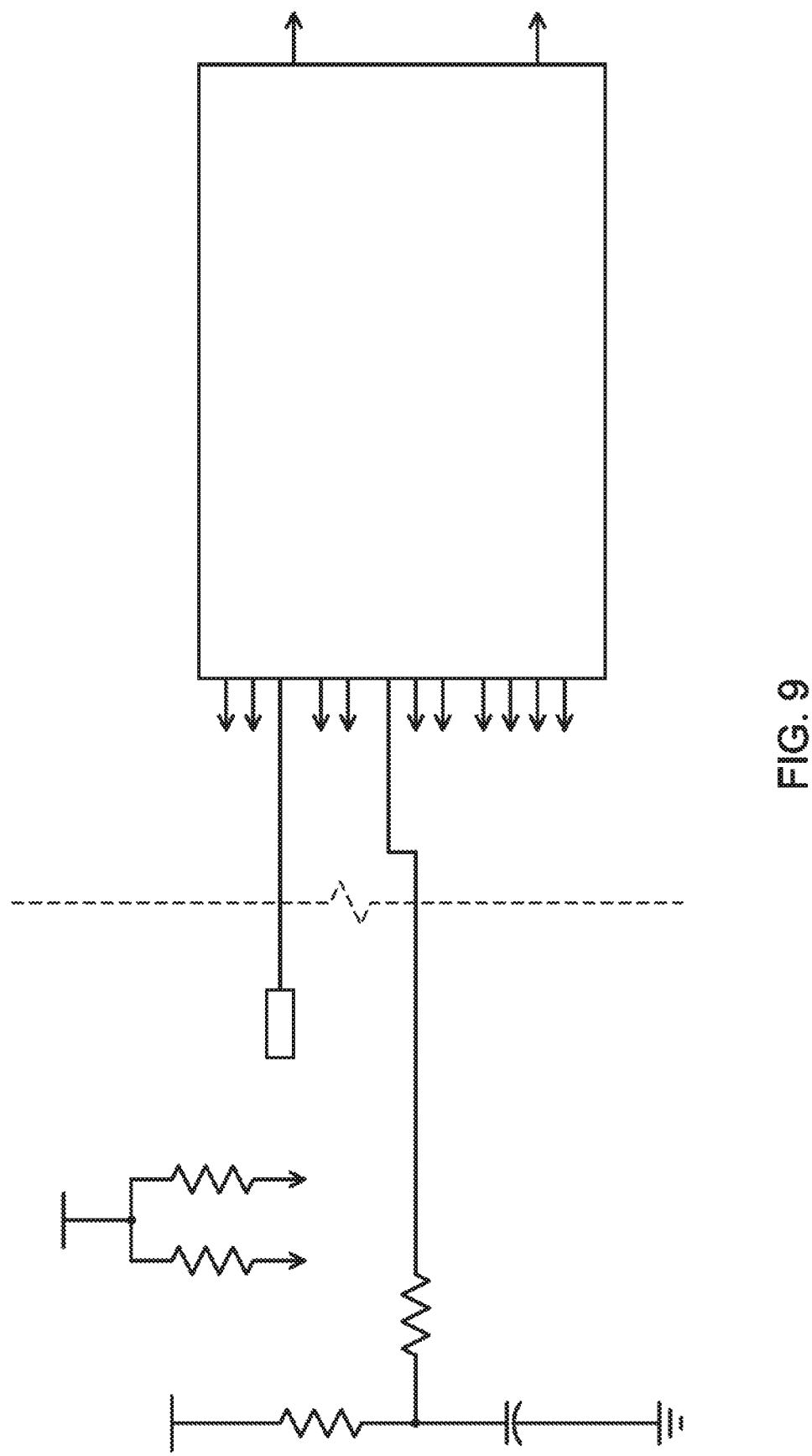
Figure 9A:
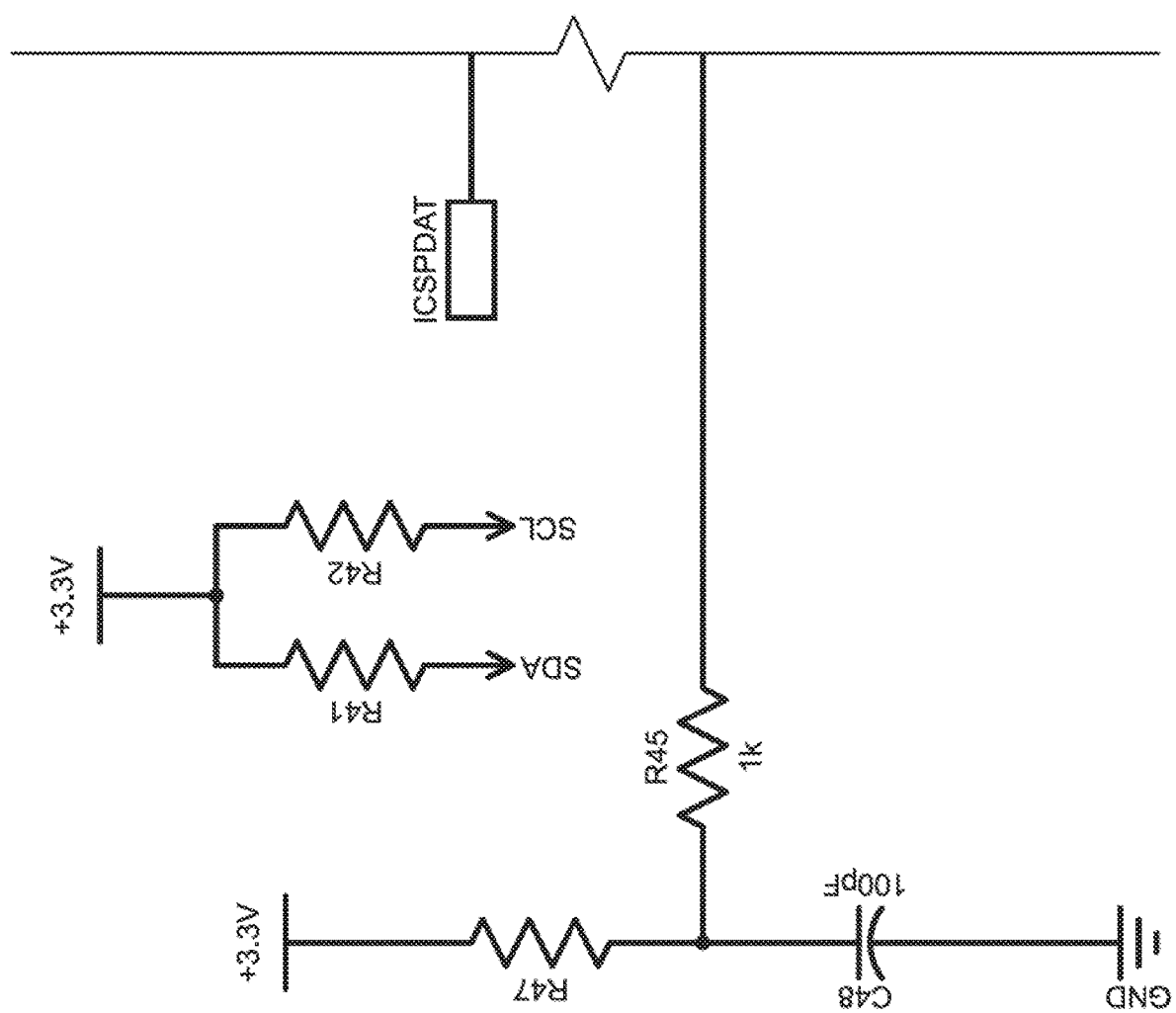
Figure 9B:
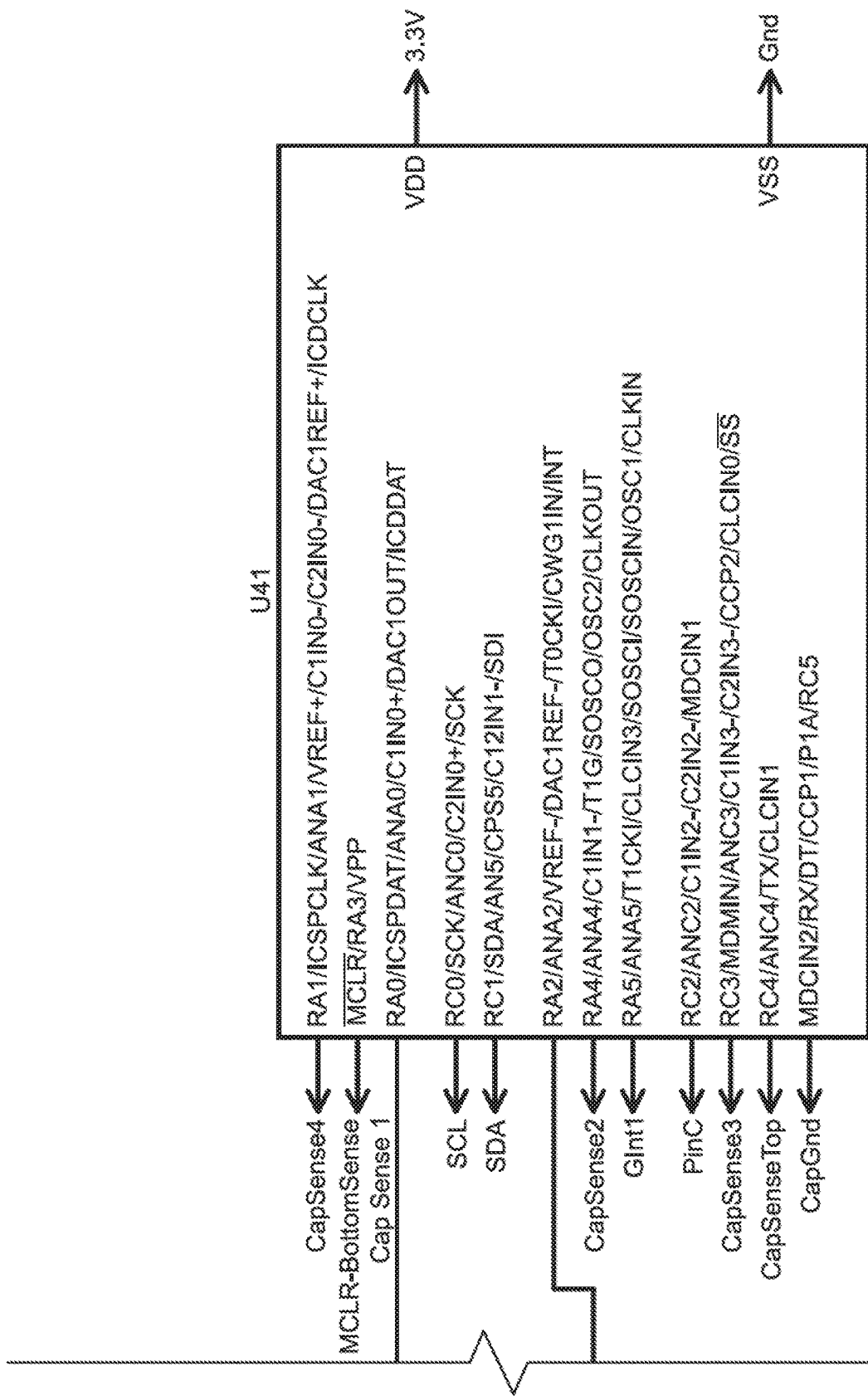
Figure 10:
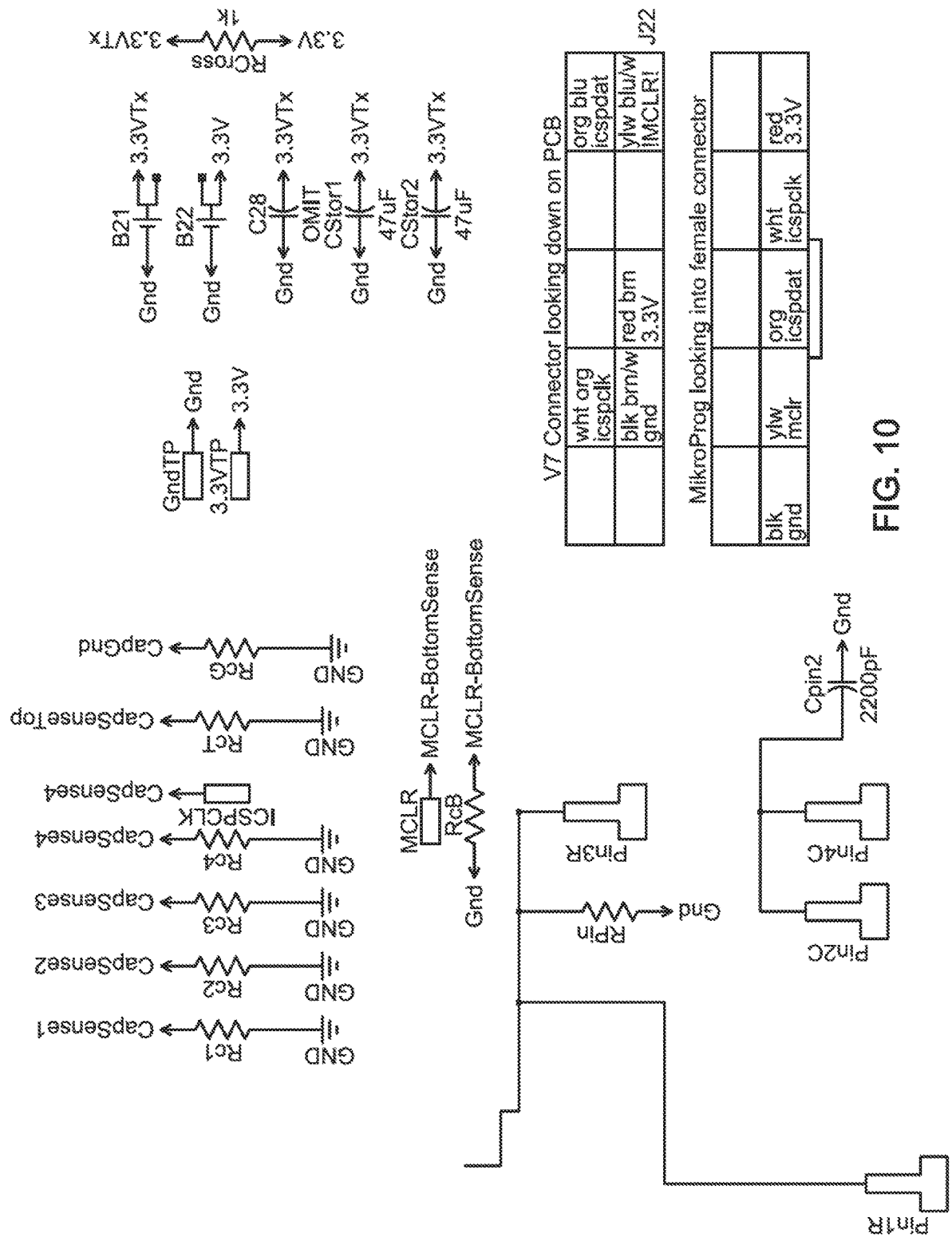
Figure 11:
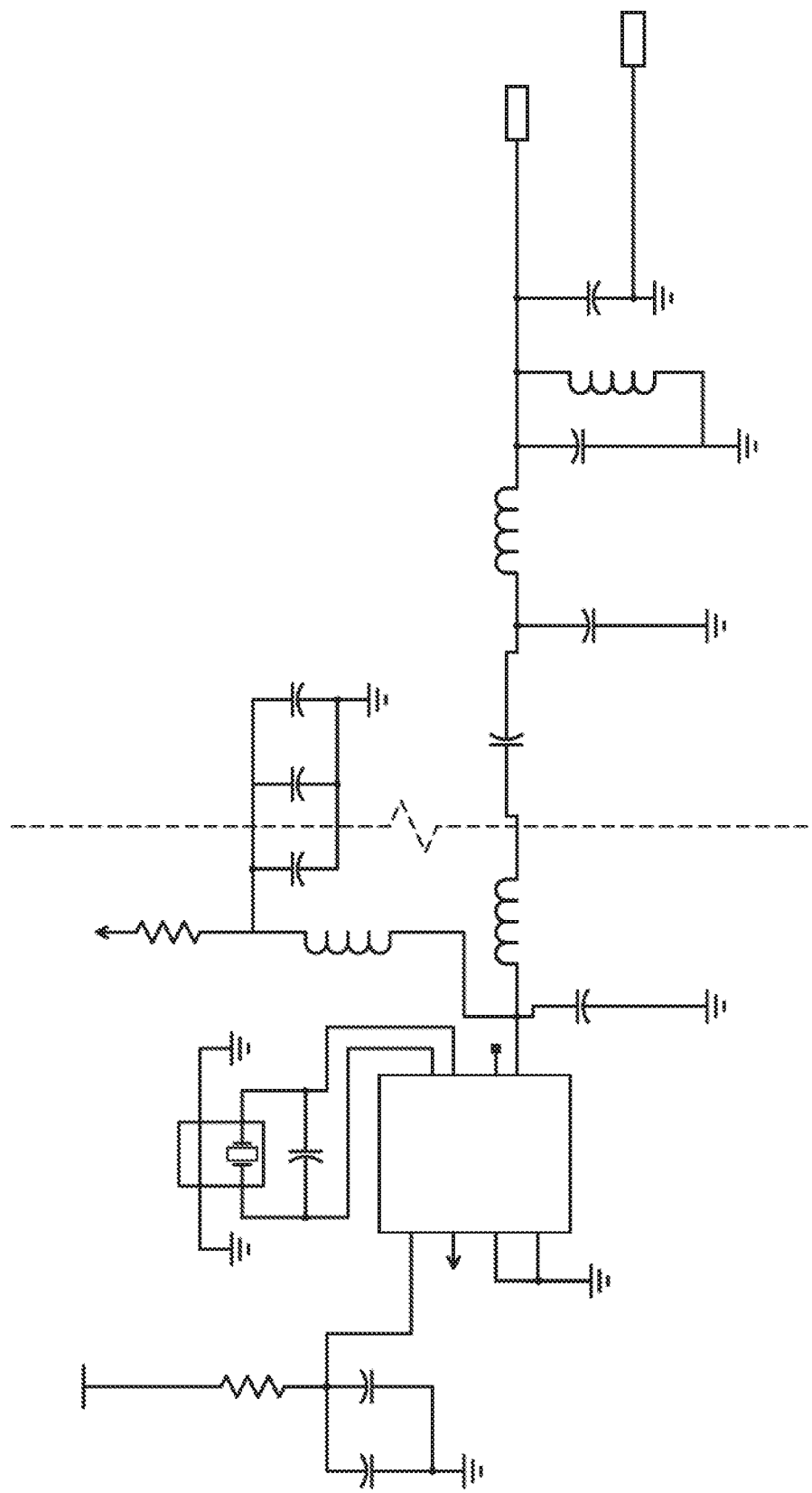
Figure 11A:
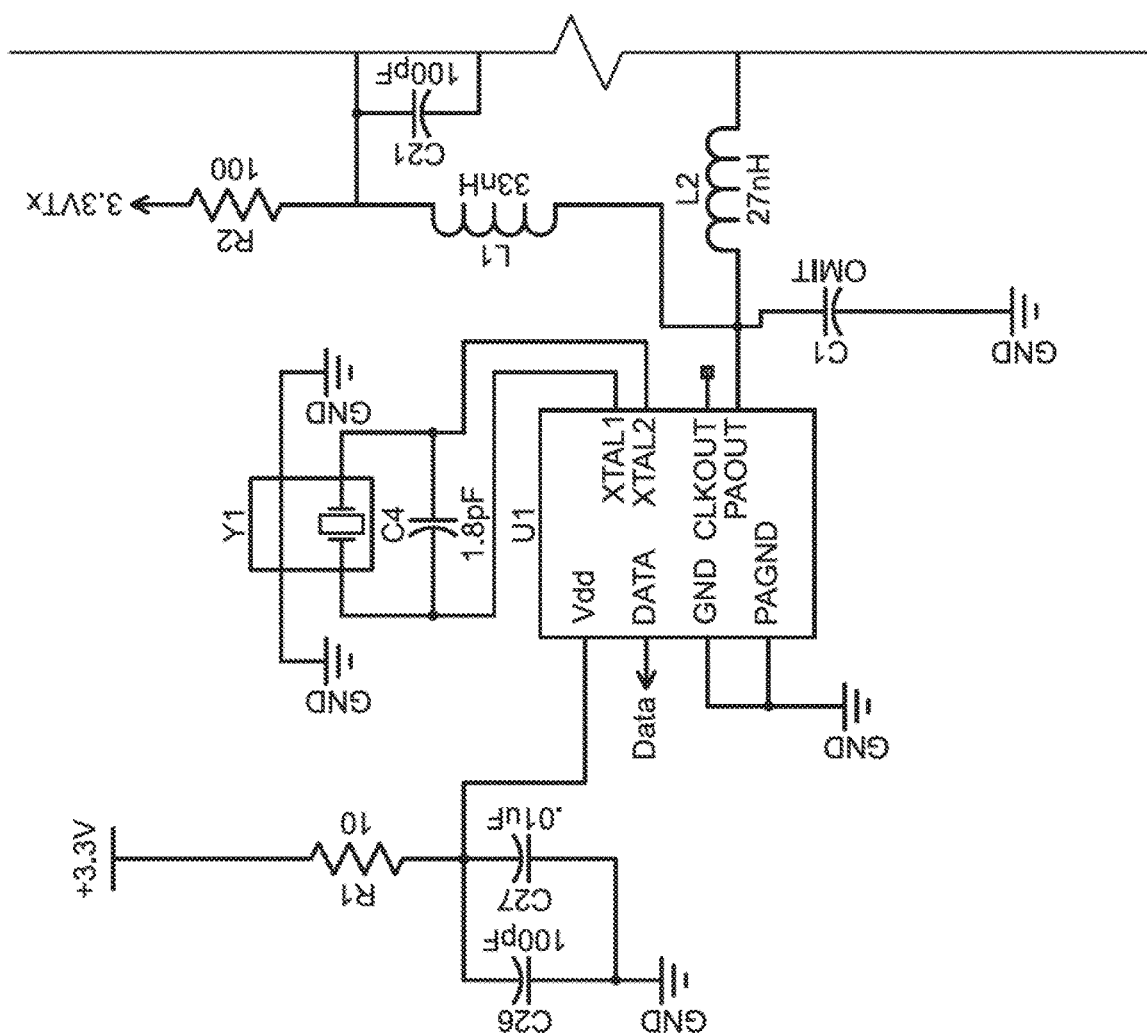
Figure 12:
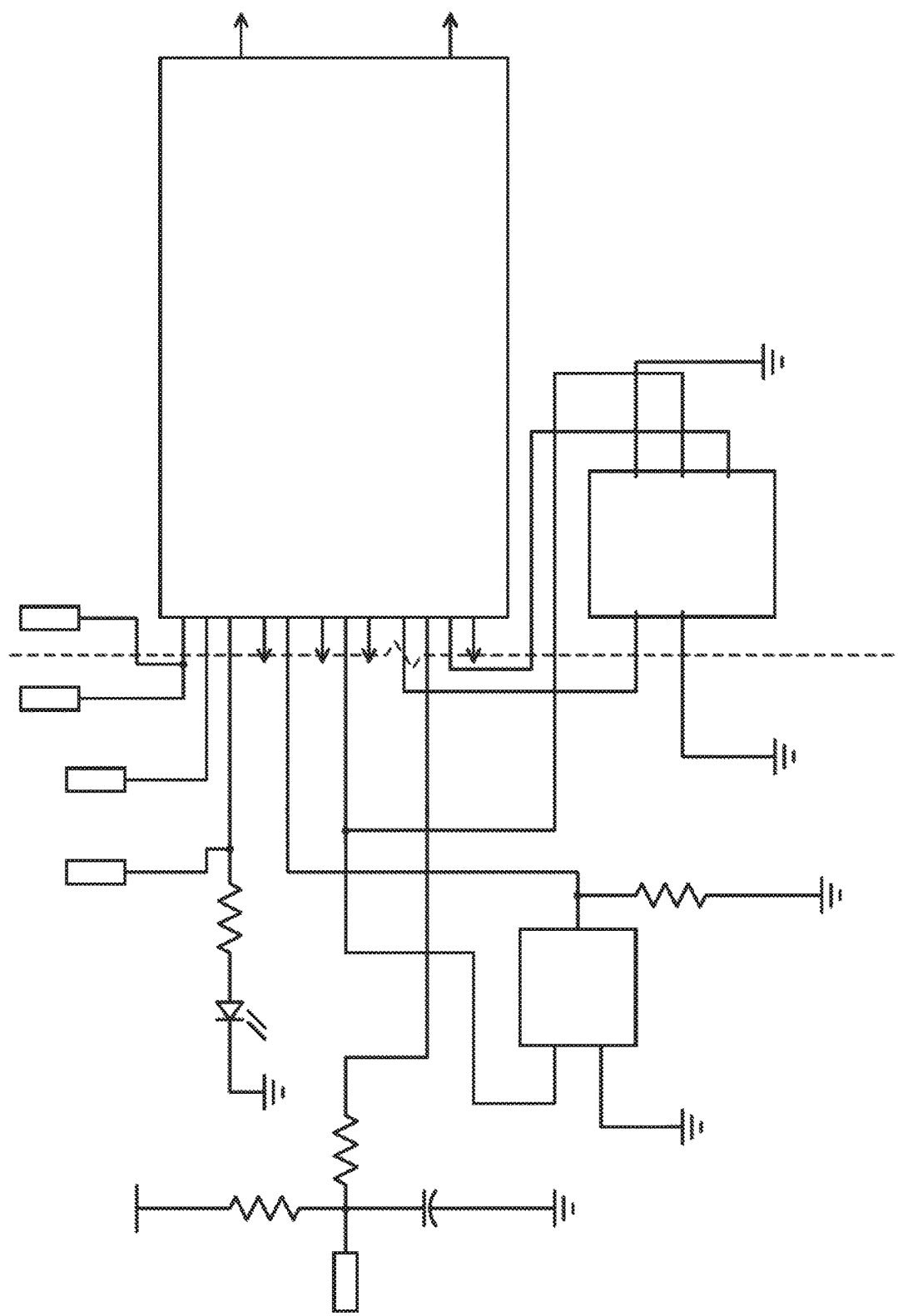
FIGS. 12-14B are circuit diagrams of a preferred embodiment of the apparatus of the present invention to detect moisture in a substrate by measured resistance between a plurality of probes.
Figure 12A:
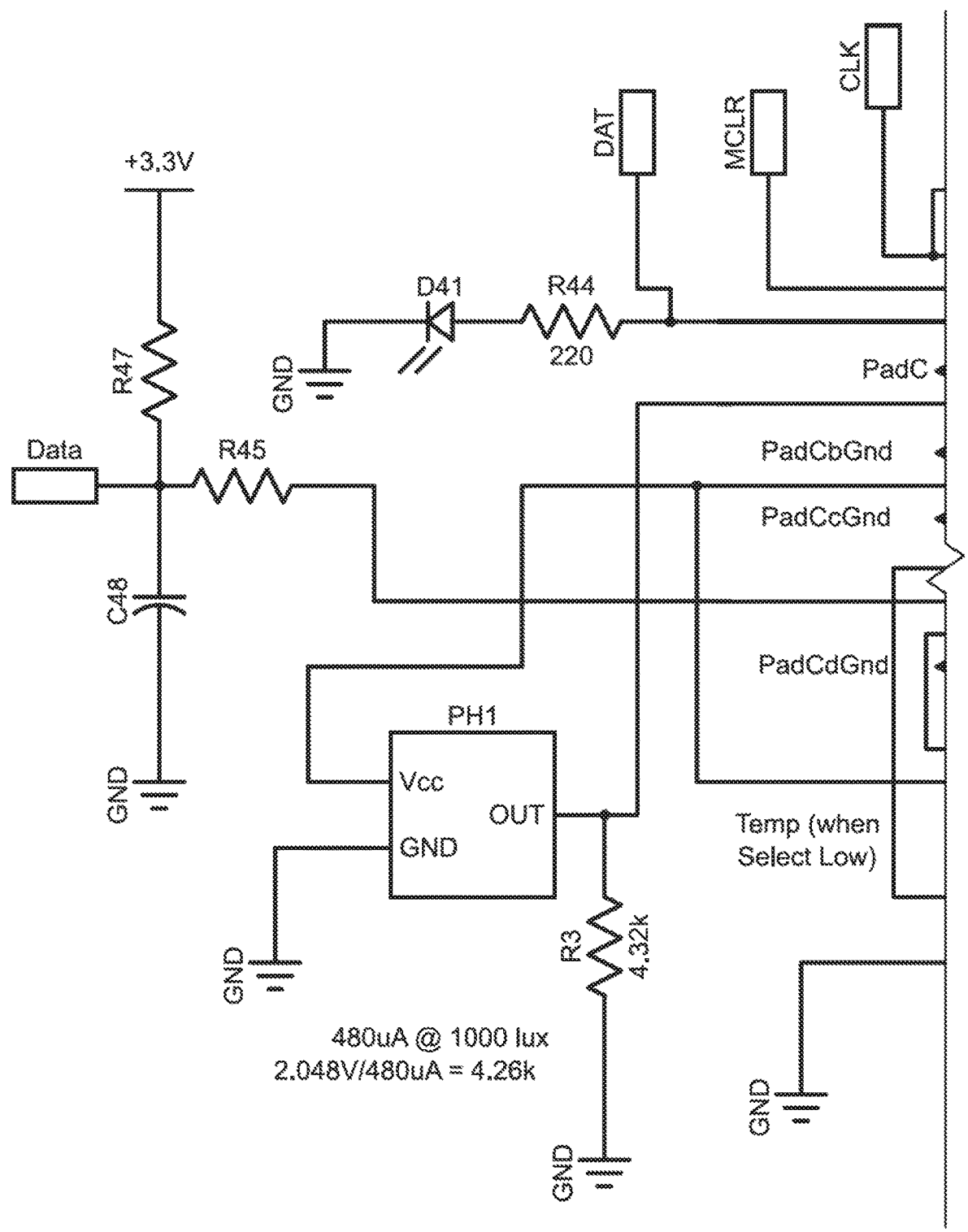
Figure 12B:
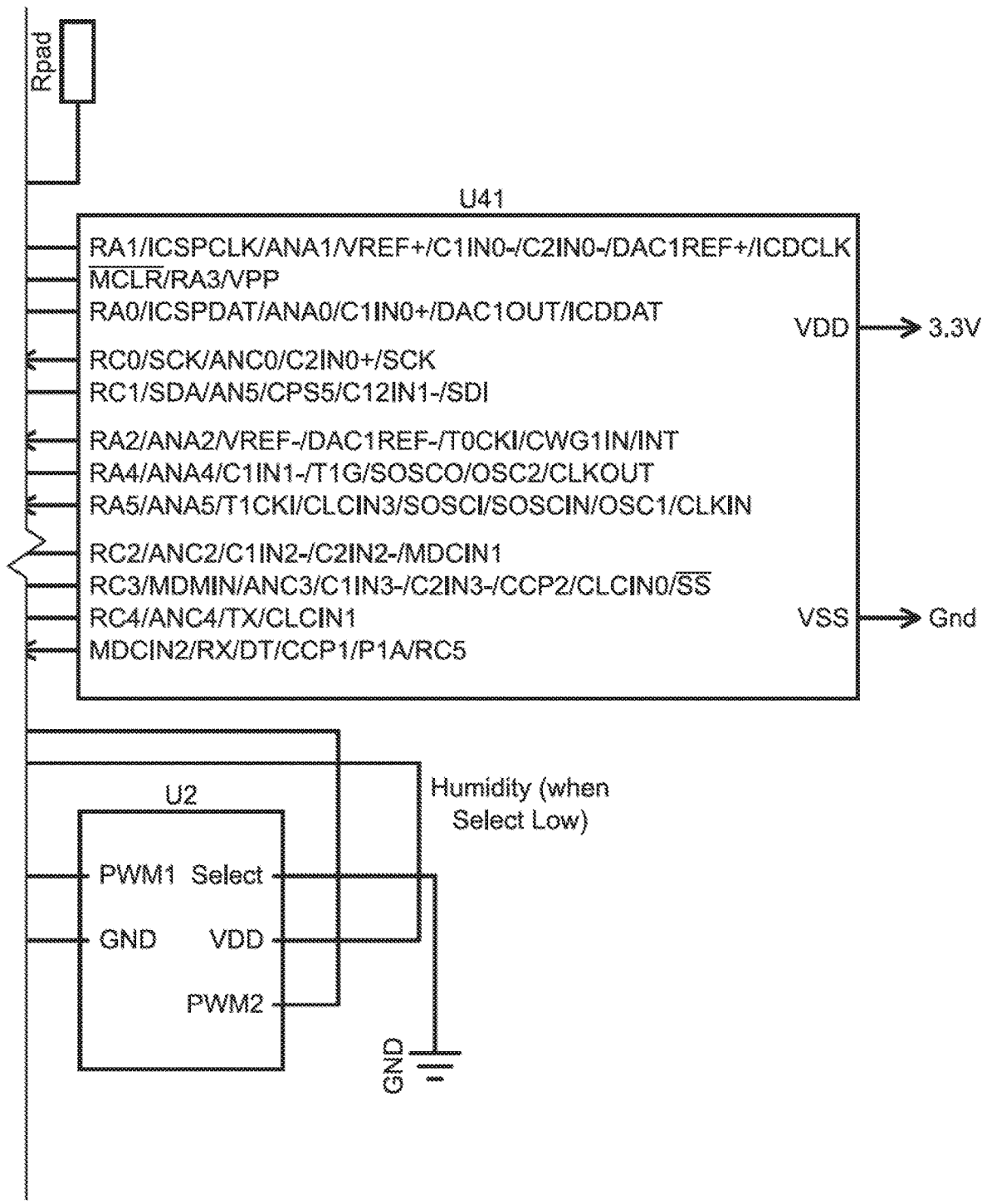
Figure 13:
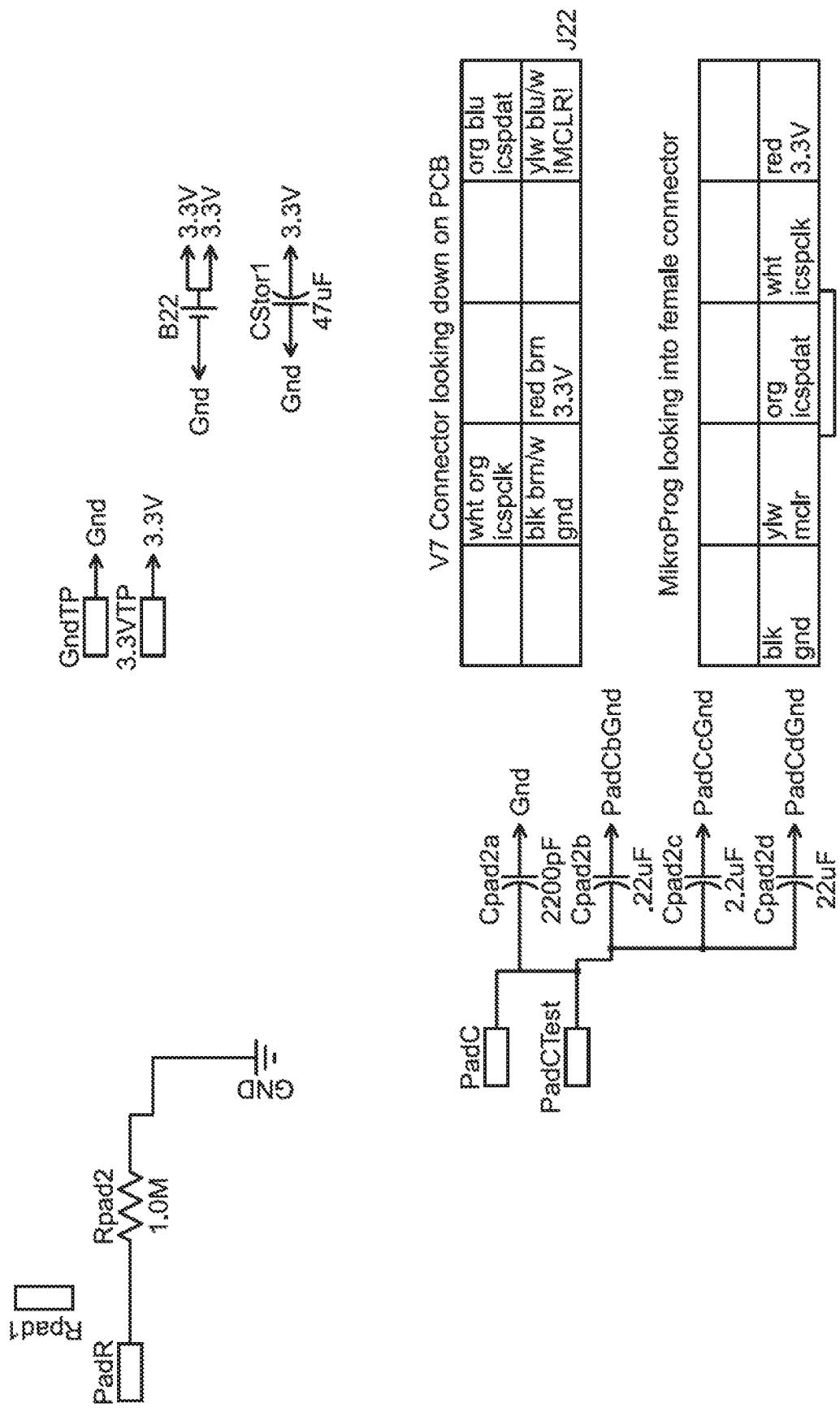
Figure 14:
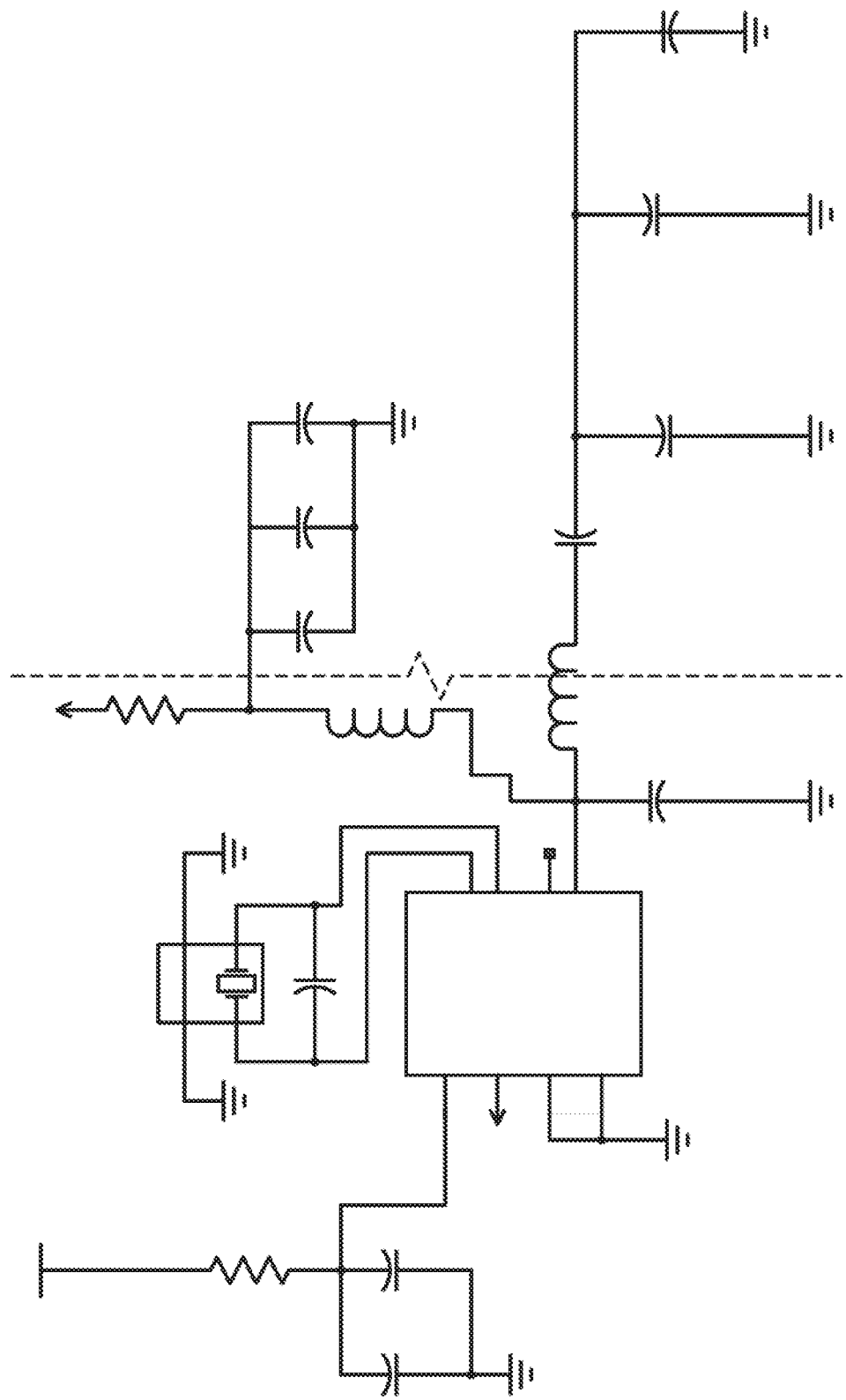
Figure 14A:
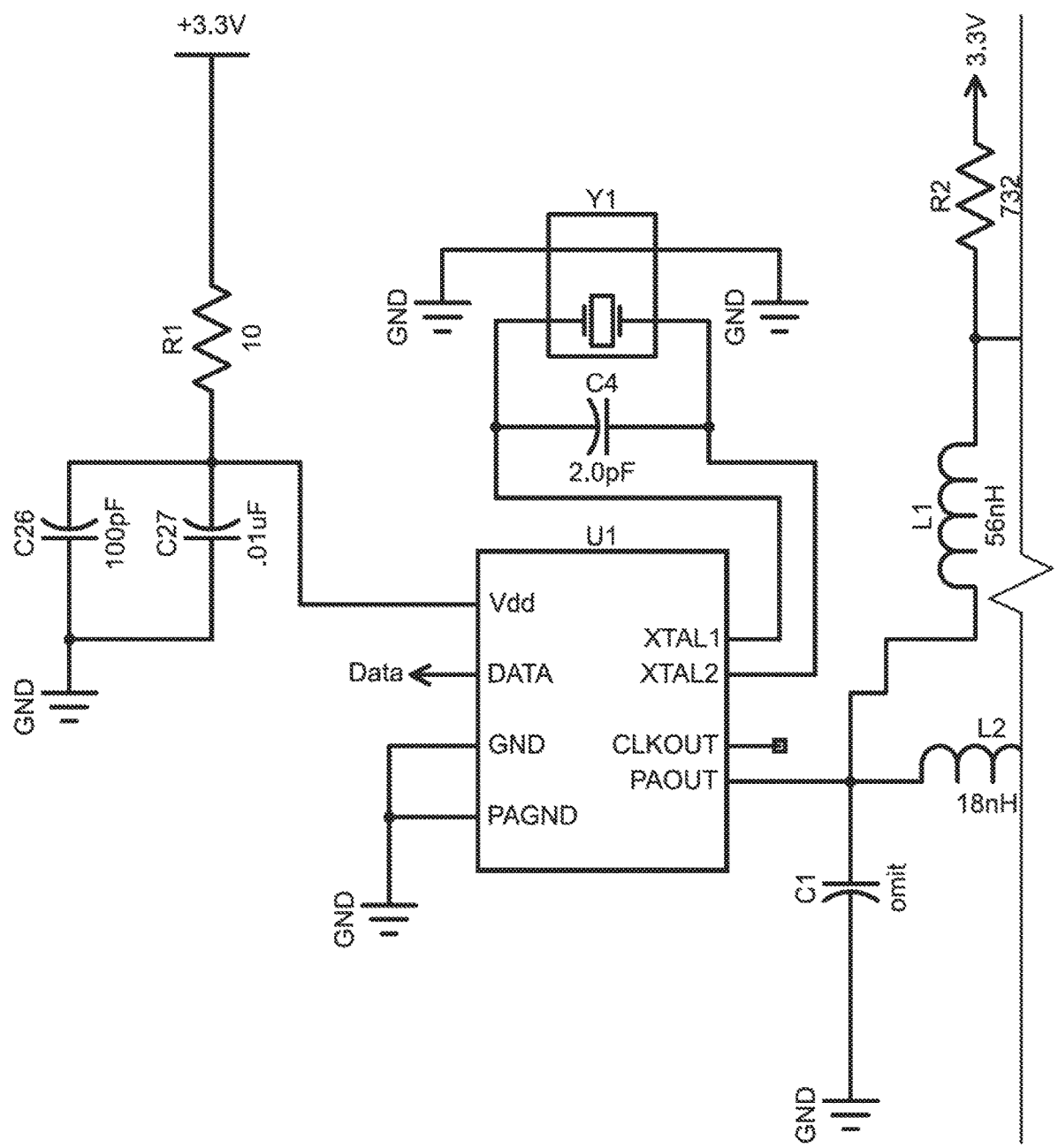
Figure 14B:
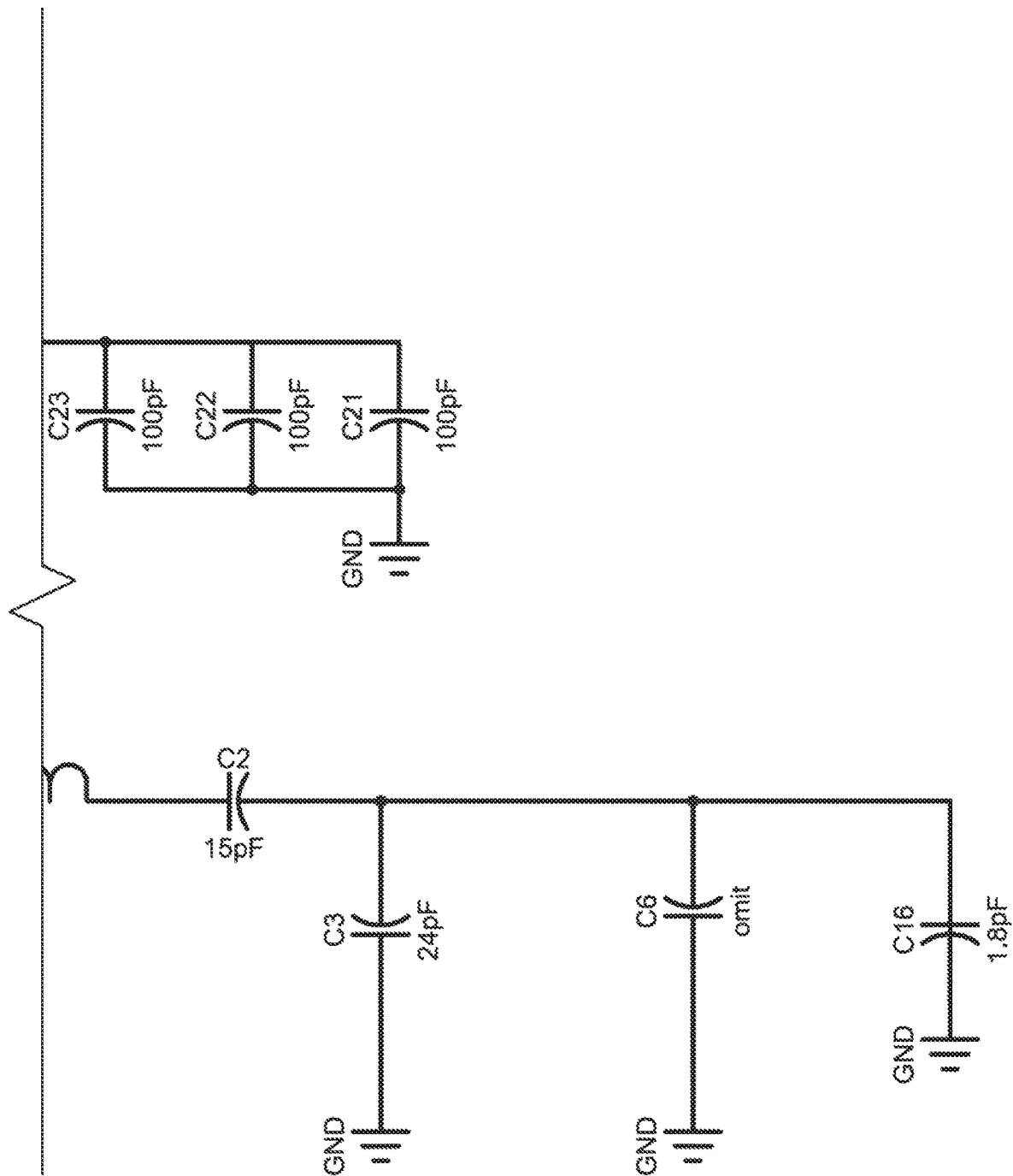
Figure 15:
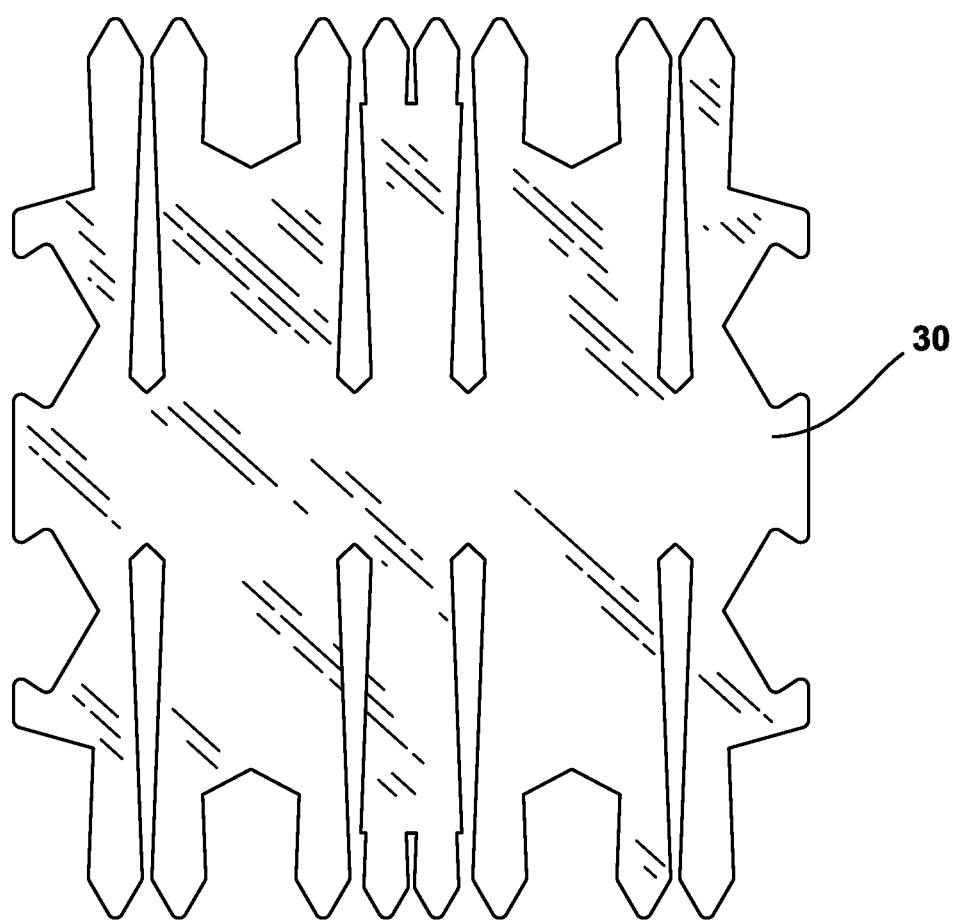
FIG. 15 is a top view of an evaporative aid for promoting better evaporation.
Figure 16:
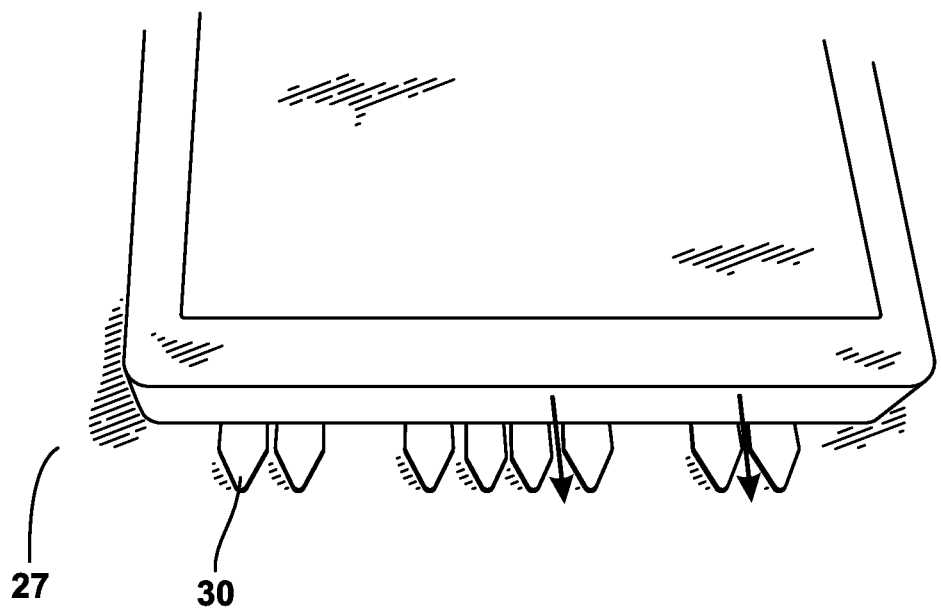
FIG. 16 is a perspective view of a preferred embodiment of the present invention with an evaporative aid situated on its bottom and on top of the floor, with the arrows depicting the moisture exiting.
Figure 17:
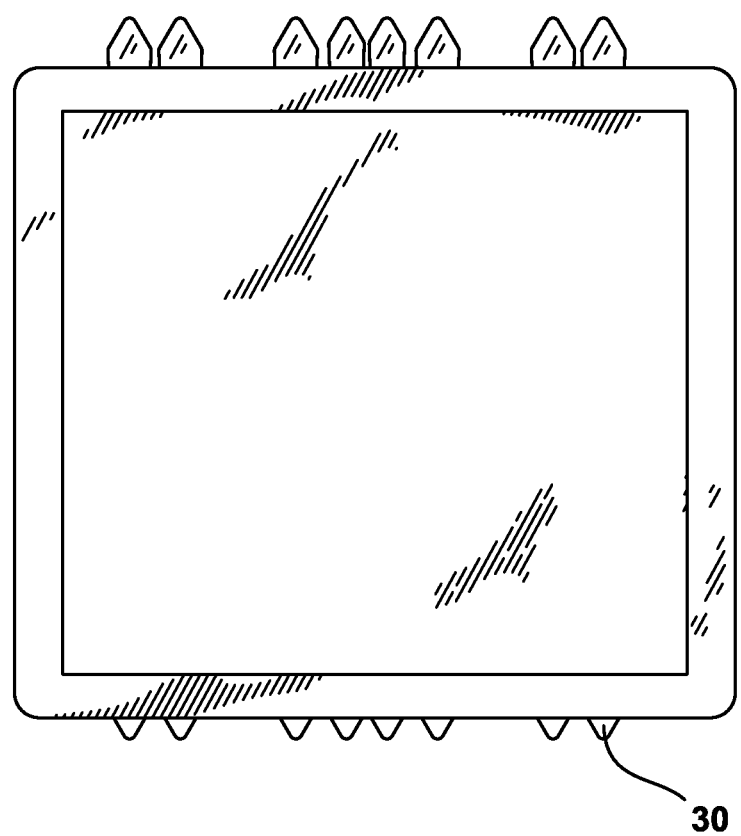
FIG. 17 is a top view of a preferred embodiment of the present invention with an evaporative aid.
Figure 18:
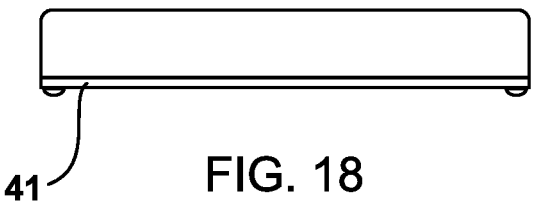
FIG. 18 is a perspective view of a preferred embodiment of the present invention with an electrically conductive evaporative aid.
Figure 19:
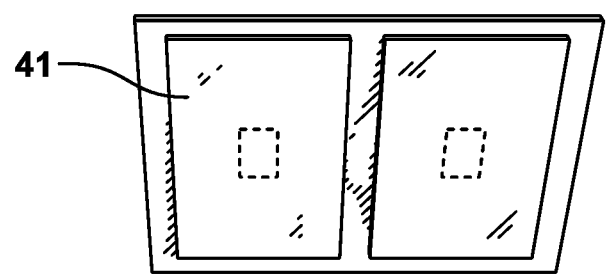
FIG. 19 is a bottom perspective view of a preferred embodiment of the present invention with an electrically conductive evaporative aid.
Figure 20:
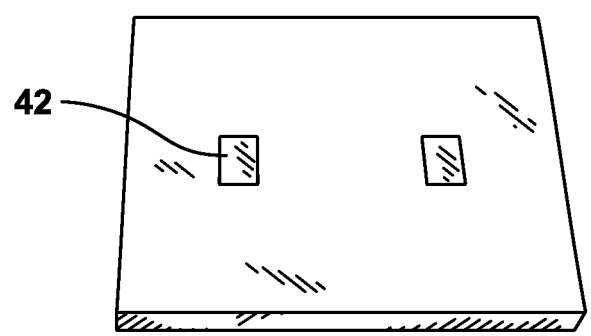
FIG. 20 is a top perspective view of an electrically conductive evaporative aid showing the contacts of a conductive spacer.

Moisture sensor apparatus 10 measures moisture by resistance and is seen in FIGS. 1-3, 22-23. FIGS. 4-7 are circuit diagrams of a preferred embodiment of the apparatus of the present invention to detect moisture accumulation on and within a surface by measured resistance between a plurality of probes. The circuit diagram depicted in FIG. 5 is shown in greater detail in FIGS. 5A and 5B. The circuit diagram depicted in FIG. 6 is shown in greater detail in FIGS. 6A and 6B. The circuit diagram depicted in FIG. 7 is shown in greater detail in FIGS. 7A and 7B. FIGS. 8-11 are circuit diagrams of a preferred embodiment of the apparatus of the present invention to detect moisture on and within a surface by measured capacitance between a plurality of probes. The circuit diagram depicted in FIG. 9 is shown in greater detail in FIGS. 9A and 9B. The circuit diagram depicted in FIG. 11 is shown in greater detail in FIGS. 11A and 11B. A moisture sensor apparatus 110 which detects moisture by measured capacitance is seen in FIGS. 27-30. FIGS. 12-14 are circuit diagrams of a preferred embodiment of the apparatus of the present invention to detect moisture in a substrate by measured resistance between a plurality of probes. The circuit diagram depicted in FIG. 12 is shown in greater detail in FIGS. 12A and 12B, and the circuit diagram depicted in FIG. 14 is shown in greater detail in FIGS. 14A and 14B. FIGS. 15-17 demonstrate an evaporation aid 30 of a preferred embodiment of the apparatus of the present invention. The evaporative aid can also be electrically conductive and subdivided into individual circuits 42, being electrically connected to the sensing circuit by any number of means including exposed circuit board traces and by means of conductive adhesives, or by screws, etc. An electrically conductive evaporative aid 41, also referred herein as a conductive spacer, is shown in FIGS. 18-20. An electrically conductive evaporative aid 41 could take the place of a plain evaporative aid 30 shown in FIGS. 15-17

The sensing apparatus 10 of the present invention includes an enclosure 11 (made of, e.g., plastic) having a bottom panel 12, a top section 18 and an interior for holding components such as electronics and batteries. Bottom panel 12 has lower surface 16, upper surface 21 and periphery 22. Bottom panel 12 preferably is a printed circuit board and can be affixed to enclosure 11 interior with conductive screws 13 that also serve as moisture probes, along with adhesive water proof strips and/or O-rings and/or seals as examples (not shown).

Figure 22:
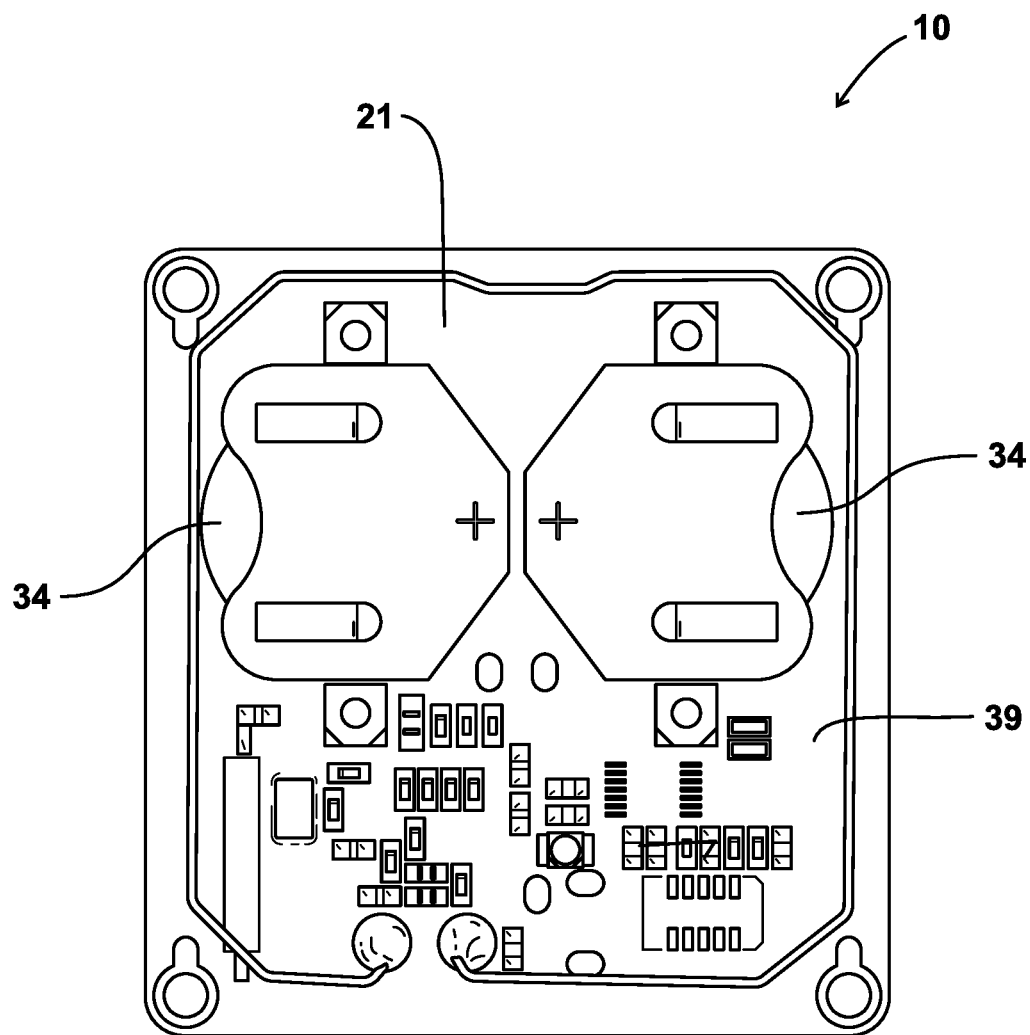
FIG. 22 shows an interior of the enclosure of a preferred embodiment of the present invention.
Figure 23:
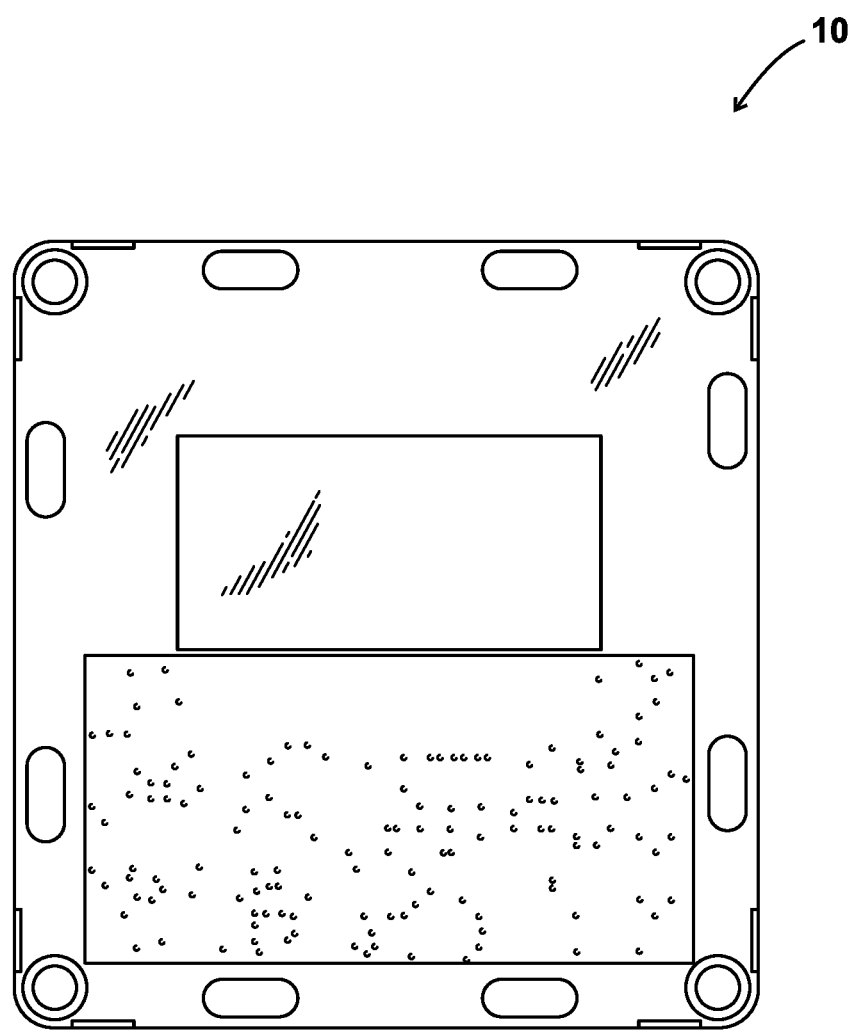
FIG. 23 shows an exterior of a bottom panel of an enclosure of a preferred embodiment of the present invention.

As shown in FIG. 22, enclosure 11 contains an internal battery 34, a processor or microprocessor or computer, and a transmitter. As enclosure 11 is preferably waterproof, these components are protected from water impingement during a leak or spill. The enclosure 11 is thus preferably water-tight to protect from condensation, atmospheric moisture in addition to leaking or spill from nearby sources such as a sink, shower, appliance, toilet or the like. Optionally, the circuit board can be selectively conformally coated 15 (avoiding coating those areas that must be exposed, such as resistance measuring probes or exposed regions of the circuit) (see FIG. 3).

A number of probes 37 are provided adjacent enclosure 11. Some of these probes can sense a spill or leakage when in a horizontal or generally horizontal position or orientation (see the leftmost moisture sensor apparatus in FIG. 21). Some of these probes can sense a spill or leakage when in an inclined, edge, or vertical orientation (see the rightmost moisture sensor apparatus 10 in FIG. 21.

Figure 1:
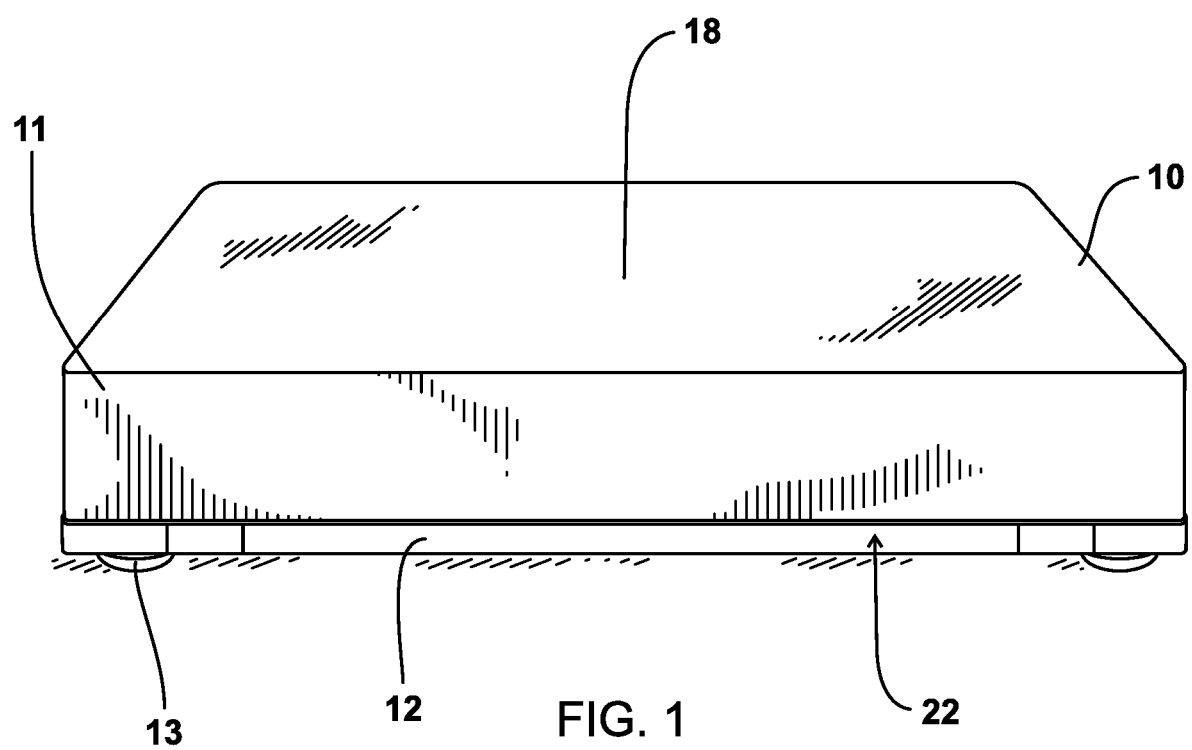
FIG. 1 is a perspective view of a first embodiment of the sensor apparatus of the present invention.
Figure 2:
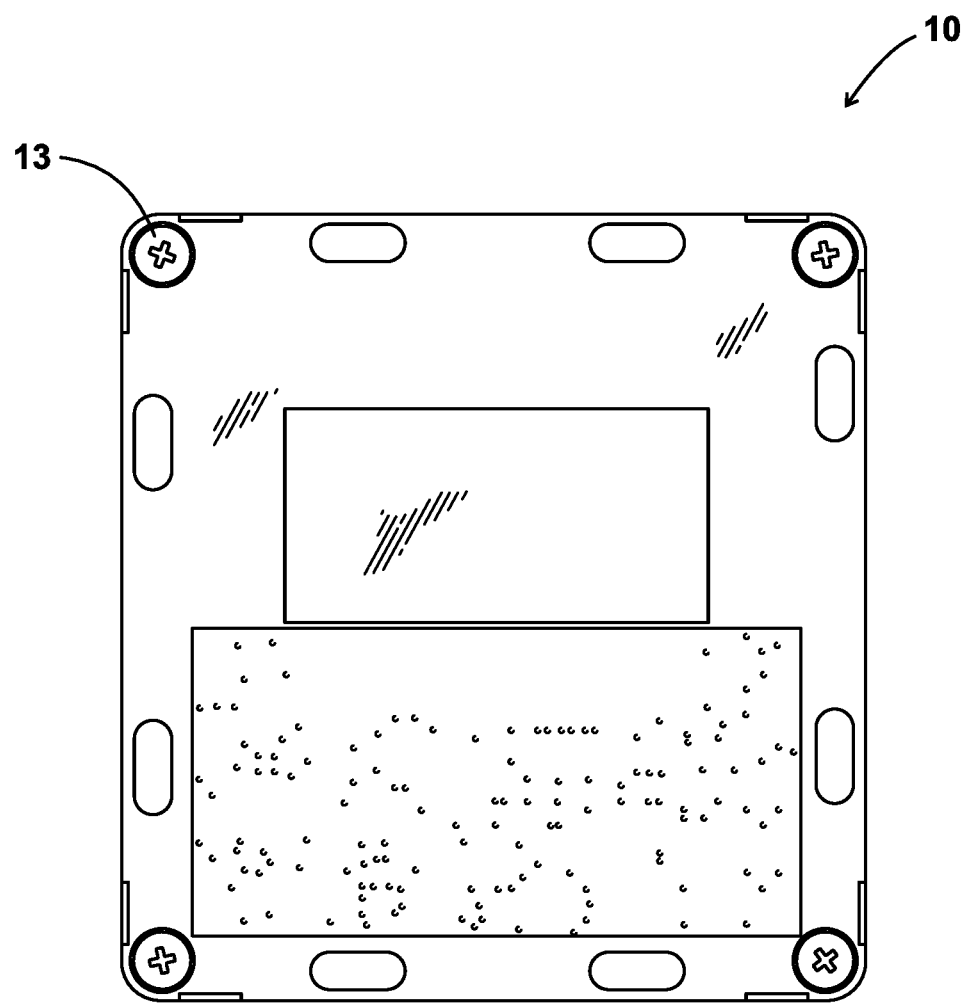
FIG. 2 is a bottom view of a first embodiment of the sensor apparatus of the present invention.
Figure 3:
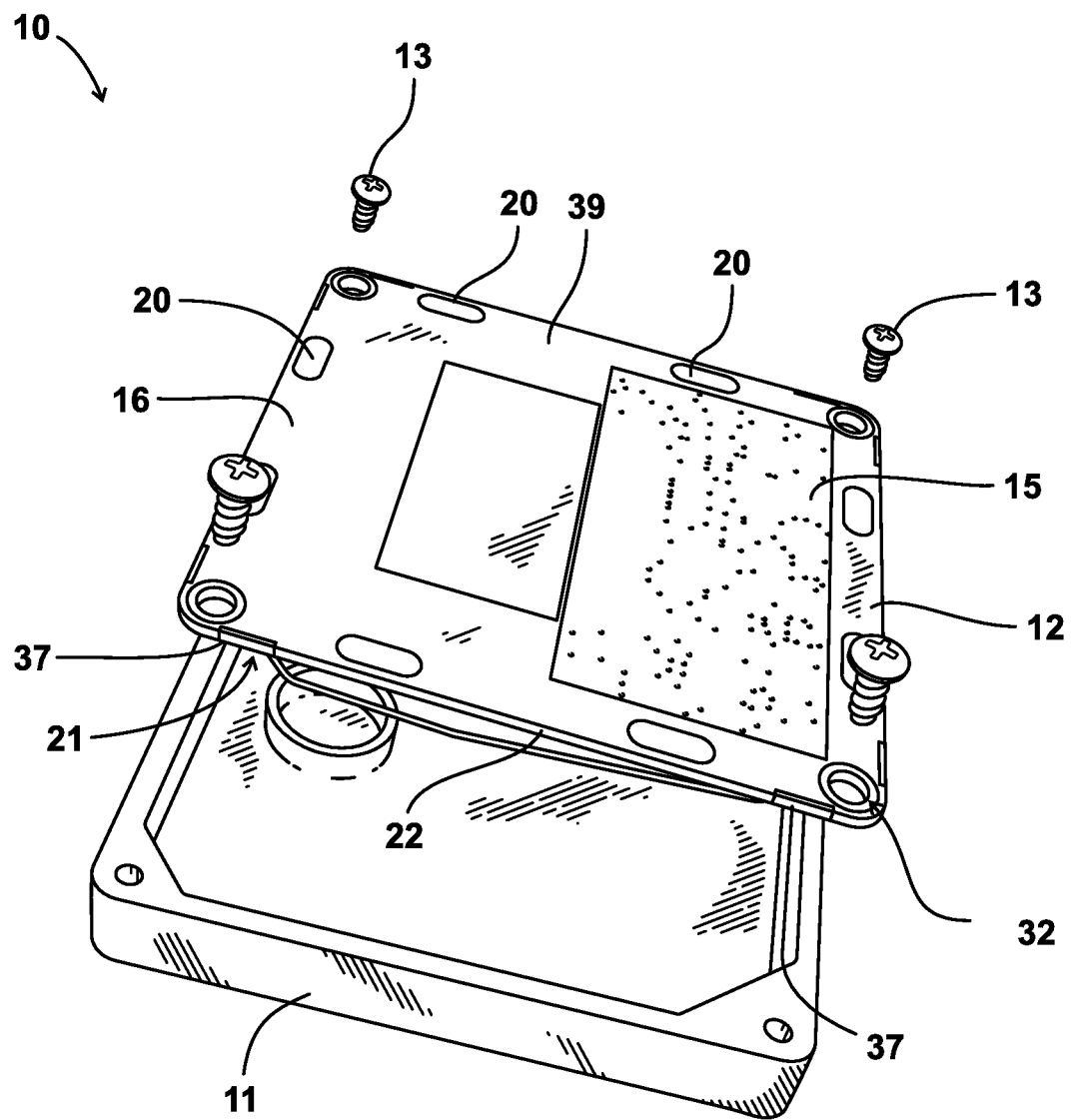
FIG. 3 is an exploded view of a first embodiment of the sensor apparatus of the present invention.

One or more contact probes 13 extend from lower surface 16 of bottom panel 12 (see FIGS. 1-3). Probes 20 can also be provided on enclosure 11. The lower surface 16 also includes contacts 37 for sensing an accumulation of moisture, and located on the lower surface 16 such that they are equidistant from the adjacent surface (typically the floor) when the apparatus is lying flat on the floor, or vertically.

Unique Moisture Probe

The moisture sensor of the present invention preferably includes a plurality of circuits 38 monitoring a plurality of probes 13, 20, 37 some of which (13) are in direct contact with the floor, while others are spaced from the floor (20, 37), as shown in FIGS. 1, 3. The probes are preferably implemented as conductive regions and conductive pins or feet on a printed circuit board 39 that is affixed to the bottom of the sensor enclosure. The bottom 12 of the sensor enclosure serves both as the moisture probe and the bottom of the enclosure. As a result, manufacturing costs are reduced, and without the necessity for a molded bottom, the height of the overall enclosure is lowered.

Figure 21:
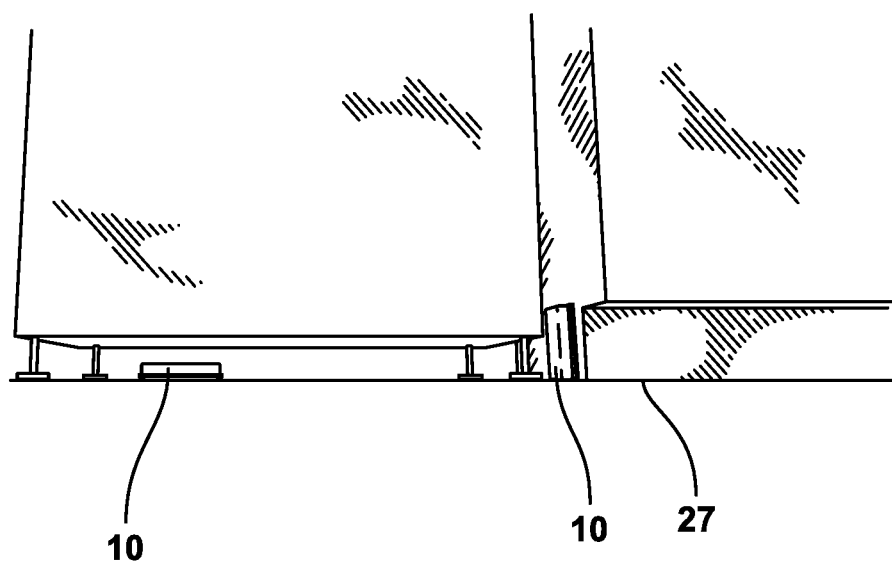
FIG. 21 shows a horizontal orientation and vertical orientation of a preferred embodiment of the present invention.

The arrangement of the probes 37 around the perimeter of the sensor (see FIG. 3), as opposed to the bottom only, enables the sensor to work in a variety of orientations as shown in FIG. 21.

The probe circuit board works in a variety of orientations, but primarily:

In a flat horizontal orientation (see the leftmost moisture sensor apparatus 10 in FIG. 21; see also FIG. 1), the conductive pins 13 (seen in FIGS. 1-3) are in direct contact with the floor and detect any moisture, while the conductive regions 20 on the bottom of the circuit board also detect leaks, but are immune to surface condensation. The conductive pins 13 also raise the sensor bottom 12 from the floor 27 enabling moisture to evaporate (as opposed to mounting the circuit board directly to the floor) (as seen in FIG. 1.

In an edge, vertical orientation (see the rightmost moisture sensor apparatus 10 in FIG. 21), the perimeter probes 37 (see FIG. 3) become contact probes, while the conductive regions 20 (by virtue of the fact they are terminated preferably about 1/16" from the edge) also detect leaks, but are immune to surface condensation.

The circuit board is preferably affixed to the plastic enclosure by means of conductive screws that also serve as moisture probes, along with adhesive water proof strips and/or O-rings and/or seals and/or selective conformal coating so that the internal battery, processor and transmitter are protected from water impinging on the sensor during a leak, and to protect from condensation from atmospheric moisture.

Unique Resistance Sensing Circuit

A moisture sensor measures the resistance between probes to determine the presence of moisture. To do so, the sensing circuit preferably measures how much current can flow between the probes. The challenge in a battery-powered sensor is to measure the conductivity between probes using a minimum amount of current. Further, the microcontroller uses an additional amount of energy as it must wake up periodically to measure this current flow.

Figure 24:
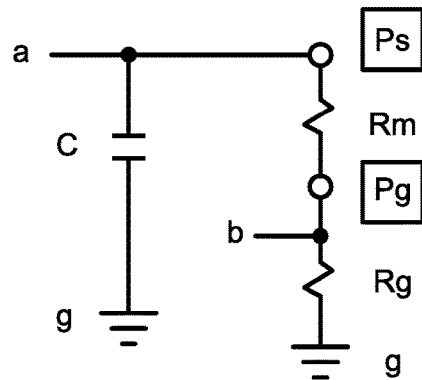
FIG. 24 shows a classic resistor-capacitor discharge circuit utilized by a preferred embodiment of the present invention.

The design of the present invention preferably employs a classic resistor-capacitor discharge circuit (hereafter also referred to as RC circuit) (see FIG. 24). There are for example three sense-probe circuits each comprising a pin (a) of the microcontroller connected to capacitor (C) (whose value is explained below), tied to ground (g) and also connected to a sense probe (Ps) (see FIG. 24). An additional pin of the microcontroller (b) is connected to grounding probe (Pg), with a fixed resistor (Rg) connecting grounding probe (Pg) to the circuit ground (g). When moisture is present, it presents a resistance (Rm) between probes Ps and Pg. As explained below, this forms a classic parallel RC circuit. In operation, microprocessor pin (a) is used to charge the RC circuit, then switch to a hi-z mode and read the capacitor voltage, thus enabling the calculation of Rm+Rg. Rg is necessary because, once pin (a) has charged the circuit (and thus becomes an open circuit), the presence of Rm and Rg form a simple voltage divider, enabling pin (b) to detect current flow through Rm.

This voltage divider would be pointless in a circuit with only one sensing probe Ps and one ground probe Rg. However, when a plurality of sensing probe and grounding probe circuits are employed, the addition of Rg makes it possible for the microcontroller, while charging one of the sensing probe capacitors with moisture present, to detect into which of the grounding probes any current is flowing, thus being able to detect precisely which two or more circuits are in contact with water.

Figure 25:
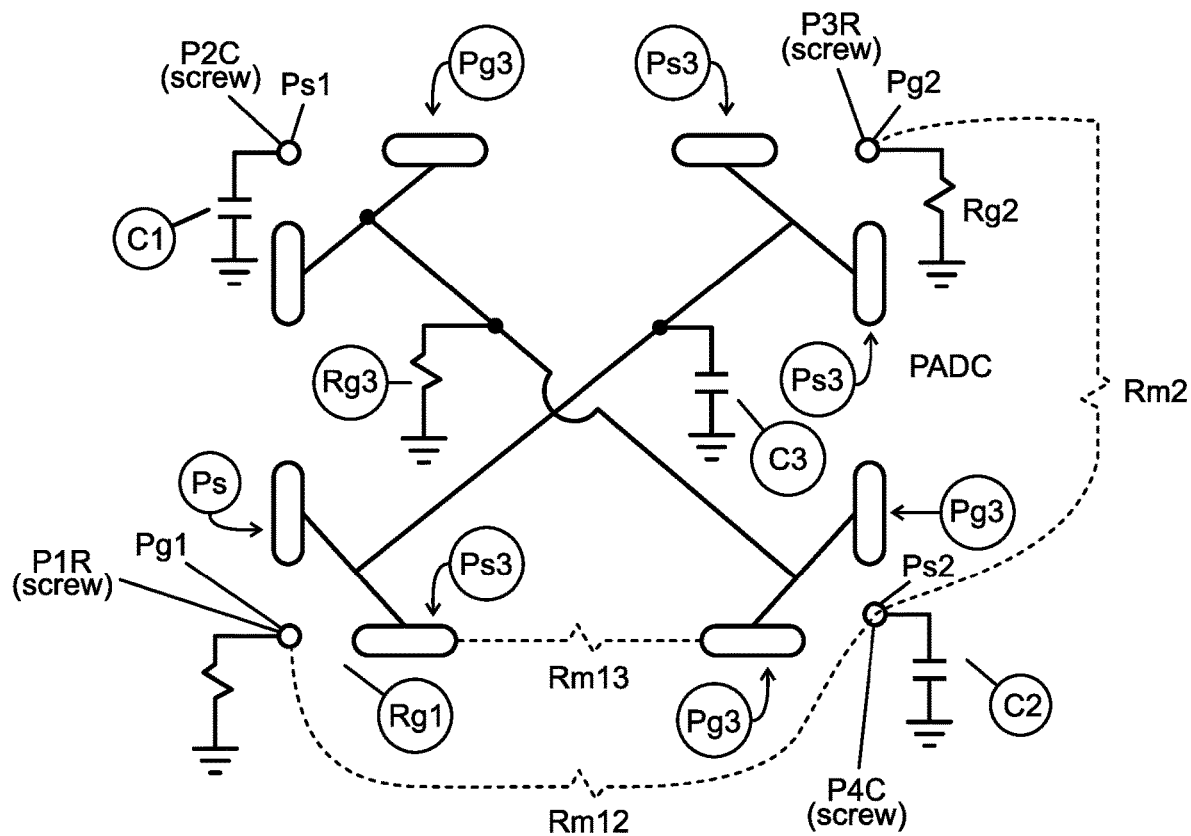
FIG. 25 is a schematic view showing components of the present invention.
Figure 26:
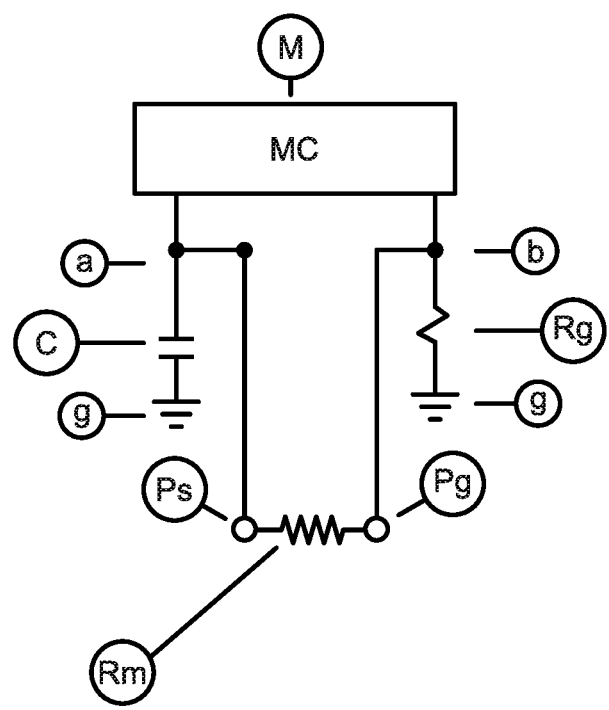
FIG. 26 is a schematic view showing components of the present invention.

There are preferably three such sense probe and grounding probe circuits as shown in FIG. 25. With this arrangement, there are thus 9 possible classic RC circuits made up of any sense-probe capacitor, any of the three ground-probe resistors, completed by the presence of moisture between any sense probe (Ps1, Ps2, and/or Ps3) and any ground probe (Pg1, Pg2, and/or Pg3). To be clear, any capacitor (C1, C2 or C3) can each discharge through its associated pin (Ps1, Ps2, or Ps3), through moisture (Rm11, Rm12 (shown), Rm13 (shown), Rm21, Rm22 (shown), Rm23, Rm31, Rm32, Rm33), to any ground pin (Pg1, Pg2, Pg3), and finally through the pin's associated resistor (Rg1, Rg2, or Rg3). Moisture when present typically causes a resistance (Rm) of tens of thousands of ohms to 2.5 million ohms when the sensor is "wet" to ten to fifty million ohms and more when "damp," while the resistance is well above 1000 million ohms, when the probes are "dry".

The microcontroller preferably provides two methods of reading the voltage level of pin (a)—either by taking a fast, lower-powered digital (0 or 1) reading, or slower analog (as in analog to digital conversion) reading that requires more power. By selecting the appropriate value for Rg (Rg1, Rg2, Rg3), the present embodiment of the invention can work well with either. Because a digital reading results in a "one" when pin (b) is above approximately 50% of the supply voltage and a "zero" when below approximately 50% of the supply voltage, the present invention arranges the moisture resistance (Rm) to form the upper half of voltage divider a-Rm-Rg-g, with the ground-probe resistor (Rg) comprising the lower half of the voltage divider, with the microcontroller pin (b) in the middle. Thus, because when moisture is present, the resistance of the moisture between probes on the sensor can range as high as ten MΩ for a "damp" condition, one embodiment of the invention preferably employs a ground-probe resistance of approximately ten MΩ (though the inventors anticipate other values of Rg may be more optimum given the tradeoffs of accuracy, current usage, sensitivity, etc.). Thus, one moisture sensing circuit comprises a capacitor (C) tied to ground (g) and its sense probe (Ps), a resistor (Rg) tied to ground (g) and its ground probe (Pg), the moisture resistance (Rm) between sense probe (Ps) and ground probe (Pg), and two microcontroller pins (a) and (b), one on each side of the moisture resistance (Rm).

In one embodiment of the current invention, under normal operation where no moisture is present, the microcontroller periodically wakes up, verifies the capacitors C1, C2 and C3 have not lost their charge due to the presence of moisture, then provides a "topping off" charge and returns to sleep. In one embodiment of the present invention the microcontroller awakens every two seconds. As to the value of the capacitors, because the current (but by no means only) embodiment of the invention awakens every two seconds, the value of the capacitors must be chosen so that the presence of moisture to any important degree must discharge the capacitor to a voltage of less than half its fully charged voltage within two seconds. By the classic RC discharge equation $V=V_o*e^{(-t/RC)}$, solving for C yields the equation $C=-t/(R*\ln(V/V_o))$. Considering R=Rg+Rm, and that Rg must be on the order of ten million ohms because "damp" bordering on "wet" moisture impinging on the probes Ps and Pg produces a resistance on the order of ten million ohms, R=20 MΩ. Further, considering the design goal of the remaining charge on the capacitor in the presence of minimal (or "damp") moisture must discharge to 50% of its initial charge, $V/V_o=0.5$. Further, given the sleep time of the microcontroller in the current (but by no means only) embodiment of the invention is 2 seconds, C must be less than or equal to 0.144 uF. With the proper values of the sense and ground circuit established, the microcontroller can periodically, or by means of a microcontroller interrupt, quickly and easily determine the presence or absence of moisture. Using the microcontroller's wake from sleep interrupt feature, sleep times of longer than 2 seconds are possible (with appropriate adjustments to the value of C1, C2 and C3) without any risk of sleeping through a leak event, thus conserving the battery. The inventor has determined however that a more appropriate value for C is far less, as will be seen below.

Considering the same sequence above, but now with moisture present, the microcontroller periodically wakes up, and in sequence and one at the time checks the remaining charge on each capacitor C1, C2 and C3. If moisture is present to any degree, as established above, the capacitor's voltage will have fallen below 50% of its original charge, and thus the associated microcontroller pin will read as "zero". Upon reading a "zero" for any of the sense probe capacitors, the microcontroller instantly changes pin (a) to an output, recharging the capacitor. While the capacitor is being charged, the voltage of pins Pg1, Pg2 and Pg3 are read either as a digital value (as in the current but by no means only embodiment of the invention), or more accurately an analog value (as in analog to digital conversion) along with the attendant increase battery drain. The importance of the improved accuracy can be weighed against the increased battery load to determine the best course of action. Having charged the capacitor and read Pg1, Pg2 and Pg3, the microcontroller changes pin (a) back to an input, waits a fixed, predetermined period of time, then performs an analog reading (as in analog to digital conversion) of the voltage remaining on the capacitor. The voltage remaining is a function of the moisture resistance Rm between Ps1 and Pg1, Pg2 and/or Pg3. The actual moisture resistance is calculated, again, using the classical RC discharge equation $V=V_o*e^{(-t/RC)}$, where R=Rm+Rg. Substituting for R, and solving for Rm yields the equation $Rm=-t/(C*\ln(V/V_o))-Rg$. Thus, the moisture resistance Rm can be calculated to a reasonable accuracy. Lower is wetter, so a much smaller capacitor allows for reading extremely high resistances.

Three important facts are here noted: first, the moisture resistance between Ps1 and Pg1 is in reality almost invariably a different value than Ps1 and Pg2, and again a different value between Ps1 and Pg3. For the sake of clarity, it is herein referred to as simply Rm, but there are in fact 9 possible resistance values between all the combination of sense (Ps1, Ps2, Ps3) and ground pins (Pg1, Pg2, Pg3); second, the remaining voltage on the capacitor in the presence of moisture is more accurately a function of the resistance between the sense pin and 3 ground pins and the number of ground resistors included in the classic RC circuit as a result of the moisture impinging on the various sense and ground pins. In fact, if all the sense pins and ground pins are fully wet, the individual sense and ground circuits become part of a larger mesh circuit thus introducing an error into the equation above. Taking an analog reading of each of the ground pins as noted above will result in the ability to take much more accurate measurements of the various moisture resistances impinging on the various sense and ground probes; third, other embodiments of this invention can include different numbers of sense and ground circuits without affecting the unique sensing features of this invention.

It is also worth noting here that in the current (but by no means only) embodiment of the present invention, the actual value of the sense circuit capacitor C can be chosen to allow for the maximum resistance reading resolution based on the fact the capacitor voltage initially drops precipitously, then slows (exponentially of course) as the voltage approaches zero. The inventors determined experimentally that an appropriate capacitance includes 2700 pF, though other values may be more desirable when considering cost. The optimal value should also be determinable with a closed form equation if so desired. The inventors have also anticipated that other values for sense capacitor C and ground resistor Rg would work equally well, and with further research, other more optimal values would be found to exist by experimentation and/or mathematical calculation.

Further, the current embodiment of the sensing circuit when actively sensing moisture, having a capacitance of 2700 pF and being charged approximately every 2 seconds to approximately 3 volts, by the capacitor charge equation, $Q=CV$, the sensing circuit dissipates 2700 pF*3V=8.1 nC (nano-Coulombs) every 2 seconds. By the current flow equation, $I=Q/t$, it can be seen the moisture sensing circuit dissipates a maximum average of 4 nA (nano-Amperes). This significant feature both preserves battery life and greatly limits the phenomenon of electrolysis between sense and ground probes, prolonging the life of the sensor.

Anticipated sensing circuit and invention embodiment variations

The current (but by no means only) embodiment of this invention is designed to measure the electrical resistance of moisture impinging on one or more probes either in contact with a surface, or separated from the surface so as to differentiate between relatively minimal surface condensation and more copious amounts of water associated with an actual leak. However, in addition to measuring water, any number of various embodiments of this invention will allow measuring the variation of both much smaller and much larger resistances by altering: 1) the sense circuit capacitance C, with much larger capacitance values adapting the circuit to read much smaller resistance values, and conversely much smaller capacitance values adapting the circuit to read much larger resistances exceeding 1000 MΩ values being limited only by the leakage current of the capacitor, microcontroller input impedance, leakage through other circuit elements and circuit board substrate—although these leakage currents themselves could be used to take a relative measure of ambient moisture and other physical properties.

Further, various other embodiments of the present invention could employ piercing probes, electrical connectors, magnetically coupling contacts, conductive plastics, and any other electrically conductive means of employing the sensing and ground circuits for the purpose of measuring the fixed or varying electrical resistance of any substance, atmosphere, substrate, etc.

Further, there is no limitation to the number of types of substances, atmospheres, substrates, etc. that the present invention in its plenary embodiments could measure.

By example, but not by means of limitation, a novel embodiment of this invention with piercing probes for Ps and Pg, with appropriate adjustments to the sense probe capacitor C and ground probe resistance Rg, and appropriate changes to the sensor programming, the varying electrical resistance of gypsum wall board may be measured, thereby employing the gypsum wall board as a substrate for measuring the ambient humidity of the airspace on both sides of the wallboard, enabling the detection of occult moisture accumulation in otherwise inaccessible airspaces in attics, floor systems, walls, etc. The inventors anticipate the ability of this embodiment to detect such occult moisture several, if not dozens, of feet away from the moisture source. The state of the substrate itself preferably will also be monitored for excessive moisture. Further, the piercing probes themselves can also serve as the affixing means of the sensor to the gypsum wall board, and owing to the sensor's light weight, requiring no other affixing means. As such, extreme ease of installation is also an important feature of this embodiment.

Also by example, but not by means of limitation, those skilled in the art would recognize the current invention could be simply embodied with the appropriate attaching and electrical coupling means to make easy installation and useful measurement of the electrical resistance of any number of construction and retrofit materials including (by means of example and not limitation) concrete, Masonite, HardiePlank, etc. Further, appropriate embodiments of the current invention could be installed in certain substrates such as (by means of example and not limitation) concrete, closed-cell and open-cell foam insulation, etc. Further, appropriate embodiments of the current invention could be deployed usefully in certain applications not requiring affixing means, such as (by means of example and not limitation) "tossed" onto the top of or inside of batt and blown-in fiberglass insulation, paper insulation, etc.

Also by example and not by means of limitation, those skilled in the art would recognize the current invention could be embodied with detachable probes themselves appropriate for permanent installation into virtually any construction material with both simple and elaborate electrical connection means. These probes could be installed during construction, retrofit, or at the time of manufacture. By means of example and not limitation, extended lengths of electrically conductive strips spaced appropriately, affixed either during manufacture, retrofit or construction, and connected properly to an appropriate embodiment of the current invention, could monitor extended areas of walls, floors, roofs, etc. for significant changes in moisture. Further, by means of example not by means of limitation, detachable probes in the form of paddles, fins, shims, pins, screws, nails, bolts, tapes, plastics, etc. could be employed, either of special manufacture for the specific purpose of serving as detachable probes, or of common manufacture.

Further, manufacturers of common construction products could offer versions of their products with such probes already included. Such versions would add minimal cost owing to the simple methods required to install such probes. By example and not by means of limitation, conductive adhesive tapes could be applied from continuous rolls onto, for example, batt insulation backing.

Further, additives designed to enhance the variation of resistance, capacitance, or inductance due to variations in moisture, mechanical strain, microbial activity (including damage to the substrate or additive possibly resulting in lower resistance, or additives whose metabolic products result in the substrate exhibiting higher or lower resistance), corrosion (such as sacrificial probes), electrochemical reactions, etc. could be employed. Electrochemical activity would be read as negative resistance.

Also by example, but not by means of limitation, the current invention could be embodied with hydrophobic treatments to control how moisture, both condensing and accumulated, interacts with the enclosure of the invention, and with its various moisture probes. The hydrophobic surface would control the formation of condensation on key areas of the invention, improving the accuracy of the invention to discriminate between leaks and condensation. Further, hydrophobic treatments would discourage the adhesion of accumulated moisture on the proximal areas between the invention and the monitored surface, as during a leak event, thereby tending to accelerate the evaporation of moisture beneath the invention, further mitigating the need to remove the invention to clear away moisture from beneath. This accelerated drying would reduce the tendency to grow mold. By means of example and not by means of limitation, hydrophobic treatments could be added between the probes themselves, but not between the probes and the edge of the invention, thereby allowing a channel for the moisture to form a connection between the probes, but to otherwise prevent condensation on the invention itself to form a conductive path between probes.

This hydrophobic treatment can be applied by making the bottom of the sensor out of suitable hydrophobic materials, or by coating the bottom of the sensor with a hydrophobic composition or compositions. Examples of suitable hydrophobic materials will be apparent to those of ordinary skill in the field of hydrophobic material manufacture. Examples of suitable hydrophobic compositions include Rain-X® Original Glass Water Repellent and ink additives such as those from Cytonix. These additives could be adapted for use in the circuit board manufacturing process. Preferably, the hydrophobicity of the compositions or materials is sufficient to cause water to bead at standard temperature and pressure, at sea level, on Earth, or under any other intended environment and condition.

Processing the Data

The internal processor and transmitter preferably relay the current state of the resistance of moisture impinging on the various sense and ground probes. Reporting the relative resistance between the probes, rather than a binary moisture/no-moisture condition, enables the sensor to relay the fact that a moisture condition exists, and if the moisture condition is advancing or receding. This is a significant feature, allowing the sensor in certain situations to deduce that the leak slow and growing, or has stopped and is drying even though the probes are still in contact with a moist surface. This then allows the sensor to be permanently attached to a surface, or to be deployed in locations that are difficult to access, without the need to dry the surface after a leak event.

The current (but by no means only) embodiment of the design has two established thresholds of measured resistance between any of the sense and ground pins that trigger special conditions. The "damp" threshold is preferably set to approximately 50 MΩ. The second threshold is preferably set to approximately 2.5 MΩ, the measured resistance of tap water standing on a clean surface. Hysteresis is also employed. Of course, resistances above the "damp" threshold are considered "dry".

Preferably, under normal, dry conditions, the sensor waits for a moisture condition to occur, and reports the resistance reading of each sense probe very infrequently, such as every 6 hours.

In operation, if the resistance measured by any of the sense probes drops below the "damp" threshold, the invention begins periodically transmitting the actual resistance each sense probe measures, along with any ground probes that are also wet. These transmissions are much more frequent, such as for example once every 15 minutes. This is a very significant feature. If the resistance continues to drop until below the "wet" threshold, triggering an alarm, the resistance readings leading up to the alarm will be available, producing a much more meaningful dataset. Essentially, a "fingerprint" of the alarm event is produced, identifiable by human analysis or more importantly by computer algorithms.

In operation, if the invention measures a sudden drop in resistance from a "dry" condition to a "wet" condition, it preferably transmits the measured resistance, which sense probe is detecting the "wet" condition, and which ground probes (Pg1, Pg2 and/or Pg3) are also wet. It repeats this transmission for example once a minute for 5 minutes. The sensor could also store and report the previously measured resistances prior to the "wet" condition, providing more data about conditions prior to the "wet" event, enabling the production of much higher quality graphs for human analysis, and datasets for algorithms.

The current (but by no means only) embodiment of the invention, in every facet, endeavors to generate meaningful data to aid in the manual and automatic discrimination of genuine leak events from false alarms, such as accidental spills, the normal accumulation of condensation, etc. The value of these features in a leak detection and prevention system cannot be overstated. False alarms significantly decrease the value and effectiveness of any alarm system.

The inventors anticipate the current number of sense and ground circuits, component values, reporting thresholds and frequency, and every other facet of the design are not yet optimal, and yet already are yielding significant improvements in accuracy.

The sensor preferably employs an accelerometer that detects and reports both movement and the orientation of the sensor. It also preferably relays the sensor's orientation via readings from the accelerometer. Other data are also preferably relayed, including the current battery state, etc.

The sensor preferably employs an internal temperature sensor. The current sensor temperature is preferably transmitted with all resistance readings and is correlated with the resistance readings. Temperature fluctuations correlated with resistance readings greatly improve the ability to discriminate between actual leak alarms and false alarms. Further, the sensor preferably sends periodic transmissions so that the receiving processor can verify the status of the sensor, as well as the radio signal strength. During the periodic update, any changes in the state of the sensor are also transmitted, but only if changes occurred. By omitting redundant data, the battery power can be conserved.

Anticipated Improvements to the Current Embodiment

The current (but by no means only) embodiment of the invention captures and reports the resistance and state of the various moisture probes, the temperature of the sensor, and the orientation of the sensor with an accelerometer. The inventors, in fact, anticipate the addition of many other types of physical property sensors to capture the physical state and activity of the space around a leak detector, both ambient/general physical properties and targeted physical properties.

The inventors anticipate the commercial value of correlating and analyzing gathered data from many such similar spaces, such as for example one sensor behind the toilet compared to other sensors in other bathrooms behind the toilet, or one sensor under the refrigerator compared many other sensors under refrigerators. The inventors anticipate comparing and correlating the data from one-versus-many comparisons of sensors in numerous locations. The inventors also anticipate useful one-versus-many comparisons of sensors in dissimilar locations.

By example (but not by means of limitation) the inventors anticipate recording and transmitting the state of artificial lighting, level of ambient noise, relative humidity, temperature, electrical power usage, water usage, etc. of a space to provide clues to the events leading up to a leak alarm. This data could, for example greatly aid in determining if a bathroom floor sensor alarm has detected a genuine leak, an accidental spill from the shower curtain, or condensation.

This data could also, for example, be used to determine the occupancy status of a residence. This method, of correlating lighting, humidity, temperature, and other ambient values enables a much more efficient and cost-effective method of detecting occupancy, as compared to, for example, passive infrared (PIR) battery-powered motion detectors. This is because the PIR sensing element requires much more power, limiting battery life.

Further, the inventors anticipate correlating this data both in the time and frequency domain by use of for example (but not by limitation) Laplace transforms, Z transforms, S transforms, and various other methods.

Further, the inventors anticipate that a constellation of various embodiments of the current invention will enable the inexpensive capture and analysis of many other physical properties pertaining to, and correlating with, both actual leak alarms and false alarms, in both the time and frequency domain. For example, the inventors anticipate the correlation of measured moisture probe resistance, sensor temperature, nearby gypsum wall board conductivity (as a novel means of detecting relative humidity), ambient light, ambient sound, etc. could aid in discriminating between false and genuine leak alarms.

In addition to the discrimination between false and genuine leak alarms, or leak prevention in general, the captured data of the various physical properties both named and anticipated above, together with the correlated data from a constellation of such sensors, can also aid in more accurately determining many other states pertinent to a physical structure, such as for example occupancy (of one room among other rooms, a dwelling in general, etc.); the general habits of occupancy; operational state, efficiency, etc. of the air conditioning, heating, etc.; general building health concerning relative humidity, the likelihood and prediction of mold formation; even the prediction and effectiveness of improvements to air conditioning, additional wall and attic insulation, etc.

The inventors anticipate that, although a reporting a range of sensor values is very advantageous, whether as a range of resistance, capacitance, temperature, humidity, etc. These readings, in fact, can be thought of as a multiplicity of sensor states. Thus, the readings can be reported as finely as is useful, or as coarsely as is practical. The resistance readings (for example) can be reported with any resolution, with the attendant increase in bandwidth, battery power, micro-processor cycles, etc., or with as little as 1 bit, all while being an improvement over the 1-bit (i.e. 1=wet, 0=dry) reported by currently available moisture sensors. The inventors further anticipate, with a given resolution (such as, for example, 2-bits thus 4 values, or 10-bits thus 1024 values), each available value within the given resolution may correspond to a measured physical state or value, whether linearly and/or logarithmic and/or non-linearly with each value representing a range or group of physically measured values, carefully selected such that the transmitted value is more meaningful and efficient.

For example, the measured resistance between probes for the purpose of measuring moisture can be, of course, representing with 2 binary states (1-bit) as 1=wet (for resistances below, say, 2.5 million ohms) and 0=dry (for resistances above, say, 2.5 million ohms plus 0.5 million ohms for hysteresis). The resistance could also be represented in 4 states using 2 bits, with "00" representing a "saturated" condition when the measured resistance is below 1 million ohms, "01" representing a "wet" condition for resistances between 1 million and 2.5 million ohms, "10" representing a "damp" condition for resistances between 2.5 million ohms and 50 million ohms, and "11" representing a "dry" condition. Alternatively, the range from 1 million ohms to 100 million ohms could be divided evenly or logarithmically by 4. If the resistance is conveyed in 3 bits, for example, the lower 4 values could represent 100,000 ohms to 10 million ohms divided evenly, while the upper 4 values could represent 10 million ohms to 200 million ohms divided logarithmically.

It should be noted the inventors anticipated transmitting any value (whether physical and/or derived and/or conceptual) using any number of bits of data, with each value representing one or a range or ranges (continuous and/or separate) of meaning.

It should be noted the inventors anticipated the utility of signaling the state of a sensor by quantization other than binary bits. Other discernable entities of quantization also apply, whether bits and bit states, fractions of voltage, fractions of amperes, types and methods of modulation, transmission frequency, modulation frequency, etc. and all their combinations, etc. with the selective employment of each in a given transmission carrying meaning. Such as, for example, a 4-bit binary message transmitted with AM modulation carrying a different meaning than an identical 4-bit binary message transmitted with FM modulation.

By employing serrated edges around the circuit board as shown in Figures, the surface area of the trapped water can be greatly increased, thereby increasing the evaporation rate of the entrapped moisture. In an alternate embodiment, a moisture removal aid 30 as shown in FIG. 15 can be affixed to the bottom of the circuit board employing channels that terminate beyond the perimeter of the circuit board as shown in FIGS. 16-17, with three advantages: first, the volume of water is now displaced by moisture removal aid 30; second the channels added to moisture removal aid 30 tend to wick water into them, and out to the serrated edges; and third, The serrated edges of moisture removal aid 30 further increase the surface area of the water volume, thus greatly increasing the evaporation rate. Aid 30 could be rectangular with some windows cut out to allow water to reach the sensors without being hampered by moisture removal aid 30.

Further, by employing a pattern of hydrophobic and hydrophilic areas, water can be further induced to follow these channels out to the serrated edges for vastly improved drying rates. For example, the bottom of the sensor can be hydrophobic or hydrophilic, and treated with a material which causes the treated area to become hydrophilic or hydrophobic, respectively (or if the bottom of the sensor is neither sufficiently hydrophilic or hydrophobic to begin with, then it can be treated with treated with materials which cause part of the treated area to become hydrophilic and part to become hydrophobic. The treated area could be in the pattern shown in Figure, or in some other pattern which promotes movement of water and evaporation.

Further, there are a range of substances that change in color, fluoresce, etc. when in contact with moisture. The addition of an appropriate substance to the exterior of the sensor, whether in the form of paints, dyes, dyestuffs, additives, etc., would cause the color of the exterior of the sensor to change when in contact with moisture, making it much easier to ascertain by visual inspection that water is present, solving a common problem encountered by the inventors where a sensor, having accurately detected moisture, is inspected by someone unfamiliar with the function of the moisture sensor. Because the amount of water is typically small (owing to the fact the sensor detected a leak and shut off the water), someone unfamiliar and thus unaware that a very close inspection is necessary, then assumes in error no water is present implying a false alarm—a situation not conducive to good will toward the sensor.

But with the addition of an appropriate substance to the exterior of the sensor, a vivid change in physical appearance of the sensor would reduce the likelihood of someone unfamiliar with the sensor falsely assuming no moisture is present. Further, where appropriate, such a substance could be employed as a consumable application to the exterior of the sensor such that, upon contact with moisture, dissolves into disperses through the impinging water, more effectively flagging the presence of moisture on the sensor. Further, a substance may be deployed, not only to the exterior of the sensor body, but also to an appliance appurtenant to the sensor, or applied the adjacent surface. Further, the color-changing dissolving dye may be reversible where the dye reverts to its former state when the water dissipates. Further, the dye may be sufficiently volatile so as to evaporate, negating the need for clean-up. Further, the dye can be effervescing (i.e. foaming) to further exaggerate the presence of moisture. Further, it may be desirable for the additive to produce a discernable odor when in contact with moisture.

An advantage of the present invention is its ability to remotely and automatically search for leaks, not just using easy methods (like a basic leak sensor behind the toilet), but by employing methods that allow one to differentiate between a genuine leak (e.g., a toilet filler line break) and a false alarm (e.g., someone in the shower with the shower curtain out). Further, its utility is enhanced by its ability to detect leaks amid sensor noise, such as by watching the flow meter for signs of water usage anomalies (when for example the sensor of the present invention is used with the leak detection system disclosed in International Publication Number WO 2017/019801 A1, published 2 Feb. 2017, assigned to ENCO ELECTRONIC SYSTEMS, LLC, and incorporated herein by reference).

The following features of the leak sensor of a preferred embodiment of the present invention, improve the ability of the present system to detect genuine leaks and false alarms.

Adding an ambient light detector to the sensor allows one to:

determine if someone turned on a light in the room just prior to a leak detection event; infer general occupancy by locating the sensor on the ceiling near a light.

Adding a humidity sensor to the device allows one to correlate changes in humidity with the leak detection event, such as shower curtains leaks during a shower.

Adding piercing probes to the sensor facilitates installation of the sensor directly into the gypsum wallboard on ceilings, walls, etc. As gypsum's conductivity changes measurably with even minute changes in relative humidity, one can periodically measure its conductivity, thus:

allowing the detecting of nearby leaks behind the wallboard, such as below the toilet on an adjacent floor;

allowing one to detect the presence of leaks farther removed as the relative humidity in the airspace behind the wallboard will increase significantly, enabling the detection of occult leaks such as: fire sprinkler system leaks; roof leaks; exterior wall leaks; and leaks in riser chases that terminate above the ceiling;

allowing relative reading of ambient humidity in the air, so that one can detect: the probability that the shower is being used; chronic high relative humidity conditions that allow mold growth; and potential HVAC problems.

FIGS. 12-14 are schematics of a ceiling sensor of an embodiment of the present invention. As can be seen, this is also a resistive sensor, but whose major difference is that it has multiple capacitors it can use to read a much larger range of resistances, such as those found in sheetrock, ranging from 1000s of megohms to less than 1 ohm.

By adding an ambient noise level sensor, one can:

infer occupancy using a much less costly method than motion detectors, as motion detector elements require a large amount of current, requiring larger batteries that require more frequent changes;

correlate leak events with ambient noise, such as detecting that the shower is running; possibly detect problems with certain appliances such as refrigerator compressor problems, or even that the compressor is running too long because the door is left open; correlate flow meter activity with appliances that frequently use water especially when living space is unoccupied, such as ice makers, dishwashers and washing machines.

About ten moisture sensors could be used in a typical condo unit, though often there could be 12-15 per unit or even more.

In addition to measuring the presence of water by a change in resistance, by the addition of a capacitive sensor made up of two insulated, parallel traces on a PCB (printed circuit board) or any other suitable substrate, the sensor can measure the total volume of water contained beneath or in the proximity of the sensor. These parallel traces compose a low-valued capacitor with the PCB, and surrounding environment serving as the capacitor's dielectric, by virtue of the fact the parallel traces form a capacitor with a very high fringe-to-plate ratio. In other words, much of the capacitance is contributed by the fringe electric field radiating around the comparatively thin parallel surface area made up of the adjacent trace edges. See Palmer https://arxiv.org/ftp/arxiv/papers/0711/0711.3335.pdf. Air has a dielectric constant of approximately 1, typical fiberglass circuit boards have a dielectric constant of approximately 4. Water has a dielectric constant of 75 to 80—far more than any other material typically found in the home. By virtue of the fact this capacitor is physically distributed, and can be considered a series of parallel capacitors, the capacitance can change dramatically, and crucially, in proportion to the volume of water near the parallel trace capacitor.

By employing multiple conductive traces in parallel, both co-planar and on adjacent layers, and by selectively powering, grounding, and reading the different traces, the electric field generated by the traces during a measurement can be shaped. Thus, the sensing direction can be altered without the substrate having to be physically re-oriented. If the plurality of traces were positioned along the edge of a substrate, the amounts of water impinging on the upper surface, lower surface, and along the edge of the substrate could be measured independently using a minimum of microcontroller resources.

By employing direct, alternating, and high frequency signals selectively to the several conductive traces (both in phase and out of phase), while reading the resulting voltage and current of other traces, the type of material impinging on the generated electric field may be inferred from its dielectric constant at different frequencies.

By combining the relatively high sensitivity of a resistance measurement with the lower sensitivity of the parallel trace sense capacitor—that is also sensitive to the volume of water impinging on the parallel traces, the present invention can provide a superior moisture sensor capable of discerning the difference between a damp surface, or even a conductive surface, and surfaces with water. This is a great technical advantage for sensors located in areas that may frequently get damp or even come into contact with a limited amount of water, such as by the shower where humidity and accidental spills are possible. Though these spills are detected as leaks, they are ultimately false alarms. Thus, this capacitive sensing method is able to greatly increase the value of a leak detection system by reducing the number of false alarms.

The actual capacitance can be measured, among other means, by constructing a typical parallel RC circuit, and by charging this circuit and then measuring the discharge time. Thus, a volume-sensitive moisture sensor can be very inexpensively constructed. In addition to parallel traces on a substrate, the capacitive sensing element can be constructed from multi-conductor wiring that can be installed around the perimeter of a room, in the walls during construction (both interior and exterior), and the presence of water easily detected.

A further advantage of this moisture measuring method is that the conductors comprising the sensing capacitor can be completely insulated, thus protecting the sensing element from corrosive chemicals and salts, including those found in the home, such as floor cleaning products, salt air in coastal communities, etc.

A further advantage is that the measurement waveform's frequency content can be independent of those otherwise already present on the wire, enabling the measuring waveform to be differentiated from a waveform already present in the wire. Thus, a circuit may be employed that measures the capacitance of energized wiring to detect the presence of moisture along the wiring. Thus, existing wiring in the home may be employed as moisture sensors, both low-voltage and high-voltage wiring, whether used for other purposes or unused. The inventors anticipate, for example, measuring sinusoidal high-voltage wiring at the same waveform position (such as, for example at peak voltage, at zero-crossing, or some other optimal point taking into consideration random linear and non-linear loads). Preferably the measurement is taken near zero-crossing at a voltage below the rectifier forward voltage. Capacitance from moisture impinging on the wiring can be further determined by frequency analysis. The inventors anticipate discriminating the dielectric permittivity (both real and imaginary) of water from other sources of capacitance by measuring permittivity vs frequency (as covered here: https://www.nature.com/articles/srep13535#fl).

While capacitive liquid level measuring has been known for some time, it is not known by the inventors to be currently in use with any commercially available residential or commercial moisture sensors.

Figure 29:
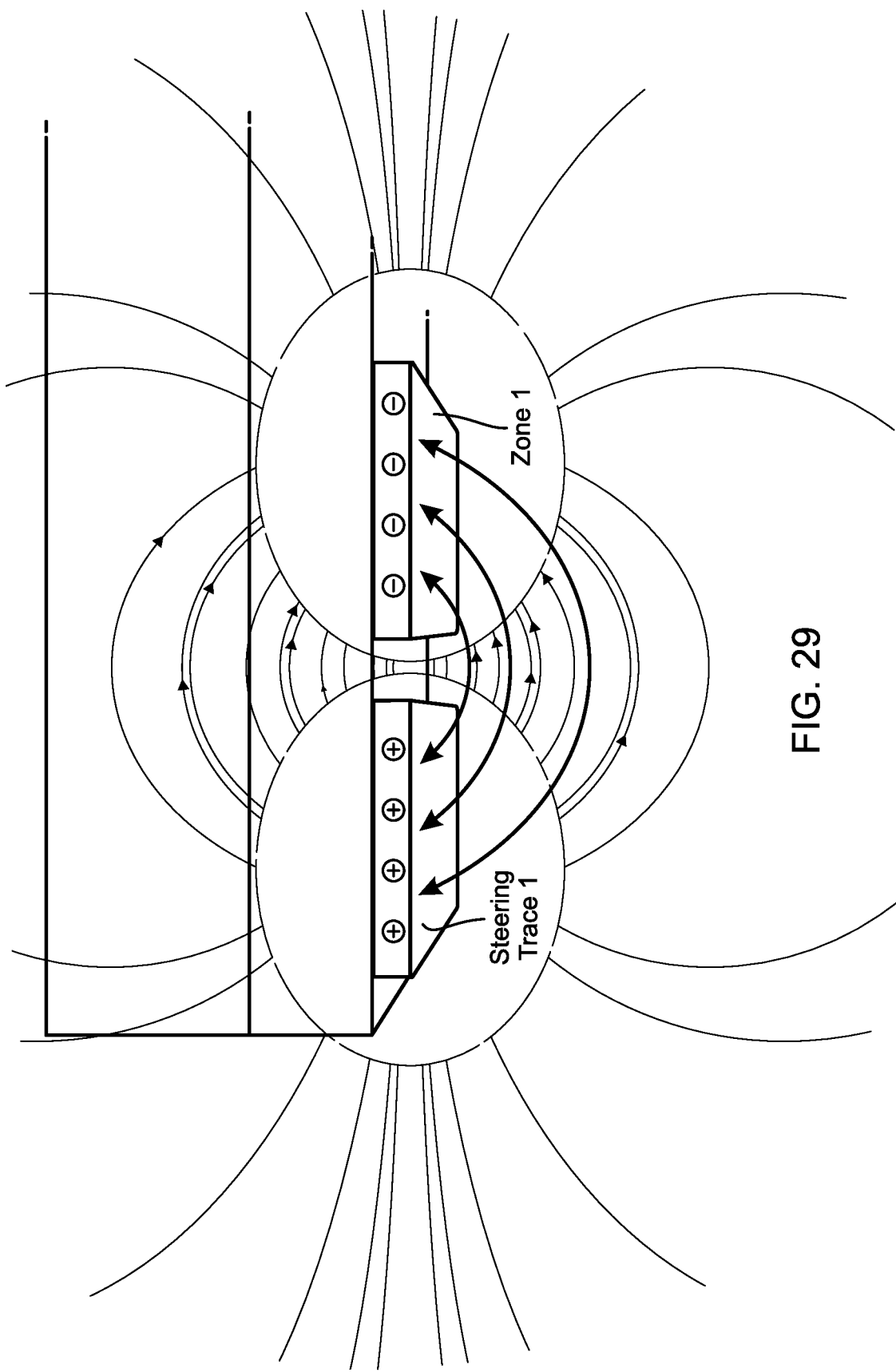
FIG. 29-31 show how the electric field generated by the capacitive structure can be steered by changing the polarity of a plurality of conductors.
Figure 30:
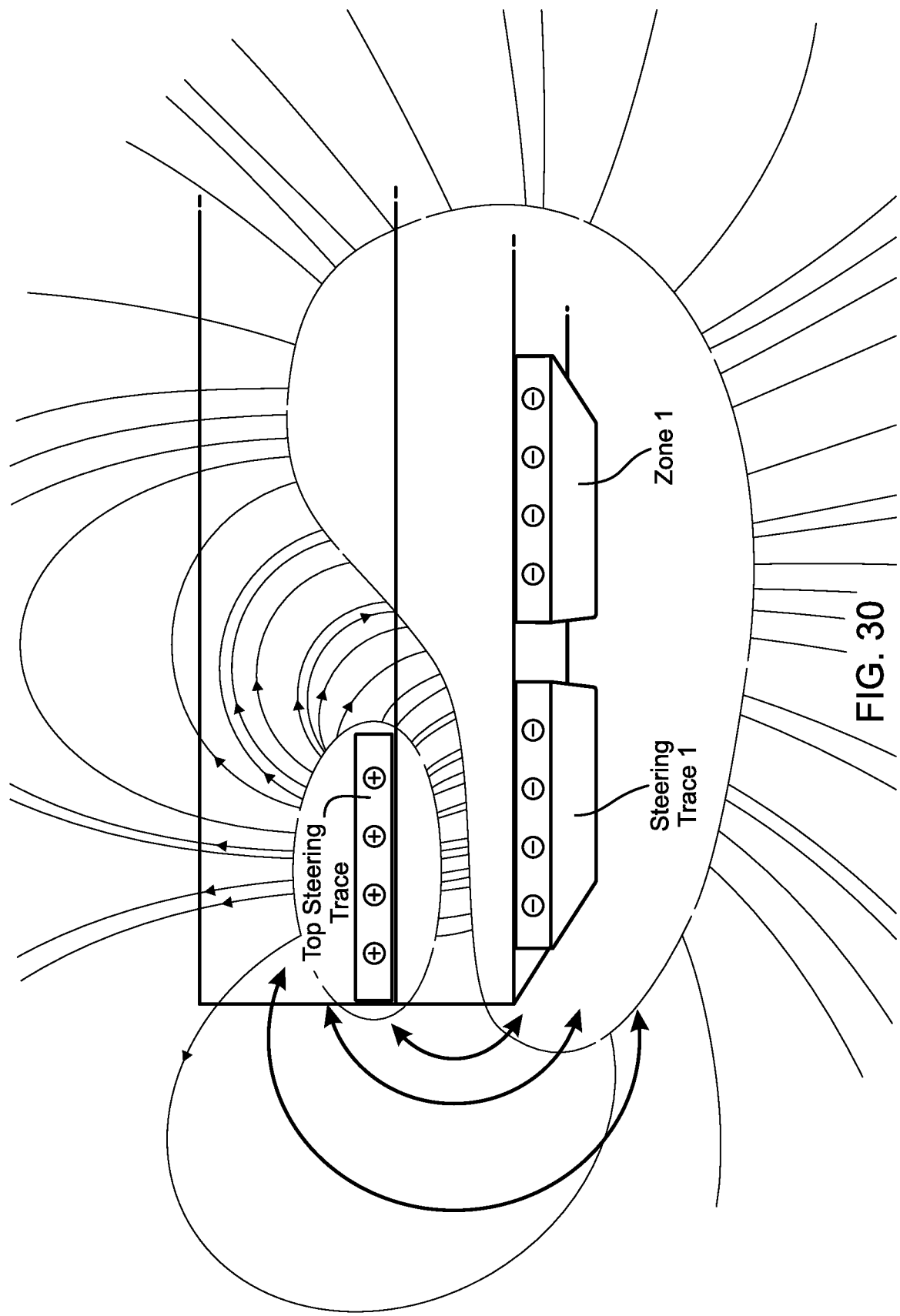
Figure 31:
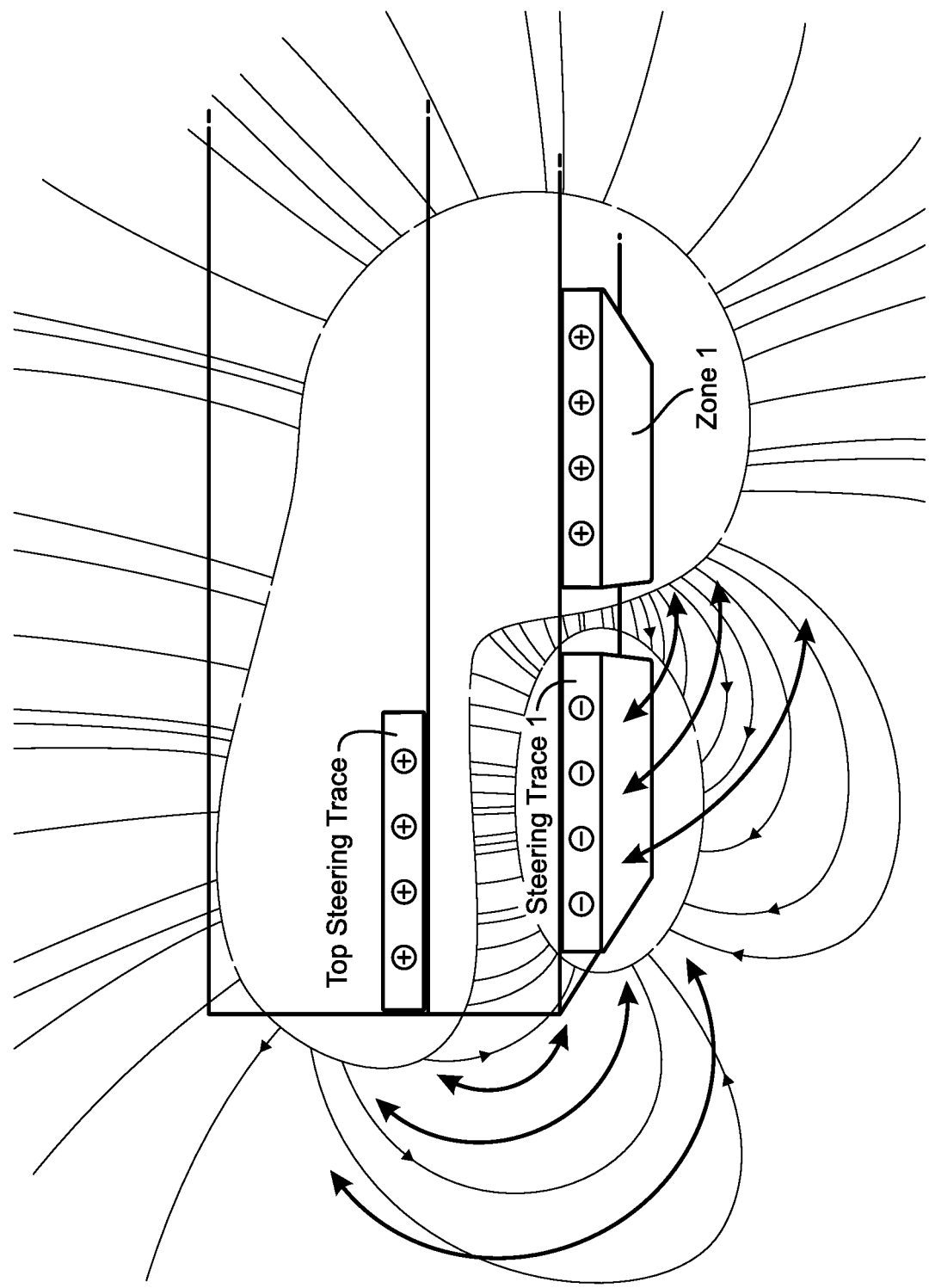
Figure 32:
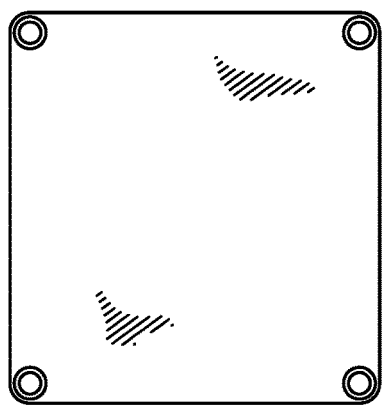
FIG. 32 is a view of a bottom enclosure of a preferred embodiment of the apparatus of the present invention to detect moisture on and within a surface by measured capacitance between a plurality of probes.

In FIGS. 29-31 one can see that the electric field generated by the capacitive structure can be steered by changing the polarity of a plurality of conductors. The capacitance of the parallel conductors is strongly affected by the dielectric constant of the medium in which the e-field extends.

By steering the e-field, the presence of water can be detected in different areas around the sensor. One, but by no means only, embodiment of a moisture sensor employing capacitive sensing is as follows. A continuous conductor (referred to as Steering Trace 1) is deployed onto a structure (such as, for example, around its perimeter), and attached to the pin of a micro-controller. Additional conductors (referred to as Zones 1-5) are deployed in parallel and in close proximity to Steering Trace 1, each connected individually to a micro-controller pin. Two additional conductors (referred to as Steering Trace 2 and Top Steering Trace 3) are also connected individually to micro-controller pins. Zones 1-4 are placed between Steering Trace 1 and Steering Trace 2 and are all co-planar. Steering Trace 3 is on the opposite side of the circuit board and parallel to Steering Traces 1, 2 and Zones 1-4. Further, Zones 1-4 are connected to electrical ground through a fixed resistor (such as 10 million ohms).

The geometry of Zones 1-4 are such that moisture impinging on the perimeter of the sensor can be detected. Zone 5, located across the interior of the bottom of the sensor, can be used to detect that water has completely covered the area beneath the sensor, and thus is a further measure of the amount of moisture in contact with the sensor. The inventors have anticipated many other capacitor geometries for the purpose of detecting moisture, including interlacing fingers, spiral designs, multi-layer rows and columns, etc., along with the likely benefits of each, especially increased sensitivity to moisture in the adjacent surface, using numerous zone elements to render a 2D or 3D image, mathematically extracting virtual zones from numerous zone elements, using tighter circuit tolerances and to measure relative humidity, etc. FIG. 31 depicts the referred to steering traces and zones of an embodiment of a moisture sensor employing capacitive sensing.

Continuing, the micro-controller is programmed such that, to measure the capacitance of any of Zones 1-5, the following steps are executed using Zone 1 as the example: 1) connect Steering Trace 1 to electrical ground via programming in the micro-controller; 2) connect Zone 1 to the electrical supply via programming in the micro-controller; 3) change the micro-controller pin connected to Zone 1 to a high-impedance input. Because of the capacitance between Steering Trace 1 and Zone 1, and the fixed resistor connecting Zone 1 to ground, a simple RC circuit is fashioned. In turn, each of Zones 1-5 can thus be measured.

Continuing, if (again, for example) Zone 1 is measured with Steering Trace 1 grounded, then of course the electric field formed between Zone 1 and Steering Trace 1 would "sense" moisture along the region between Zone 1 and Steering Trace 1. If, however, Steering Trace 1 were left in a hi-z state, Steering Trace 2 were grounded, then the moisture between Zone 1 and Steering Trace 2 would be measured.

Further, if Steering Trace 1 were connected to the electrical supply, with Steering Trace 2 grounded, and Zone 1 measured, the electric field formed between Zone 1 and Steering Trace 2 would be slightly repelled by the energized Steering Trace 1. Further, If Top Steering Trace 3 were energized, the electric field formed between Zone 1 and Steering Trace 2 would be further affected.

Further, if Steering Trace 1 and Zones 1-5 were energized, Steering Trace 2 grounded, and Top Steering Trace measured, the electric field would be directed outward in the plane between the top and bottom traces. In other words, the moisture impinging, not beneath, but rather beside the sensor could be independently measured.

In short, selectively energizing and grounding the various traces in this example can be used to "direct" the sensing electric field, thus steering the moisture sensing region. And though the conductive geometry described in this example is producing a great improvement over existing moisture sensors, the inventors anticipate optimizing the sensor further with refinements to the precise geometry of the conductors, the spacing between the conductors, making use of materials other than circuit boards, employing additional circuit board layers, etc.

Two basic methods of reading the capacitance of the parallel trace capacitor (and thus the relative amount of water impinging on the sensor), that also require very little power, employs the circuit in FIG. 24, a basic RC circuit formed by a resistor and the parallel trace capacitor. Method 1 uses a charge/timed discharge procedure, method 2 uses a timed charge/voltage measurement procedure. The value of the methods below, in addition to other methods anticipated by the inventors, is that these can be implemented in a very efficient manner especially useful in battery-powered circuits by virtue of the fact these methods require very little time (on the order of micro-seconds) to complete, and require very little power.

Method 1

The RC circuit is fully charged, then the time for the circuit to discharge down to Vt is measured. If Vc/Vt is constant (ie, Vt is a percentage of Vc such as in a voltage divider), the discharge time is not affected by Vc (such as in a battery powered circuit). This is seen by solving the RC discharge equation $Vt=Vc^{\wedge}(-t/RC)$ for t, thus $t=(-RC)/(\ln(Vc/Vt))$. Because Vc/Vt and R is are constant, t varies linearly with C.

The capacitance of a parallel strip capacitor that is short in length (on the order of inches) is, of course, small on the order of picofarads, requiring a rather large R. A current embodiment of the circuit uses a 10 MΩ precision resistor to limit measurement variations in production. The inventors have implemented and anticipate several improvements to method 1, such as: adding a plurality of capacitance sensing circuits to measure various regions of the sensor; using a micro-controller to charge and measure the various sensor capacitances; measuring and applying offsetting values to the measurements (both during production, during installation and in situ) to negate parasitic circuit and ambient environment capacitances; varying the comparator Vt threshold to facilitate measuring much larger ranges of capacitance; varying R to facilitate measuring much larger ranges of capacitance; eliminating the comparator circuit and instead utilizing the digital buffer input typical on a micro-controller (i.e. TTL buffer, Schmidt trigger, etc.); utilizing high dielectric constant substances (such as titanium dioxide, glycerin, etc.) to calibrate the circuit more accurately during manufacturing and to incorporate such substances into various sensor mounting fixtures to ensure continued calibration and as a means to detect a tamper condition if the sensor is removed from its mounting fixture.

Method 2

Charge the RC circuit for a fixed amount of time, then measure the voltage. Solving the RC charging equation $Vm=Vc*(1-(-t/RC))$ for C, $C=-(t/R)*\ln(Vc/Vt)$. By fixing t and R, it can be seen that Vm varies logarithmically with C. Both method 1 and method 2 can be embodied in a micro-controller. While method 1 takes advantage of the digital buffer, it is limiting that the digital buffer threshold is fixed. With method 2, varying the charging time allows for measuring a much larger range of capacitances. The inventors have implemented and anticipate several improvements to method 2, such as: in battery powered circuits, Vc is not fixed (and decreases as the battery discharges), however this can be compensated by measuring Vc; by making t very small, minute variations in moisture near the parallel trace capacitor can be detected, including moisture absorbed into the surface adjacent to the sensor; as well as applicable improvements noted in method 1.

The inventors have anticipated and employed other methods such as: employing a series RC circuit, measuring the capacitance by measuring the voltage variation across the resistor; all the variations of methods 1 and 2 including measuring the time for the circuit to charge to Vt (as opposed to time to discharge); charging, then measuring the voltage after a fixed discharge time; employing a buffer amplifier (and varying the amplifier gain above and below unity) to further increase the sensitivity and range of the sensing circuit; employing varying and fixed voltage and current waveforms and the attendant harmonic content analysis to distinguish various substances based on linear and non-linear qualities of permeability, permittivity, conductivity, hysteresis, losses, etc. of those substances with respect to frequency, bias, positive and negative orientation (especially as related to diamagnetic and polarized materials); etc.

As mentioned elsewhere herein, a preferred embodiment of the moisture sensor of the present invention incorporates both capacitive and resistive moisture sensing technologies. Doing so allows resistive measurements of the adjacent surface to detect minute traces of water absorbed into the surface (such as concrete, wood, tile, etc.) because the conductivity of the surface is correlated to its moisture content. A limitation of this embodiment is that the sensor must make positive contact with the surface, making it problematic to permanently affix the sensor to the surface because, either the permanent affixing apparatus may prevent the resistive measuring probes from making contact with the surface, or the probes may prevent the permanent affixing apparatus from adhering firmly to the surface. The inventors anticipated many solutions to this dilemma, including spring-loaded probes, spring-loaded permanent affixing apparatus, etc, all of which include an attendant increase in cost and complexity of manufacturing and deployment. However, another solution is to use the capacitive sensing circuit to detect variations in moisture in the adjacent surface. The inventors have anticipated that measuring such extremely small variations in capacitance is difficult to perform accurately. However, changes in the relative value over time, and in relation to other proximate sensors measuring similar or different values (such as for example ambient humidity) can be correlated to produce meaningful events that are precursors to a leak event. Thus, one could use a sensor of the present invention with only capacitive sensing and still achieve goals of leak detection and harvesting of information prior to and after the leak occurs. Further, an accurate measurement of resistance and capacitance may yield the ability to discriminate different liquids, especially discriminating tap water from water with cleaners, i.e. detect false alarms when the floor is being cleaned.

Figure 33:
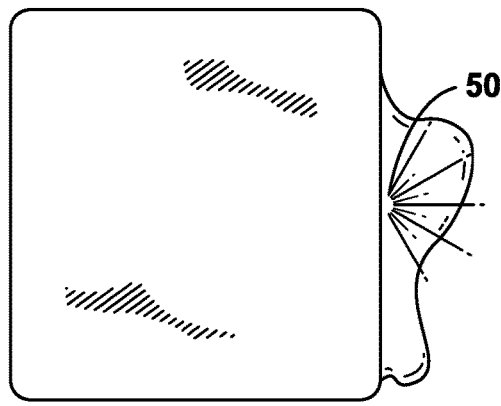
FIG. 33 is a top view of a preferred embodiment of the apparatus of the present invention wherein the detection of water is signaled by one or more LEDs.
Figure 34:
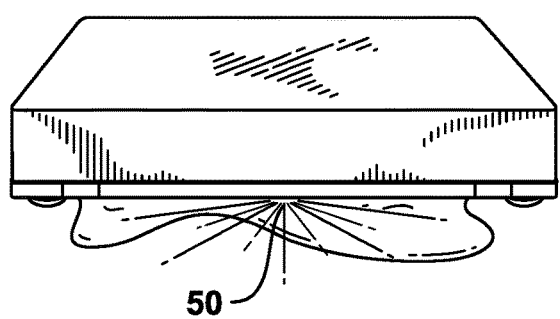
FIG. 34 is a perspective view of a preferred embodiment of the apparatus of the present invention wherein the detection of water is signaled by one or more LEDs.

The sensor may include a novel means of signaling moisture, where one or more light sources (such as LEDs), facing for example downward on the sensor, illuminate the floor at the edge of the bottom of the sensor. Because water would be impinging on the sensor, the light would tend to spread through the water due to internal reflections. Optionally, there could be multiple LEDs for each zone in the sensor. These zones include one each for the four sides, or an LED 50 in the center of sensitivity of each zone (FIGS. 33-34). Of course, the LEDs could be on steadily, or flash intermittently to conserve battery power, or flash with a cadence proportional to the level of moisture, or a code (such as one flash for damp, two flashes and a pause for wet). This could solve a common problem where sensors are generally located in dark areas (inside cabinets, behind refrigerators, etc.) and the typical user cannot easily see the water.

Figure 27:
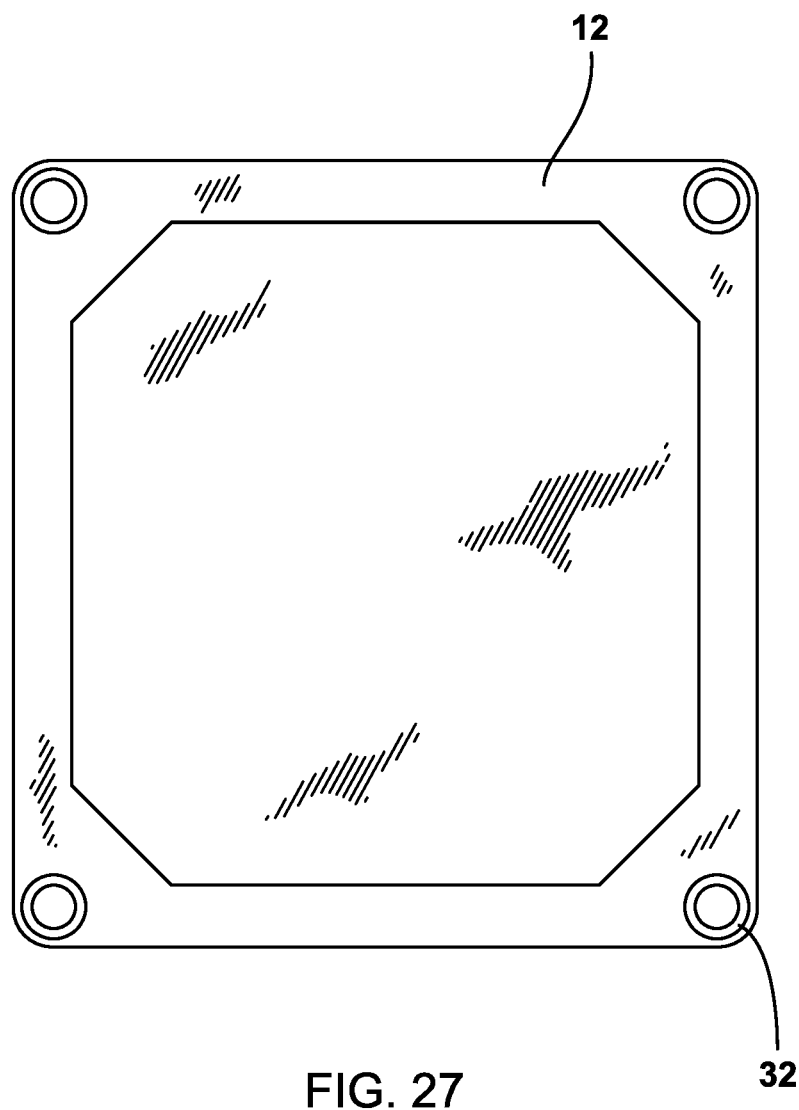
FIG. 27 shows a bottom enclosure of a preferred embodiment of the present invention.
Figure 28:
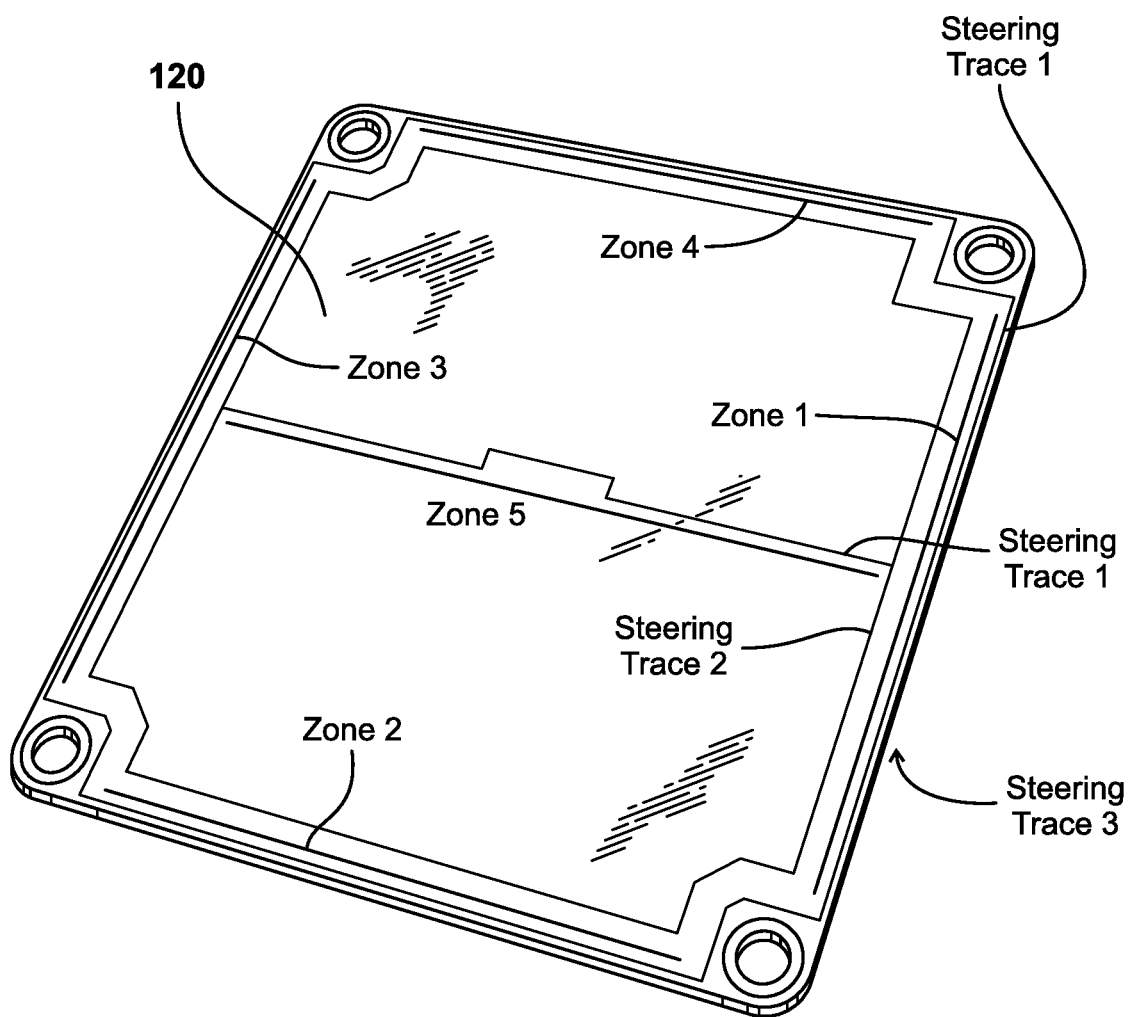
FIG. 28 is a perspective view of a bottom enclosure of a preferred embodiment of the apparatus of the present invention to detect moisture on and within a surface by measured capacitance between a plurality of probes.

FIGS. 27-28 show a capacitive sensor of an embodiment of the present invention. Because PC boards have "through holes" that allow traces to pass from one side of the circuit board to the other, there is an opportunity for a leak. The conventional solution is to enclose the circuit in a sealed case. However, the capacitive sensor would not work nearly as well in a case, because the capacitive sensing requires such close contact with the water. If a case were used, the parallel conductors would have to be embedded in the case using technologies such as overmolding adding significant cost, and electrical connections would have to be made between the circuit board and case.

A solution is, as noted herein, to use the circuit board as the bottom of the case, with the parallel trace sensors on the bottom. Applying a solid coat of "silk screen" (the usually white paint used to identify components and add other markings to the circuit board), and asking the PCB company to apply two coats, functions well as very good, even sealant that fills in the "through holes", and adds a notable increase in physical protection to the bottom traces, while adding almost no cost.

When a large number of sensors is deployed in a system over a long period (months and years), occasionally a sensor may be moved out of position during cleaning, remodeling, and other living activities. Adding a magnetic detector to the sensor circuit and affixing a magnet to the surface where the sensor is placed during installation, the sensor can signal a tamper alarm if the magnet and sensor are separated (i.e. the sensor was moved). This is an important feature when managing dozens, hundreds, thousands and perhaps millions of sensors. Further, the evaporative means detailed above can be made of a magnetic material, combining the benefits of faster evaporation with assured continuity of sensor positioning. Further, the magnet evaporative aid can also be made conductive, combining the ability to sense adjacent surface conductivity (and thus moisture content).

Finally, the inventors have anticipated many benefits of the utility of combining any of the several features detailed in this document, including, but not limited to: deploying these technologies of detecting and communicating acceleration, vibration, movement, rotation, orientation, temperature, humidity, lighting, moisture, water temperature, equipment temperature, etc., not just in the living and mechanical spaces of a residence, but also in the mechanical space of commercial, industrial, medical, etc. buildings; anywhere along the building envelope detecting leaks, monitoring humidity, detecting sewage backups, basement water ingress, etc.; anywhere in the common spaces monitoring building health, environmental conditions, detecting dangerous conditions (such as low humidity, high humidity, condensing atmosphere) conducive to corrosion, rot, mold growth, deterioration, etc.; combining and processing the data communicated from these several technologies for the purpose of predicting, detecting and assuring building, content and especially occupant wellbeing, health and safety.

The following is a list of parts suitable for use in the present invention:

| PARTS LIST: | |
|---|---|
| PART NUMBER | DESCRIPTION |
| 10 | moisture sensor apparatus |
| 110 | conductive sensor |
| 11 | enclosure |
| 12 | bottom panel |
| 120 | capacitive bottom panel |
| 13 | contact probe/conductive screw/moisture probe |
| 15 | waterproof coating of circuit board |
| 16 | lower surface |
| 18 | top section |
| 20 | probe/contact/conductive region |
| 21 | upper surface |
| 22 | periphery |
| 27 | floor |
| 30 | evaporation aid for promoting better evaporation/moisture removal aid |
| 32 | hole through printed circuit board 39 with electrically conductive edge |
| 34 | internal battery |
| 37 | probe |
| 38 | circuit |
| 39 | circuit board |
| 41 | electrically conductive evaporative aid/conductive spacer |
| 42 | conductive spacer contact |
| 50 | LED |
| a | pin of the microcontroller/microprocessor pin |
| b | pin of the microcontroller |
| C | capacitor |
| C1 | capacitor |
| C2 | capacitor |
| C3 | capacitor |
| g | ground |
| P1R | resistance sensor probe/screw |
| P2C | conductive sensor probe/screw |
| P4C | conductive sensor probe/screw |
| P3R | resistance sensor probe/screw |
| PADC | circuit including Ps3 and C3 |
| Pg | ground pin/grounding probe |
| Pg2 | ground pin |
| Pg3 | ground pin |
| Ps | sense probe |
| Ps1 | sense probe |
| Ps2 | sense probe |
| Ps3 | sense probe |
| Rg | resistor/fixed resistor Rg1 resistor |
| Rg2 | resistor |
| Rg3 | resistor |
| Rm | moisture resistance |
| Rm12 | moisture resistance |
| Rm13 | moisture resistance |
| Rm22 | moisture resistance |
| Steering Trace 1 | continuous conductor |
| Steering Trace 2 | conductor |
| Top Steering Trace 3 | conductor |
| Zone 1 | conductor |
| Zone 2 | conductor |
| Zone 3 | conductor |
| Zone 4 | conductor |
| Zone 5 | conductor |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A moisture sensor including:
   a printed circuit board;
   a plurality of moisture probes;
   a plurality of circuits on the printed circuit board monitoring the moisture probes;
   a battery for powering the circuits; and an enclosure containing the battery and the circuits, the enclosure having a bottom, wherein the printed circuit board is the bottom of the enclosure;

wherein at least two sets of probes are on the bottom of the sensor, one set in direct contact with a floor when the sensor is placed on the floor, a second set separated from the floor, and further comprising a set of conductive pins that enable the printed circuit board to be spaced from the floor; and wherein the enclosure has four edges, and a pair of the probes are present along each edge of the sensor, such that when the sensor is installed on any edge, a pair of probes will be in direct contact with the floor.

2. The sensor of claim 1, wherein by analyzing the data from the plurality of circuits monitoring the plurality of moisture probes, it is possible to detect false alarms, such as a damp mop temporarily setting off a subset of probes.

3. The sensor of claim 1, wherein the moisture probes are present in the printed circuit board.

4. The sensor of claim 1, further comprising an accelerometer that reports the current position of the sensor (flat, upright, etc.), and if the sensor is disturbed.

5. The moisture sensor of claim 1, further comprising an ambient light detector.

6. The moisture sensor of claim 5, further comprising a humidity sensor.

7. The moisture sensor of claim 6, further comprising an ambient noise level sensor.

8. A method of detecting leaks, comprising using the sensor of claim 7 to monitor an area.

9. The sensor of claim 7, further comprising a temperature sensor.

10. The sensor of claim 9, wherein the temperature sensor is in the moisture sensor enclosure.

11. The sensor of claim 10, wherein the temperature is transmitted with moisture sensor data.

12. The moisture sensor of claim 1:
wherein the moisture probes include electrical conductors in or on the enclosure;
wherein the circuits for monitoring the moisture probes include a capacitive sensing circuit on the printed circuit board electrically connected to a pair of the electrical conductors for measuring a volume of water in a space near the enclosure by measuring the capacitance between the conductors in the pair of the conductors;
wherein the moisture probes include sensing contacts on the exterior of the enclosure;
wherein the circuits for monitoring the moisture probes include resistance sensing circuits to allow measurements of electrical resistance between at least two sensing contacts representing a relative level of moisture present near the sensing contacts;
and further comprising:
a timer to cause periodic measurements of electrical resistance between at least two sensing contacts and to cause periodic measurements of capacitance between the pair of conductors; and
a transmitter for periodically transmitting capacitance and resistive measurements.

13. The sensor of claim 12, wherein the electrical conductors comprise two insulated, parallel substrate conductors.

* * * * *